US012808426B2

(12) United States Patent
Jenkins

(10) Patent No.: US 12,808,426 B2
(45) Date of Patent: Nov. 24, 2026

(54) LOW SHAPE FACTOR VIBRATION ISOLATOR AND DAMPER

(71) Applicant: Carbide Audio LLC, Llano, TX (US)

(72) Inventor: Jeffrey Schering Jenkins, Llano, TX (US)

(73) Assignee: Carbide Audio LLC, Llano, TX (US)

( * ) Notice: Subject to any disclaimer, the term of this patent is extended or adjusted under 35 U.S.C. 154(b) by 785 days.

(21) Appl. No.: 18/195,843

(22) Filed: May 10, 2023

(65) Prior Publication Data

US 2023/0366445 A1 Nov. 16, 2023

Related U.S. Application Data

(60) Provisional application No. 63/340,362, filed on May 10, 2022.

(51) Int. Cl.
*F16F 15/02* (2006.01)
*F16F 7/00* (2006.01)
*H04R 1/02* (2006.01)

(52) U.S. Cl.
CPC .............. *F16F 15/021* (2013.01); *F16F 7/00* (2013.01); *H04R 1/026* (2013.01); *F16F 2234/02* (2013.01)

(58) Field of Classification Search
None
See application file for complete search history.

(56) References Cited

U.S. PATENT DOCUMENTS 2,216,231 A * 10/1940 Dentler .................... B61F 5/12 267/202
2,263,599 A * 11/1941 Tucker ..................... B61F 5/12 213/40 D
2,592,661 A * 4/1952 Danielson ............... B61F 5/125 213/31
2,620,180 A * 12/1952 Dath ....................... B61F 5/125 213/31
2,933,200 A * 4/1960 Quinn ....................... F16F 1/40 213/22
5,131,619 A 7/1992 Daugherty et al.
5,942,735 A 8/1999 Liang
6,517,060 B1 2/2003 Kemeny
6,520,283 B2 2/2003 Kemeny
(Continued)

FOREIGN PATENT DOCUMENTS

JP 54102468 A * 8/1979

OTHER PUBLICATIONS

JP-54102468-A: English Abstract (Year: 1979).*
MPod, Magico Loudspeakers, Magico Loudspeakers, LLC, https://www.magicoaudio.com/mpod, Dec. 25, 2017.

*Primary Examiner* — Melanie Torres Williams
(74) *Attorney, Agent, or Firm* — Fletcher Yoder, P.C.

(57) ABSTRACT

A vibration damper includes a housing defining a cavity and configured to retain a viscoelastic ring, where the housing includes a first portion having a first surface and a second surface, where the second surface is configured to engage with a first loaded surface of the viscoelastic ring, a second portion having an additional first surface and an additional second surface, where the additional second surface is configured to engage with a second loaded surface of the viscoelastic ring. The housing further includes a plurality of bracing surfaces extending from a third surface of the first portion, where each bracing surface is configured to engage with a first unloaded surface of the viscoelastic ring during deformation of the viscoelastic ring within the cavity.

22 Claims, 23 Drawing Sheets

(56) References Cited

U.S. PATENT DOCUMENTS

| | | | | |
|---|---|---|---|---|
| 6,938,889 | B2 | 9/2005 | Chuang | |
| 8,833,511 | B2 | 9/2014 | Maruyama et al. | |
| 9,863,495 | B1 | 1/2018 | Wakeen et al. | |
| 9,920,811 | B1 | 3/2018 | Morrison | |
| 10,187,712 | B2 | 1/2019 | Latvis | |
| 2010/0101903 | A1* | 4/2010 | Boyd | F16F 1/38<br>188/268 |

* cited by examiner

LOW SHAPE FACTOR VIBRATION ISOLATOR AND DAMPER

CROSS REFERENCE TO RELATED APPLICATION

This application claims priority from and the benefit of U.S. Provisional Application No. 63/340,362, entitled "LOW SHAPE FACTOR VIBRATION ISOLATOR AND DAMPER," filed May 10, 2022, which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

The presence of unwanted vibrations can degrade the performance of electronic and/or audio equipment by inducing microphonic noise or microphony in output signals of devices such as record players, microphones, amplifiers, and digital to analog converters. Vibrations originating from audio equipment, such as loudspeakers, can be transferred to structures supporting the equipment, thereby making the structures an undesired vibration source for other nearby equipment. Various types of devices are used to isolate electronic equipment from vibrations and/or dampen the vibrations produced from the electronic equipment. However, existing devices may be susceptible to wear and degradation over time. Traditionally, compromises may be made to the material and/or structure of existing devices in order to improve the strength and/or mitigate wear and degradation of the devices. However, such compromises limit the promotion and duplication of audio with a low natural frequency, thereby resulting in sacrifices to the audible experience for a listener. Accordingly, it is now recognized that improved vibration isolation and vibration damping devices for audio equipment are desired.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a vibration damper includes a housing defining a cavity and configured to retain a viscoelastic ring, where the housing includes a first portion having a first surface and a second surface, where the second surface is configured to engage with a first loaded surface of the viscoelastic ring and a second portion having an additional first surface and an additional second surface, where the additional second surface is configured to engage with a second loaded surface of the viscoelastic ring. The housing further includes a plurality of bracing surfaces extending from a third surface of the first portion, where each bracing surface is configured to engage with a first unloaded surface of the viscoelastic ring during deformation of the viscoelastic ring within the cavity.

In another embodiment, a housing for a vibration damper includes a first housing portion comprising a first surface and a second surface and a second housing portion comprising an additional first surface and an additional second surface, wherein the second housing portion is configured to couple to the first portion to define a cavity in an assembled configuration of the housing. The housing further includes a plurality of bracing surfaces extending radially inward, relative to a central axis of the housing, from a third surface of the first housing portion, where each bracing surface of the plurality of bracing surfaces is configured to engage with a viscoelastic ring disposed within the cavity, a first bracing surface of the plurality of bracing surfaces extends from the third surface toward the central axis by a first distance, and a second bracing surface of the plurality of bracing surfaces extends from the third surface toward the central axis by a second distance different from the first distance.

In another embodiment, a vibration damper includes a housing defining a cavity configured to retain a viscoelastic ring, where the housing includes a first housing portion configured to engage with a first loaded surface of the viscoelastic ring, where the first housing portion comprises a plurality of bracing surfaces configured to engage with an unloaded surface of the viscoelastic ring. The housing further includes a second housing portion configured to engage with a second loaded surface of the viscoelastic ring and a third housing portion configured to couple to the second housing portion. The housing further includes a plurality of ball bearings disposed between the third housing portion and the second housing portion to facilitate lateral movement of the second housing portion relative to the third housing portion, a fourth housing portion configured to be disposed within a recess of the first housing portion, where the fourth housing portion comprises a first component and a second component, and one or more additional ball bearings disposed between the first component and the second component to facilitate lateral movement of the fourth housing portion relative to the first housing portion.

BRIEF DESCRIPTION OF THE DRAWINGS

Various aspects of this disclosure may be better understood upon reading the following detailed description and upon reference to the drawings in which.

DETAILED DESCRIPTION

Figure 1:
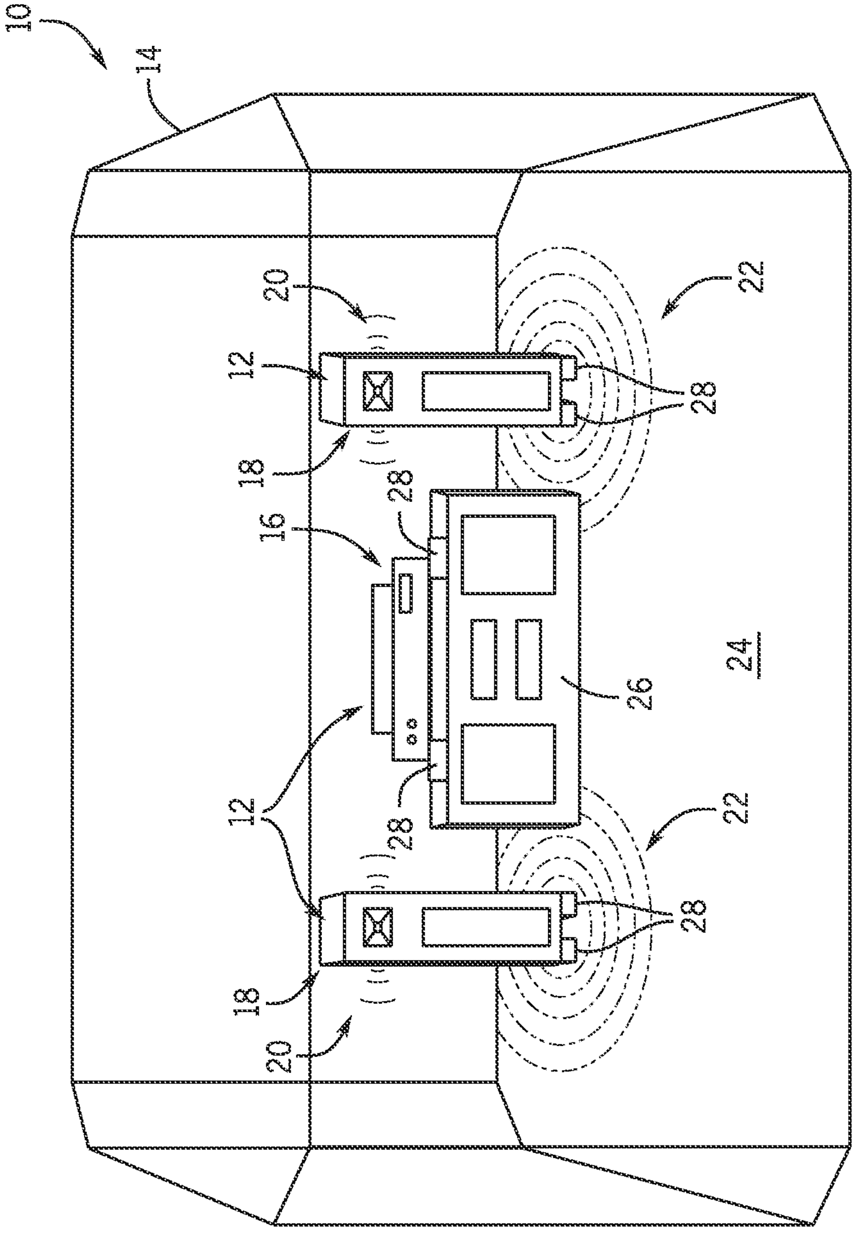
FIG. 1 is a schematic of an embodiment of a system having electronic equipment and vibration dampers, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

As used herein, the terms "approximately," "generally," "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

The present disclosure is directed to systems and methods for damping and/or isolating vibrations (e.g., vibration isolator, vibration damper), and more specifically to systems and methods for isolating and/or damping vibrations from sensitive electronics, such as audio equipment. As noted above, the presence of vibrations and oscillations, which may be generated by and/or adjacent certain components in electronic equipment, may negatively impact the performance of the electronic equipment. For example, introduction of microphonic noise or microphony to output signals of devices, such as record players, microphones, amplifiers, speakers, digital to analog converters, and so forth may reduce a quality of sound or acoustics produced and output by the electronic equipment. Microphony is a phenomenon in which components convert mechanical vibrations into undesired electrical signals (e.g., noise). Vibrations originating from components in electronic equipment may be transmitted to structures supporting the equipment, thereby transforming the structures into an undesired vibration source for the equipment and/or other nearby equipment. To reduce these undesired effects caused by vibrations, vibration isolating and/or damping devices may be utilized to isolate the electronic equipment from vibrations and/or dampen the vibrations produced by the electronic equipment (e.g., during operation of the electronic equipment). Some existing devices reduce the degrading effects caused by vibrations by utilizing viscoelastic materials disposed between a vibration source and the electronic equipment.

Viscoelastic materials can be formed in various shapes, which may have corresponding shape factors that promote low natural frequencies and a wide bandwidth (e.g., frequency bandwidth) of vibration isolation. The ability of a viscoelastic material to deform (e.g., bulge) in directions generally perpendicular to the direction of a loading force may be quantified and/or described as a "shape factor" of the viscoelastic material. A low shape factor may be indicative of a viscoelastic material that has a large unloaded surface area available to deform (e.g., bulge) relative to a loaded surface area to which a loading force is applied. In some instances, a viscoelastic material having a low shape factor may also have a low spring rate and may be configured to promote a low natural frequency. Some existing devices utilize viscoelastic materials shaped to define a central void, for example an annular shape, in order to provide a reduced shape factor for given outer dimensions of the viscoelastic material. Other existing devices utilize soft viscoelastic materials intended to enhance the vibration damping ability of the device. Unfortunately, existing devices that utilize viscoelastic materials having these properties are susceptible to various weaknesses. For example, soft viscoelastic materials have limited strength, and thus may be susceptible to wear and degradation over time. Traditional viscoelastic materials having a low shape factor may be susceptible to structural instability, particularly when under load and supporting electronic equipment.

In an effort to increase strength and reduce wear and degradation, existing devices may include a rigid structure that encapsulates the viscoelastic material (e.g., all or substantially all of the viscoelastic material). However, encapsulation of a viscoelastic material with a rigid structure decreases the unloaded surface area that is available to deform (e.g., bulge) under loading, thereby resulting in a higher shape factor of the viscoelastic material. Further, other existing devices utilize viscoelastic materials having a greater shape factor to provide structural stability for the viscoelastic material under load (e.g., supporting equipment). Thus, traditional devices are characterized by viscoelastic materials with a shape factor that is greater than desired, increased stiffness that provides limited vibration isolation and damping, and/or vulnerabilities to wear, degradation, and structural instability. In other words, existing devices provide limited structural stability and/or provide limited vibration damping and isolating properties, which may result in a diminished auditory experience for a user (e.g., listener) of the electronic equipment.

It is now recognized that improved vibration isolation and damping devices are desired. Accordingly, the present disclosure is directed to vibration isolation and damping devices that utilize viscoelastic materials having a low shape factor and low stiffness in order to obtain a wide bandwidth of vibration isolation desired in vibration sensitive applications, while also providing desirable structural stability and load bearing capacity. As noted above, a viscoelastic material having a low shape factor may provide an increased ability of the viscoelastic material to deform (e.g., bulge) in a direction crosswise (e.g., perpendicularly) relative to a direction of a force (e.g., compressive force, loading force) applied to the viscoelastic material. The increased ability to deform or bulge relative to the applied force may be associated with an increased ability to isolate or dampen a wide range of vibrations produced by surrounding electronic equipment and/or an increased ability to promote a low natural frequency of the viscoelastic material. However, viscoelastic materials associated with lower shape factors are traditionally associated with a decreased ability to support or withstand certain loads (e.g., audio equipment, electronic equipment). Thus, the improved isolation and damping devices of the present disclosure include a low shape factor viscoelastic material supported by a housing having a plurality of bracing surfaces that provide desirable structural support for the viscoelastic material while also enabling the viscoelastic material to deform as desired to provide improved vibration isolation and damping. In this way, the disclosed embodiments provide improved vibration isolation and damping abilities across a wide bandwidth of frequencies with a low natural frequency and increased useful life, which thereby results in improved listening experiences for a user of electronic and audio equipment.

As discussed in greater detail below, a vibration damper (e.g., vibration isolator) in accordance with the present techniques may include a low shape factor viscoelastic material formed in an annular ring and disposed within a cavity of a housing. The viscoelastic annular ring may include a first loading surface and a second loading surface configured to interact (e.g., engage) with inner surfaces of the housing. The viscoelastic annular ring may also include one or more unloaded surfaces (e.g., inner unloaded surface and/or outer unloaded surface) configured to deform (e.g., bulge) in response to a force (e.g., compressive force, loading force, horizontal force, vertical force) applied to one or more of the loading surfaces. The housing may include a base and a frame having a loading surface and a plurality of bracing surfaces that collectively define the cavity of the housing configured to house and/or contain the viscoelastic annular ring. Further, the base of the housing may be engaged (e.g., loosely coupled) with the frame of the housing to enable a limited amount of relative movement between the frame and the base, thereby limiting potential wear and degradation of the viscoelastic annular ring. As defined herein, "loosely engage" or "loosely couple" in reference to the relationship between portions of the housing may refer to fasteners engaging or coupling a first portion of the housing to a second portion of the housing such that limited relative movement between the first portion and the second portion is enabled. The first loading surface of the viscoelastic ring may be configured to engage with the base of the housing, the second loading surface of the viscoelastic ring may be configured to engage with the frame, and the one or more unloaded surfaces of the viscoelastic ring may be configured to interact with the plurality of bracing surfaces of the housing, thereby providing support for the viscoelastic ring as the viscoelastic ring deforms (e.g., bulges outwardly) in response to a compressive force applied to the vibration damper. For example, the bracing surfaces may be spaced apart from one another to form a plurality of gaps between adjacent bracing surfaces. By positioning the bracing surfaces at spaced locations about the viscoelastic ring, the stability (e.g., ability to resist buckling) of the vibration damper (e.g., the viscoelastic ring) may be improved while also enabling various portions of the unloaded surface area of the viscoelastic annular ring to deform outward into the gaps between the spaced bracing surfaces. As a result, the vibration isolation and damping characteristics of the disclosed vibration dampers may be improved (e.g., the vibration dampers may have a low natural frequency and/or may provide damping and isolation of a wide range of frequencies), and the vibration dampers may also benefit from improved structural integrity and longevity across a variety of different compressive loads.

Turning now to the drawings, FIG. 1 is a schematic of a system 10 including electronic equipment 12 disposed within a room 14 (e.g., a surrounding environment). The electronic equipment 12 may include audio equipment, such as a record player 16, loudspeakers 18, amplifiers, microphones, digital to analog converters, audio video receivers, and so forth. As will be appreciated, the electronic equipment 12 may be configured to process, reproduce, and/or output sound 20 (e.g., sound waves, acoustic waves) for the enjoyment of a listener. In some instances, operation of the electronic equipment 12 may generate vibrations 22 that may be transmitted to surrounding components or structures disposed within the room 14. For example, the vibrations 22 may be transmitted to a floor 24 of the room 14, furniture 26 (e.g., a cabinet, a table) supporting the electronic equipment 12, other electronic equipment 12, and so forth. Unfortunately, the vibrations 22 may adversely impact operation of the electronic equipment 12 (e.g., by generating or inducing undesired electrical signals or noise). Accordingly, the system 10 includes vibration dampers 28 configured to damp, dissipate, and/or isolate the vibrations 22 generated by the electronic equipment 12. In the illustrated embodiment, the vibration dampers 28 are disposed beneath (e.g., relative to gravity) the electronic components 12. That is, the electronic components 12 are positioned on top of one or more vibration dampers 28, such that the vibration dampers 28 support a weight of the components of the electronic equipment 12. In certain embodiments, the vibration dampers 28 may be positioned on top of (e.g., relative to gravity) the electronic components 12. For example, in certain embodiments, a vibration damper 28 may be placed on top of a record positioned on the record player. In the manner described below, the vibration dampers 28 function to damp, dissipate, and/or isolate the vibrations 22 to block or mitigate adverse impact of the vibrations 22 on operation of the electronic equipment 12. For example, the vibration dampers 28 may damp, dissipate, and/or isolate vibrations 22 generated by electronic equipment 12 supported by the vibration dampers 28 and/or vibrations generated by other components or elements within the room 14. In accordance with the present techniques, the vibration dampers 28 enable improved damping and isolation of vibrations 22 across a wide range of frequencies, while also promoting a low natural frequency and providing desired structural support for the electronic equipment 12 across an extended useful life compared to existing devices.

Figure 2:
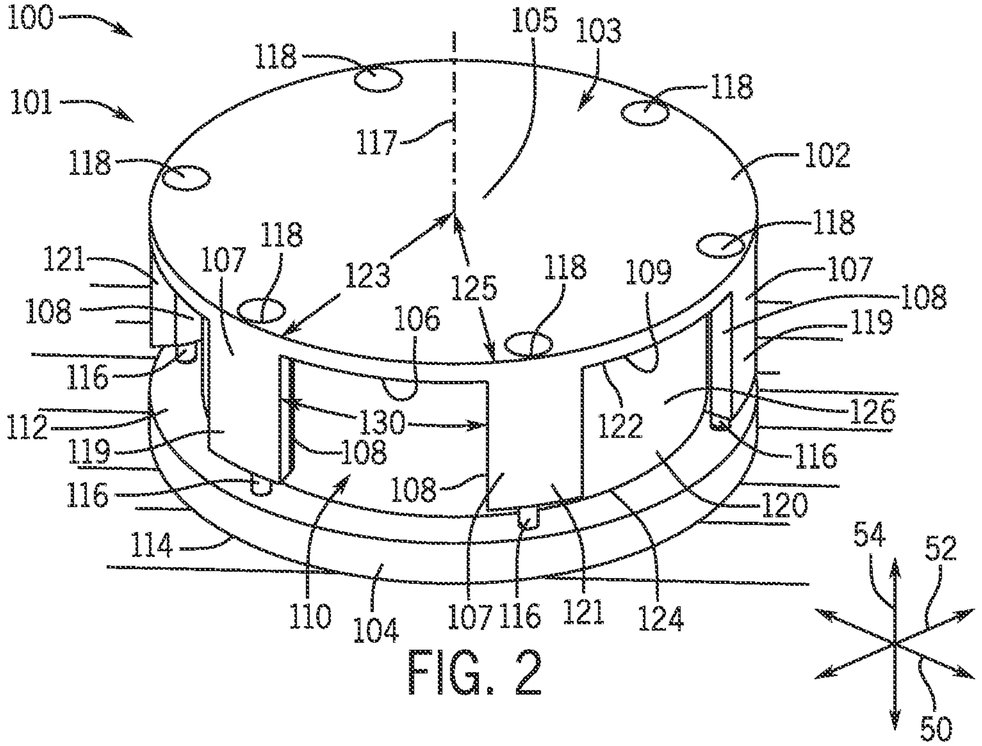
FIG. 2 is a perspective view of an embodiment of a vibration damper, in accordance with an aspect of the present disclosure.

FIG. 2 is a perspective view of an embodiment of a vibration damper 100 (e.g., vibration isolator, vibration isolating device, vibration damping device, vibration damper 28, damping device, isolation device) that may be utilized to damp and/or isolate vibrations within a surrounding environment (e.g., the room 14). For example, the vibration damper 100 may be configured to damp and/or isolate vibrations produced by electronic equipment (e.g., electronic equipment 12), in accordance with the present disclosure. The vibration damper 100 may include a housing 101 having a first portion 102 (e.g., cap, cover, frame, shell, casing, first housing portion) and a second portion 104 (e.g., base, retainer, seat, second housing portion). The first portion 102 may include a main body 103 defining a first surface 105 (e.g., loading surface, upper surface) and a second surface 106 (e.g., compressing surface). The first surface 105 may be configured to engage with and support a structure or a piece of electronic equipment (e.g., electronic equipment 12) positing on the vibration damper 100. In certain embodiments, the first surface 105 may be configured to engage with an additional vibration damper 100, as described in greater detail below. The first portion 102 also includes a number of extensions 107 that extend from the main body 103 (e.g., toward the second portion 104, along a vertical axis 54) about a periphery 109 (e.g., circumference) of the main body 103. Each extension 107 defines a respective bracing surface 108. The main body 103 and the extensions 107 at least partially define a cavity 110 of the vibration damper 100, and the bracing surfaces 108 generally face radially inward toward the cavity 110.

The second portion 104 of the housing 101 may be oriented below the first portion 102 (e.g., relative to vertical axis 54), such that the second portion 104 is oriented in a direction (e.g., horizontal direction relative to first radial axis 50 and/or second radial axis 52) across an open end of the cavity 110. The second portion 104 may also include a first surface 112 (e.g., upper surface, retaining surface) facing and opposing the second surface 106 of the main body 103 and a second surface 114 (e.g., lower surface) on a side of the second portion 104 opposite the first surface 112. The second surface 114 may be configured to rest on a foundation 115 (e.g., floor 24, table, cabinet, flat surface) or on an additional vibration damper, as discussed in greater detail below. In some embodiments, the foundation 115 may correspond to a surface of a record on a record player, as discussed in greater detail below with respect to FIG. 26. The first surface 112 is configured to engage with a viscoelastic ring 120 (e.g., damping member, viscoelastic material) disposed within the cavity 110, as described in greater detail below.

In some embodiments, the first portion 102 and the second portion 104 may be coupled to one another via a plurality of fasteners 116 extending through a plurality of holes 118 formed in the first portion 102 to engage with the second portion 104. The holes 118 may be sized to enable some amount of movement of the fasteners 116 within the holes 118 (e.g., axial movement, radial movement). For example, the fasteners 116 may engage (e.g., loosely engage) the first portion 102 with the second portion 104 without rigidly securing or fixing the first portion 102 and the second portion 104 to one another with no relative movement therebetween. As defined herein, "loosely engage" in reference to the relationship between the first portion 102 and the second portion 104 may refer to the fasteners 116 engaging or coupling the first portion 102 to the second portion 104 such that limited relative movement between the first portion 102 and the second portion 104 is enabled. The loose engagement may enable movement of the second portion 104 relative to the first portion 102 in one or more directions in response to vibrations before contact between at least two of the second portion 104, the first portion 102, or the fasteners 116 restricts further movement of the second portion 104.

In accordance with the present disclosure, the viscoelastic ring 120 (e.g., viscoelastic coupler, annular ring, vibration isolating ring, vibration damping ring) may be disposed within the cavity 110 of the housing 101 in an assembled configuration of the vibration damper 100. The viscoelastic ring 120 may include a first loaded surface 122 (e.g., upper loaded surface), a second loaded surface 124 (e.g., lower loaded surface) opposite the first loaded surface 122, a first unloaded surface 126 (e.g., outer unloaded surface), and a second unloaded surface 128 (e.g., inner unloaded surface). The first loaded surface 122 may be configured to engage with the second surface 106 of the main body 103 of the housing 101, the second loaded surface 124 may be configured to engage with the first surface 112 of the second portion 104 of the housing 101, and the first and second unloaded surfaces 126, 128 extend between (e.g., from and to) the first and second loaded surfaces 122, 124. For example, the first and second unloaded surfaces 126, 128 may extend orthogonally between the first and second loaded surfaces 122, 124. Thus, the viscoelastic ring 120 is disposed within the cavity 110 between the second surface 106 of the first portion 102 and the first surface 112 of the second portion 104 and within the extensions 107. In some embodiments, the first and second loaded surfaces 122, 124 have at least a portion of each that maintain a parallel relationship.

The bracing surfaces 108 are configured to engage the first unloaded surface 126. That is, the bracing surfaces 108 are positioned proximate the first unloaded surface 126 to brace the first unloaded surface 126 as the first unloaded surface 126 begins to deform (e.g., radially outward) in response to compression of the viscoelastic ring 120 between the first and second loaded surfaces 122 and 124. In the illustrated embodiment, the extensions 107 are each spaced apart from one another to form a plurality of gaps 130 therebetween. The extensions 107 are spaced such that a portion (e.g., a substantial portion) of the first unloaded surface 126 can deform (e.g., bulge) radially outward into the gaps 130 in response to compression of the viscoelastic ring 120 between the first and second loaded surfaces 122 and 124. As used herein with reference to the viscoelastic ring 120, the term "compression" refers to a change in shape of the viscoelastic ring 120 when under the compressive force and may not include a change in volume of the viscoelastic ring 120. Indeed, viscoelastic materials may comprise incompressible fluids or materials configured to change shape under load.

As used herein, the term "viscoelastic" may refer to any suitable material exhibiting both viscous and elastic properties. As will be appreciated, viscoelastic materials are non-Newtonian materials that may exhibit time-dependent strain and which dissipate vibration energy through hysteresis when deformed by an applied force. The viscoelastic ring 120 may be made of any viscoelastic material including, but not limited to various rubbers such butyl rubber, nitrile rubber, neoprene, etc.; flexible plastics such as PVC (polyvinyl chloride), polyester, polyether, various silicones or silicone-based materials, or other elastomers. The viscoelastic ring 120 may be manufactured using methods including, but not limited to, casting from a mold or cutting from a sheet stock (e.g., using a waterjet cutter or similar tool) to achieve a desired form. Additionally, it should be noted that each of the vibration dampers (e.g., housing of the vibration dampers) discussed herein may be configured to individually receive and retain one of a number of different viscoelastic rings 120. For example, different viscoelastic rings 120 having varying degrees of stiffness and/or varying shape factors may be individually housed (e.g., disposed within a cavity defined by two or more portions of the housing) within the vibration dampers discussed herein based on the load disposed on the respective vibration damper.

As illustrated, the vibration damper 100 of FIG. 2 has six extensions 107 and corresponding bracing surface 108 with an elongated shape. In some embodiments, the extensions 107 may extend in a direction (e.g., downward direction) along the vertical axis 54 cross-wise from the periphery 109 of the main body 103 of the first portion 102 (e.g., at evenly spaced locations around the periphery 109 (e.g., circumference)). It should be noted however, that different numbers (e.g., two, three, four, five, seven, eight) of extensions 107 may be used with different sizes and spacings between each. Furthermore, the extensions 107 may be configured in different arrangements such as horizontally oriented (e.g., extending in a direction along radial axis 50 and/or radial axis 52) to surround or be disposed about the first unloaded surface 126 or cavity 110. For example, in some embodiments, the extensions 107 may be diagonally oriented to spiral around the first unloaded surface 126 or cavity 110. In other embodiments, the extensions 107 and corresponding bracing surface 108 are spaced from both the main body 103 of the first portion 102 and other adjacent bracing surfaces 108 to form a second plurality of gaps (not shown) between the extensions 107 and the second surface 106 of the first portion 102.

The extensions 107 may extend from the main body 103 of the first portion 102 to at least a location approximately halfway between the first and second loaded surfaces 122 and 124 (e.g., in an assembled configuration of the vibration damper 100). The extensions 107 may be selected in number and size to block, reduce, mitigate, or prevent substantial buckling of the viscoelastic ring 120 when compressed. The extensions 107 may be substantially symmetrically spaced around the first unloaded surface 126 and/or the cavity 110. In some embodiments, the viscoelastic ring 120 is made of a material with a Shore 00 hardness ranging from 20 to 80 durometer. However, in other embodiments, the viscoelastic ring 120 may be formed from other materials of different hardnesses. A higher hardness may result in a higher stiffness of the viscoelastic ring 120. Thus, the hardness of the viscoelastic ring 120 may be selected according to a mass to be vertically supported by the vibration damper 100. A lower durometer may be used for smaller masses, and a higher durometer can be used for greater masses.

In certain embodiments, adjacent extensions 107 may be offset from one another in a radial direction relative to a central axis 117 of the vibration damper 100 (in a direction toward or away from the central axis 117). For example, the vibration damper 100 may include a first portion 119 (e.g., a first subset, a first number) of extensions 107 that extend from the periphery 109 at a first distance 123 from the central axis 117, and a second portion 121 (e.g., a second subset, a second number) of extensions 107 that extend from the periphery 109 at a second distance 125 from the central axis 117, different from the first distance 123. In certain embodiments, the first distance 123 is greater than the second distance 125. That is, in certain embodiments, the second portion 121 of extensions 107 may be closer (e.g., radially inward) to the central axis 117 of the vibration damper 100 relative to the first portion 123 of extensions 107. Thus, as the first unloaded surface 126 begins to deform in response to compression of the viscoelastic ring 120 (e.g., via a force applied along the vertical axis 54), the second portion 121 of the extensions 107 may engage with the first unloaded surface 126 to brace the first unloaded surface 126 before the first unloaded surface 126 engages with the first portion 119 of the extensions 107. As the viscoelastic ring 120 continues to deform (e.g., in response to additional weight added to the surface 105), the first unloaded surface 126 may then engage with the first portion 119 of the extensions 107 to provide additional bracing of the viscoelastic ring 120. In this way, an amount of unloaded surface area of the viscoelastic ring 120 free to bulge (e.g., radially outward relative to the central axis 117) may be increased when the viscoelastic ring 120 is experiencing lighter loads, thereby reducing the shape factor and spring rate. As the viscoelastic ring 120 continues to compress, an amount of contact (e.g., bracing, engagement) between bracing surfaces 108 of the extensions 107 that are already in contact with the viscoelastic ring 120 may increase. Additionally, the viscoelastic ring 120 may eventually come into contact with the radially outward extensions 107 (e.g., second portion 121 of extensions 107, extensions 107 disposed at a greater distance from the central axis 117 relative to extensions 107, such as the first portion 119 of extensions 107, already in contact with the viscoelastic ring 120), thereby increasing an amount of bracing of the viscoelastic ring 120.

It should be noted that in certain embodiments, the vibration damper 100 may include any number of extensions 107 radially offset from one another relative to the central axis 117 (e.g., positioned at different radial distances from the central axis 117) to enable the vibration damper 100 to progressively increase an amount of bracing applied to the first unloaded surface 126 as the weight applied to the surface 105 of the vibration damper 100 increases. For example, the vibration damper 100 may include three, four, five, or more extensions 107 (or sets of extensions) that are positioned about the periphery 109 at a different radial distance from the central axis 117 relative to adjacent extensions 107 (or sets of extensions) disposed about the periphery 109 of the vibration damper 100. The radial distances at which the extensions 107 (or sets of extensions) are positioned from the central axis 117 may be selected based on load demands of the vibration damper 100.

Figure 3:
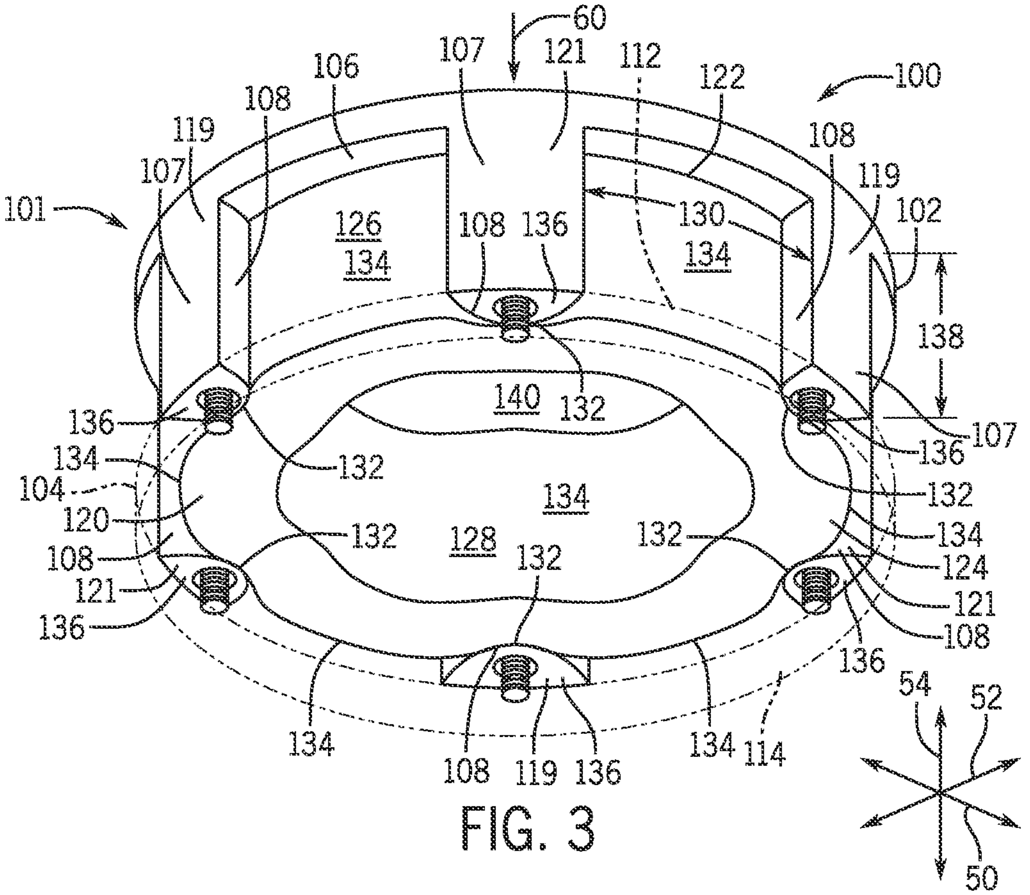
FIG. 3 is a bottom perspective view of an embodiment of the vibration damper of FIG. 2, in accordance with an aspect of the present disclosure.

FIG. 3 is a bottom perspective view of an embodiment of the vibration damper 100, illustrating application of a vertical load 60 to the vibration damper 100. The second portion 104 is shown in phantom lines to allow visibility of the underside of the first portion 102 and the viscoelastic ring 120. The load 60 may represent an impulse force from a vertically oriented vibration or shock. The load 60 may also represent the force of gravity when the first portion 102 of the housing 101 supports a structure or piece of electronic equipment. As the first portion 102 compresses the viscoelastic ring 120 between the first and second loaded surfaces 122 and 124, the bracing surfaces 108 constrain deformation (e.g., bulging) of the first unloaded surface 126. As noted above, in certain embodiments, different extensions 107 may be radially offset from one another relative to the central axis 117, thereby enabling progressive bracing of the vibration damper 100 (e.g., enable the vibration damper 100 to progressively increase bracing of the first unloaded surface 126 as a weight or magnitude of the vertical load 60 is increased). A braced surface area 132 of the viscoelastic ring 120 may be considered or identified as the surface area of the first unloaded surface 126 which contacts the bracing surfaces 108. An unloaded surface area 134 of the viscoelastic ring 120 adjoining and/or extending between adjacent portions of the braced surface area 132 on the first unloaded surface 126 is free from contact by the housing 101 (e.g., free from contact by the bracing surfaces 108). The unloaded surface area 134 is therefore free to deform or bulge outwardly (e.g., radially outwardly) beyond the bracing surfaces 108 in directions along the radial axis 50 and/or the radial axis 52 (e.g., generally parallel to the second surface 106 of the first portion 102).

As illustrated in FIG. 3, portions of the unloaded surface area 134 are oriented between adjacent portions of the braced surface area 132. In some embodiments, portions of the unloaded surface area 134 are oriented between portions of the braced surface area 132 in directions generally parallel to the second surface 106 (e.g., compressing surface) of the first portion 102. In some embodiments, portions of the unloaded surface area 134 are oriented between the second surface 106 of the first portion 102 and at least a portion of the braced surface area 132 in directions crosswise (e.g., perpendicular) to the second surface 106 of the first portion 102. In other embodiments, the unloaded surface area 134 surrounds portions of the braced surface area 132.

In some embodiments, each of the extensions 107 may include a limiting surface 136 (e.g., an abutment surface) that generally extends in a direction (e.g., horizontal direction) along the radial axis 50 and/or the radial axis 52 (e.g., along a horizontal axis). Each of the limiting surfaces 136 may be configured to engage the first surface 112 of the second portion 104 of the housing 101 when the load 60 is large enough to deform the viscoelastic ring 120 by a predetermined distance or a predetermined amount. In the embodiment of FIG. 3, the limiting surfaces 136 are offset downwardly (e.g., relative to gravity, relative to vertical axis 54) from the second surface 106 of the first portion 102 by a distance 138. The distance 138 may be selected based on load demands of the vibration damper 100. The limiting surfaces 136 may be configured to protect the viscoelastic ring 120 from degradation due to over compression, which is described in greater detail below.

In some embodiments, a void 140 (e.g., through hole) extends through the viscoelastic ring 120. FIG. 3 illustrates one void 140 that extends completely through the viscoelastic ring 120, however the viscoelastic ring 120 may include any number of voids 140 (e.g., with varying depths). In some embodiments, the void 140 may be horizontally encapsulated such that the void 140 is fully surrounded in the horizontal plane. In other embodiments, the void 140 is approximately centrally located within the viscoelastic ring 120 (e.g., relative to a central axis of the vibration damper 100). The presence of the void 140 increases the unloaded surface area 134 which is free to deform. In other words, the unloaded surface area 134 is present on both the first unloaded surface 126 and a second unloaded surface 128 defining the void 140.

As noted above, the viscoelastic ring 120 of the present disclosure has a low shape factor. The shape factor may be defined as the ratio of the loaded surface area to the unloaded surface area. The term “loaded surface area” as used herein may be defined as the average of the surface areas of first and second loaded surfaces 122 and 124. As discussed above, shape factor may be used to quantify the ability of a material to react to an applied force by deforming in a direction crosswise (e.g., orthogonally) to the direction of application of the applied force. An increased ability to deform or bulge can promote a low stiffness and can facilitate a low natural frequency.

By forming the viscoelastic ring 120 as an annular ring, the unloaded surface area 134 (e.g., sum of the surface area of the first unloaded surface 126 and the second unloaded surface 128) may be substantially larger than the loaded surface area (e.g., average of the surface areas of the first and second loaded surfaces 122, 124), thereby resulting in a low shape factor viscoelastic ring 120 configured to promote a low natural frequency and achieve a wide bandwidth of vibration isolation and damping. Further, the spaced bracing of the viscoelastic ring 120 by the extensions 107 and bracing surfaces 108 provides structural support for the low shape factor viscoelastic ring 120 such that the viscoelastic ring 120 is limited from buckling under the load 60. Further still, in certain embodiments, by positioning the extensions 107 and corresponding bracing surfaces 108 at different distances (e.g., radial distances) from the central axis 117 of the vibration damper 100, progressive bracing of the viscoelastic ring 120 may be achieved as the load applied to the vibration damper 100 increases. That is, by bracing or restricting portions of the first unloaded surface 126 of the viscoelastic ring 120 using the bracing surfaces 108, the first unloaded surface 126 may still be free to deform or bulge into the gaps 130 while the bracing surfaces 108 limit an amount of buckling of the viscoelastic ring 120. Thus, a lower shape factor for the viscoelastic ring 120 may be effectively used, thereby improving vibration isolation and damping capabilities of the viscoelastic ring 120, as well as improving an audible experience for a listener of audio equipment (e.g., via improved damping and isolation of vibrations), across a wide range of loads. For example, the embodiment of FIG. 3 shows the viscoelastic ring 120 in a tubular shape which yields a shape factor of about 0.17, however other shapes and dimensions can be used. Further, while the viscoelastic ring 120 of FIG. 3 illustrates the first unloaded surface 126 and the second unloaded surface 128 as single surfaces, respectively, the viscoelastic ring 120 may be formed in other shapes such as hexagonal or octagonal having multiple first and second unloaded surfaces 126, 128.

Figure 4:
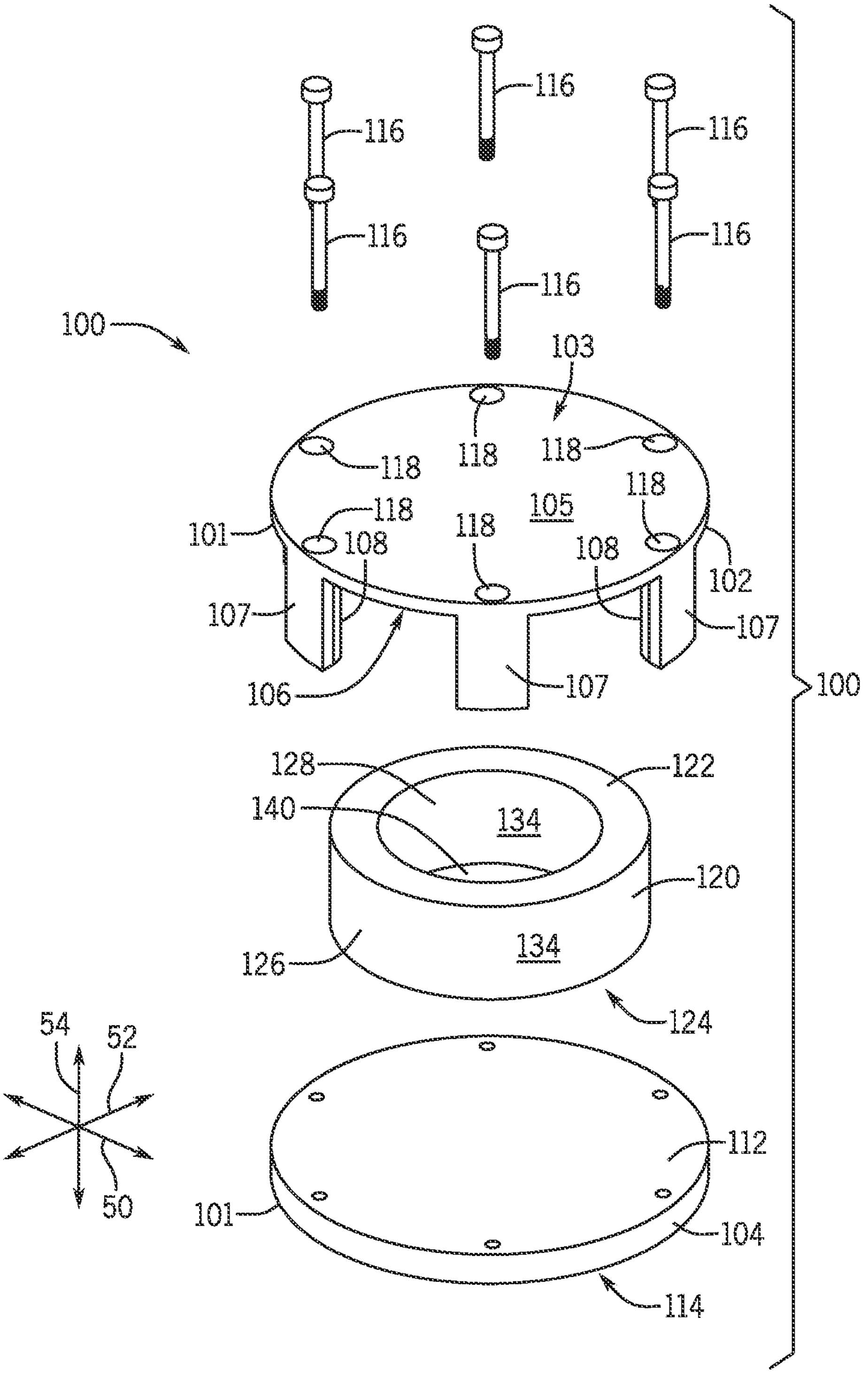
FIG. 4 is an exploded perspective view of an embodiment of the vibration damper of FIG. 2, in accordance with an aspect of the present disclosure.

FIG. 4 is an exploded perspective view of an embodiment of the vibration damper 100. The fasteners 116 are shown as configured to extend through the holes 118 of the first portion 102 of the housing 101 to engage the second portion 104 of the housing 101. While FIG. 4 illustrates six fasteners 116 with corresponding holes 118, other quantities of fasteners 116 may be used. As illustrated, each of the fasteners 116 may extend through a respective extension 107 to loosely couple the first portion 102 of the housing 101 to the second portion 104 of the housing 101. The first portion 102 and the second portion 104 of the housing 101 may be made of any substantially rigid material including, but not limited to steel, steel alloys including stainless steel, aluminum alloys, polymers such as polyoxymethylene (POM), ceramic materials or other materials with suitable (e.g., sufficiently high) rigidity. The first portion 102 may made of a material sufficiently rigid to resist deformation or bulging of the viscoelastic ring 120 (e.g., via the extensions 107). In some embodiments, the first portion 102 and the second portion 104 of the housing 101 may be formed from the same material. However, in other embodiments, the first portion 102 of the housing 101 and the second portion 104 of the housing 101 may be formed from different materials.

Figure 5:
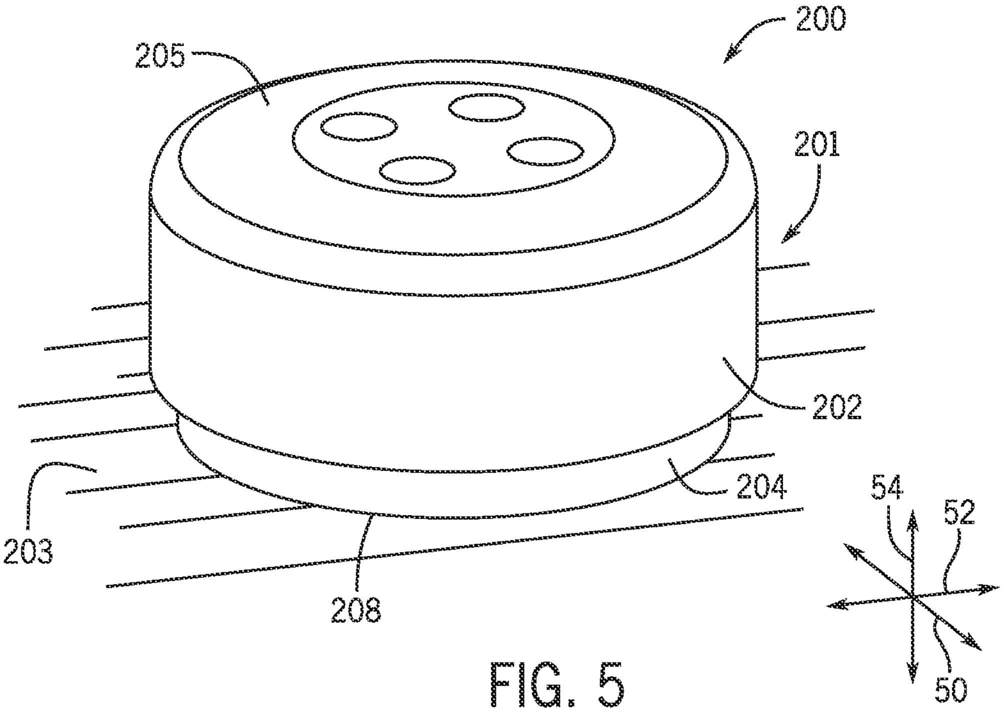
FIG. 5 is a perspective view of an embodiment of a vibration damper, in accordance with an aspect of the present disclosure.

FIG. 5 is a perspective view of an embodiment of a vibration damper 200 (e.g., vibration isolator), in accordance with the present disclosure. The vibration damper 200 includes a housing 201 having a first portion 202 (e.g., upper portion, cover, cap, casing, shell) and a second portion 204 (e.g., lower portion, retainer, base, seat). The first portion 202 and the second portion 204 collectively define a cavity in which an embodiment of the viscoelastic ring 120 may be disposed. That is, the first portion 202 of the housing 201 may be configured to circumferentially surround the viscoelastic ring 120 (e.g., disposed radially outward of the viscoelastic ring 120), and the second portion 204 may be configured to maintain a position of the viscoelastic ring 120 inside the housing 201. In this way, the first portion 202 and the second portion 204 may cooperatively capture and retain the viscoelastic ring 120 within the housing 201.

In some embodiments, a first surface 205 (e.g., upper surface) of the first portion 202 may be configured to support (e.g., vertically support) a structure or piece of electronic equipment (e.g., electronic equipment 12), and a first surface 208 (e.g., lower surface) on the underside of the second portion 204 is configured to rest on a foundation 203 (e.g., flat surface, floor 24). The first portion 202 and the second portion 204 of the housing 201 may not directly contact one another, as described in greater detail below. Further, the first portion 202 and the second portion 204 may be formed from any suitably rigid material including, but not limited to steel, steel alloys including stainless steel, aluminum alloys, polymers such as polyoxymethylene (POM), ceramic materials or other materials with sufficiently high rigidity.

Figure 6:
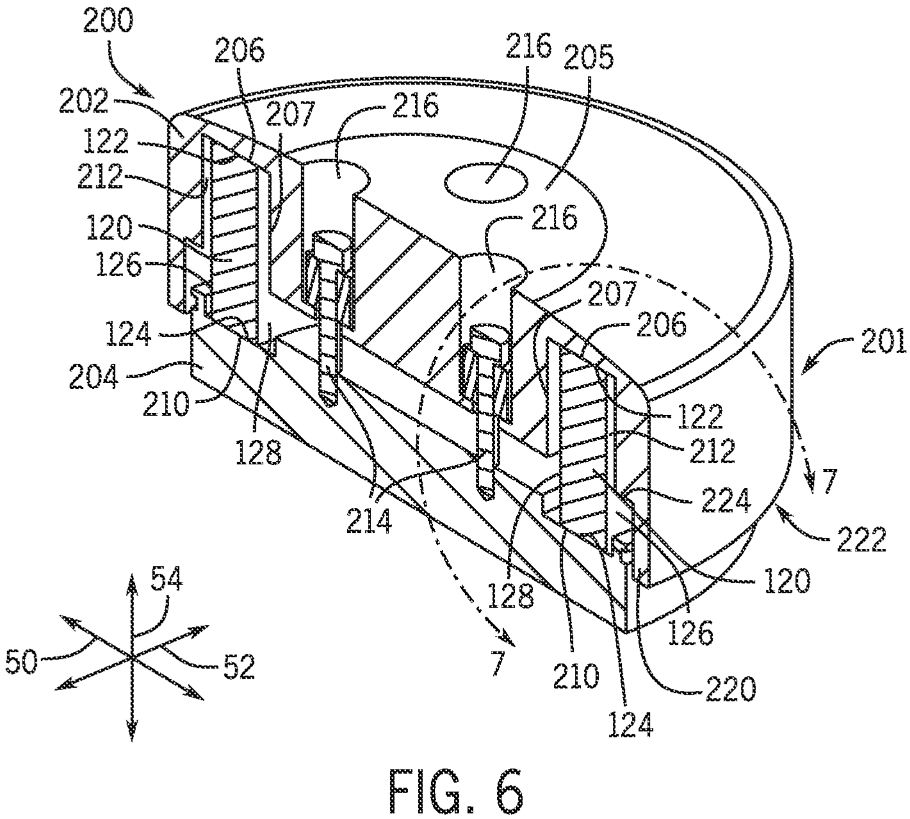
FIG. 6 is a cross-sectional perspective view of an embodiment of the vibration damper of FIG. 5, in accordance with an aspect of the present disclosure.

FIG. 6 is a cross-sectional perspective view of an embodiment of the vibration damper 200. As illustrated, the viscoelastic ring 120 may be disposed within a cavity 212 defined by the first portion 202 and the second portion 204 of the housing 201. That is, the first portion 202 of the housing 201 may include a second surface 206 (e.g., compressing surface, inner surface, lower surface) configured to engage with the first loaded surface 122 of the viscoelastic ring 120, and the second portion 204 of the housing 201 may include a second surface 210 (e.g., retaining surface, upper surface) configured to engage with the second loaded surface 124 of the viscoelastic ring 120. In some embodiments, the second surface 206 of the first portion 202 and the second surface 210 of the second portion 204 extend generally parallel to one another. Thus, the viscoelastic ring 120 is disposed within the cavity 212 between the second surface 206 of the first portion 202 and the second surface 210 of the second portion 204. In some embodiments, the first portion 202 may also include a third surface 207 configured to at least partially define the cavity 212. That is, the third surface 207 may extend in a direction (e.g., vertical direction) along the vertical axis 54 and may be configured to engage with the second unloaded surface 128 (e.g., inner unloaded surface) of the viscoelastic ring 120 to provide structural stability to the viscoelastic ring 120. As illustrated, the first unloaded surface 126 (e.g., outer unloaded surface) and the second unloaded surface 128 (e.g., inner unloaded surface) both remain substantially free to deform (e.g., radially outwardly) in response to compression of the viscoelastic ring 120 between the second surface 206 of the first portion 202 and the second surface 210 of the second portion 204 (e.g., upon application of a force or load to the first portion 202 of the housing 201). In some embodiments, the second portion 204 is positioned below the first portion 202 across the open end of the cavity 212, and the first portion 202 is configured to surround (e.g., circumferentially surround) an upper portion of the second portion 204.

In some embodiments, a plurality of fasteners 214 couples the second portion 204 to the first portion 202 of the housing 201 (e.g., in a loose engagement) by extending through a plurality of holes 216 (e.g., counterbored through holes) extending through the first portion 202. The fasteners 214 may be configured to detachably or removably engage with the second portion 204. In other embodiments, the fasteners 214 may be configured to permanently engage with the second portion 204 of the housing 201. The holes 216 may be sized in diameter and/or depth such that some relative movement between the second portion 204 and the first portion 202 of the housing 201 is enabled before the holes 216 and the fasteners 214 disposed therein engage with one another to restrict further relative movement between the second portion 204 and the first portion 202 of the housing 201. The first portion 202 of the housing 201 may limit movement of the second portion 204 under tension by restricting the distance that the fasteners 214 (and by extension the second portion 204) may translate in a downward direction (e.g., relative to vertical axis 54) away from the first portion 202 of the housing 201 before contacting the bottom of the holes 216. This may reduce potential of the second portion 204 being inadvertently removed from the first portion 202. In some embodiments, an extension 220 (e.g., vertical extension, annular extension) extends along a perimeter 222 (e.g., circumference) of the first portion 202 to limit lateral (e.g., horizontal) movement of the second portion 204 and/or first portion 202 relative to one another when under lateral forces. Further, a limiting surface 224 extending from the extension 220 limits upward translation of the second portion 204 towards the first portion 202 and/or downward translation of the first portion 202 toward the second portion 204 when the vibration damper 202 is under compression forces (e.g., along vertical axis 54). Limiting the movement of the second portion 204 relative to the first portion 202 may limit the viscoelastic ring 120 from being compressed or sheared beyond a rated or designed amount for the viscoelastic material of the viscoelastic ring 120, while also protecting the viscoelastic ring 120 from degradation and improving stability of the vibration damper 200.

Figure 7:
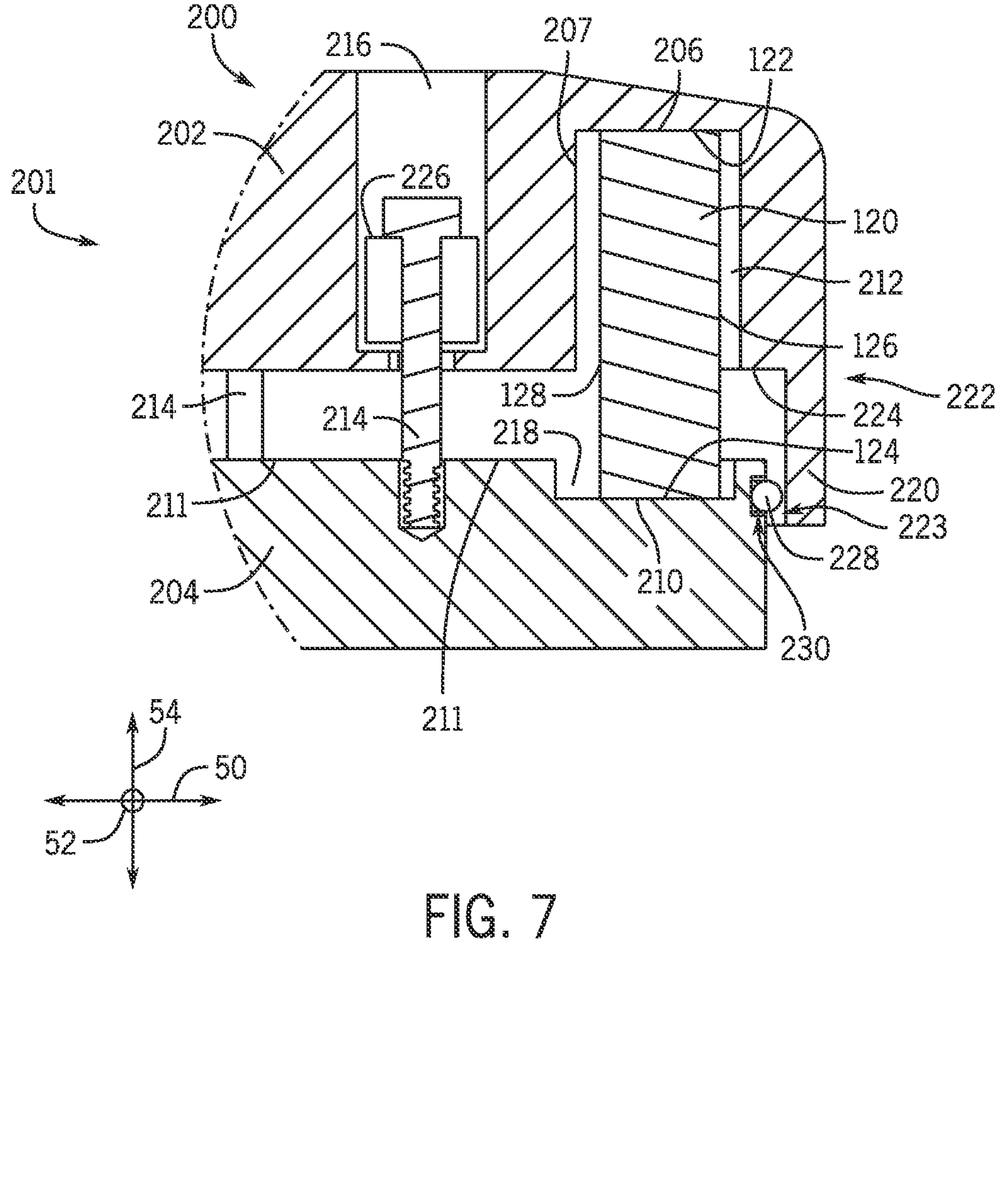
FIG. 7 is an expanded cross-sectional side view, taken within line 7-7 of FIG. 6, of an embodiment of the vibration damper of FIG. 6, in accordance with an aspect of the present disclosure.

FIG. 7 is an expanded cross-sectional side view of the vibration damper 200, taken within line 7-7 of FIG. 6. As illustrated, the viscoelastic ring 120 may be disposed within the cavity 212. The second surface 206 of the first section 202 of the housing 201 engages with the first loaded surface 122 of the viscoelastic ring 120, and the second surface 210 of the second portion 204 of the housing 201 engages with the second loaded surface 124 of the viscoelastic ring 120. The second surface 210 of the second portion 204 may be defined by a recess 218 formed in the second portion 204. That is, the second portion 204 may include a third surface 211 (e.g., raised surface) having the recess 218 formed therein and that defines the second surface 210 of the second portion 204. By positioning the second loaded surface 124 of the viscoelastic ring 120 within the recessed portion 218 such that the second loaded surface 124 engages with the second surface 210 of the second portion 204, a height of the vibration damper 200 may be reduced. Further, in some embodiments, while the first loaded surface 122 of the viscoelastic ring 120 is configured to engage with the second surface 206 of the first portion 202 and the second loaded surface 124 is configured to engage with the second surface 210 of the second portion 204, the viscoelastic ring 120 may also be removable from the first portion 202 and the second portion 204 to facilitate replacement of the viscoelastic ring 120.

As illustrated in FIG. 7, a plurality of resilient members (e.g., bushings, gaskets, O-rings) may be interposed between at least two of: the first portion 202, the second portion 204, or the fasteners 214. For example, a plurality of first resilient members 226 (e.g., bushings, annular bushings, rings) may be disposed about the fasteners 214, such that the first resilient members 226 are disposed between (e.g., radially between) the holes 216 extending through the first portion 202 of the housing 201 and the fasteners 214. In some embodiments, a second resilient member 228 (e.g., O-ring) may be positioned within a groove 230 formed in the second portion 204 and extending about a perimeter 223 (e.g., circumference) of the second portion 204. In an assembled configuration of the vibration damper 200, the second resilient member 228 may be held in place between (e.g., radially between) the second portion 204 and the extension 220. In the illustrated configuration, the first resilient members 226 and the second resilient member 228 are positioned to limit lateral movement of the first portion 202 relative to the second portion 204 (e.g., along axes 50 and 52). Specifically, the first resilient members 226 may be captured within the holes 216 by the first portion 202 and may engage with the first portion 202 and/or react against the fasteners 214 to limit lateral movement of the first portion 202 relative to the second portion 204. The second resilient member 228 is positioned radially between and may engage with each of the second portion 204 and the extension 220 to restrict lateral movement of the first portion 202 relative to the second portion 204. The first and second resilient members 226, 228 may be formed from a resilient material including, but not limited to, various rubbers, such butyl rubber, neoprene, etc., silicones or silicone-based materials, or other suitable elastomers. In some embodiments, the first resilient members 226 may be formed from the same material as the second resilient member 228. However, the first resilient members 226 and the second resilient member 228 may be formed from different materials in other embodiments.

Figure 8:
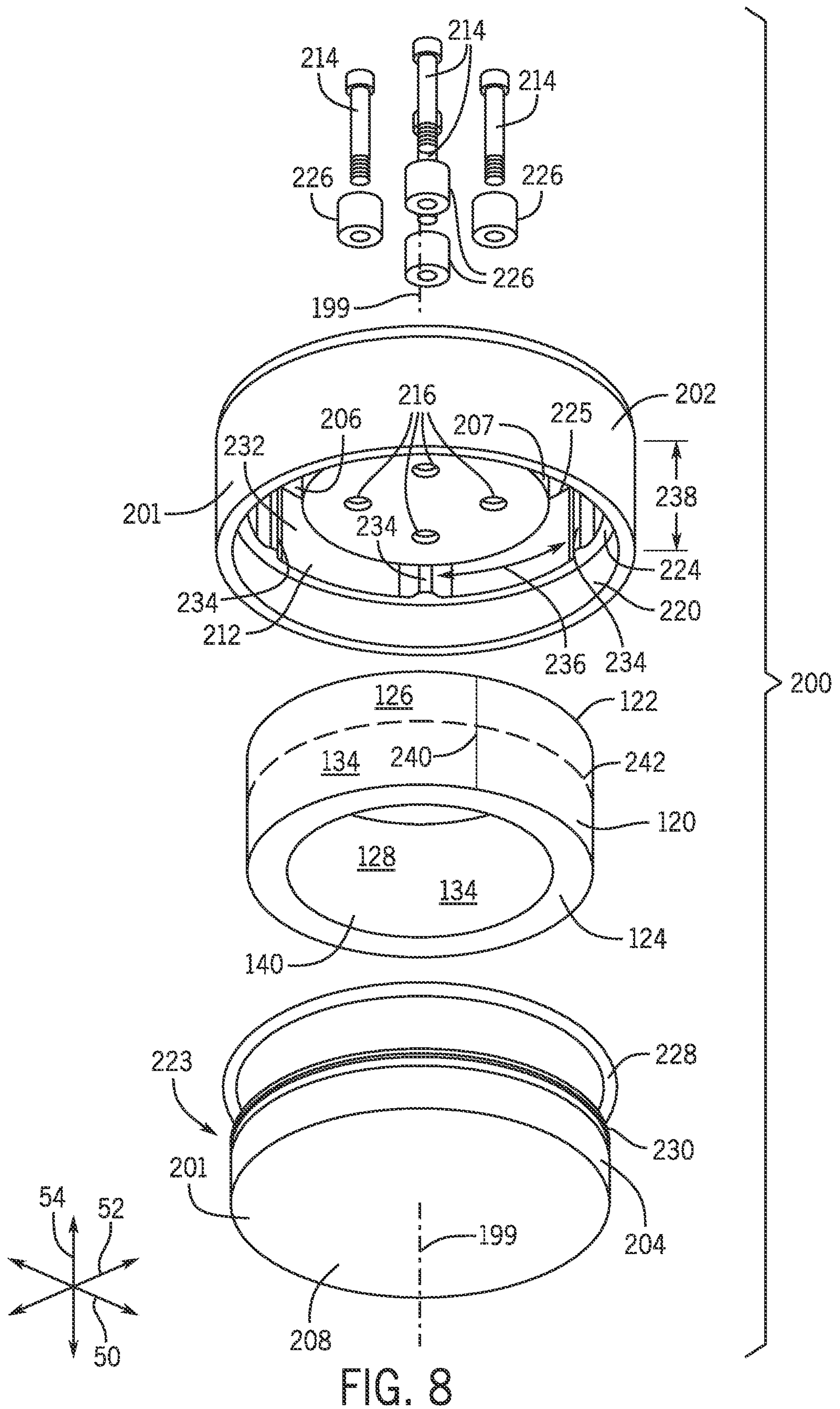
FIG. 8 is an exploded perspective view of an embodiment of the vibration damper of FIG. 5, in accordance with an aspect of the present disclosure.

FIG. 8 is an exploded perspective view of an embodiment of the vibration damper 200. In some embodiments, the fasteners 214 extending through the holes 216 may remain accessible from an exterior of the vibration damper 200. Thus, the fasteners 214 may be disengaged from the second portion 204 of the housing 201 (e.g., to disassemble the vibration damper 200), as desired. By disengaging the fasteners 214 from the second portion 204 of the housing 201, the second portion 204 may be disengaged and/or separated from the first portion 202 of the housing 201. With the second portion 204 and the first portion 202 of the housing 201 decoupled from one another, the viscoelastic ring 120 may be removed from the cavity 212 and replaced with another viscoelastic ring 120, such as an embodiment of the viscoelastic ring 120 having a different stiffness and/or different dimensions. Accordingly, a single embodiment of the vibration damper 200 may be utilized for a wide range of load masses (e.g., different electronic equipment 12) by replacing the viscoelastic ring 120 with another viscoelastic ring 120 having different characteristics and/or properties (e.g., stiffness, dimensions).

In some embodiments, the cavity 212 may be at least partially defined by a recessed surface 232 (e.g., inner diameter, radially-inward surface, etc.) extending from a periphery 225 (e.g., circumference) of the second surface 206 of the first portion 202 of the housing 201. In the illustrated embodiment, the recessed surface 232 is generally cylindrical in geometry and is configured to circumferentially surround the first unloaded surface 126 of the viscoelastic ring 120. However, in other embodiments, the recessed surface 232 may have other shapes or geometries, such as square, hexagonal, or octagonal. The recessed surface 232 includes a plurality of elongated bracing surfaces 234 (e.g., protrusions, ridges) protruding radially inward towards the viscoelastic ring 120 in the assembled configuration. The bracing surfaces 234 are arranged to protrude radially inward towards the viscoelastic ring 120 such that the bracing surfaces 234 contact or come substantially close to contacting the first unloaded surface 126 of the viscoelastic ring 120 (e.g., in an assembled, unloaded configuration of the vibration damper 200).

As illustrated in FIG. 8, the bracing surfaces 234 may extend in a direction (e.g., radial direction relative to a central axis 199 of the vibration damper 200) cross-wise to the recessed surface 232 and may be positioned (e.g., at equally spaced locations) about the recessed surface 232 (about a circumference of the recessed surface 232). The bracing surfaces 234 may protrude from the recessed surface 232 by a distance that reduces contact between the first unloaded surface 126 and the recessed surface 232 when the vibration damper 200 is under load. For example, when the vibration damper 200 is under loading and the viscoelastic ring 120 is deformed or bulged in response to compression between the first and second loaded surfaces 122 and 124, the bracing surfaces 234 may engage with the first unloaded surface 126 bulging radially outward and may block, reduce, or substantially prevent contact between the first unloaded surface 126 and the recessed surface 232. In some embodiments, the bracing surfaces 234 may be spaced or offset from the second surface 206 of the first portion 202 of the housing 201 (e.g., along the vertical axis 54). The bracing surfaces 234 may additionally or alternatively be spaced apart from adjacent bracing surfaces 234 to form a plurality of gaps 236 between adjacent bracing surfaces 234. In such embodiments, at least a portion of the recessed surface 232 extending between adjacent bracing surfaces 234 is recessed away (e.g., radially outward) from the first unloaded surface 126 of the viscoelastic ring 120. Thus, portions of the recessed surface 232 extending between the adjacent bracing surfaces 234 form the gaps 236 into which the first unloaded surface 126 may deform or bulge under loading conditions.

In certain embodiments, the bracing surfaces 234 may extend from the recessed surface 232 toward the central axis 199 of the vibration damper 200 by different distances (e.g., radial distances). For example, in certain embodiments, the vibration damper 200 may include a first number of bracing surfaces 234 that extend from the recessed surface 232 and toward the central axis 199 of the vibration damper 200 by a first distance (e.g., a first radial distance), and may include a second number of bracing surfaces 234 that extend from the recessed surface 232 toward the central axis 199 of the vibration damper 200 by a second distance (e.g., second radial distance) that is different from the first distance. In certain embodiments, the first distance may be greater than the second distance. Thus, as the first unloaded surface 126 begins to deform in response to compression of the viscoelastic ring 120, the second number of the bracing surfaces 234, which extend a greater radial distance from the recessed surface 232 toward the central axis 199 of the vibration damper 200, may engage with the first unloaded surface 126 to brace the first unloaded surface 126 before the first unloaded surface 126 engages with the first number of the bracing surfaces 234. As the viscoelastic ring 120 continues to deform (e.g., in response to a greater load) the first unloaded surface 126 may then engage with the first number of the bracing surfaces 234 to provide additional bracing of the viscoelastic ring 120. In this way, an amount of unloaded surface area free to bulge may be increased when the viscoelastic ring 120 is under lighter loads, thereby reducing the shape factor and spring rate.

In the illustrated embodiment of FIG. 8, the bracing surfaces 234 are elongated in a generally vertical direction (e.g., along vertical axis 54) and extend from the second surface 206 of the first portion 202. The bracing surfaces 234 may extend a distance 238 (e.g., height) toward the second portion 204 of the housing 201. The first and second unloaded surfaces 126, 128 of the viscoelastic ring 120 may extend a distance 240 (e.g., height) between the first and second loaded surfaces 122, 124. In some embodiments, the distance 238 of the bracing surfaces 236 may be at least half of the distance 240, such that the bracing surfaces 234 extend to a location around or beyond a center line 242 of the viscoelastic ring 120 between the first and second loaded surfaces 122 and 124 in an assembled configuration of the vibration damper 200. In this way, the bracing surfaces 234 may provide bracing and/or support for the first unloaded surface 126 across at least half of the distance 240 between the first and second loaded surfaces 122, 124, thereby reducing potential for buckling of the viscoelastic ring 120 under loading conditions. It should be noted that, in some embodiments, the bracing surfaces 234 may be arranged in other configurations. For example, the bracing surfaces 234 may extend latitudinally (e.g., at least partially about a circumference or inner diameter of the recessed surface 232, horizontally, helically), spirally, or in any other suitable configuration in a spaced arrangement about the first unloaded surface 126.

Further, as noted above, in certain embodiments, different bracing surfaces 234 may extend radially inward toward the central axis 199 of the vibration damper 200 by different distances (e.g., radial distances) relative to adjacent bracing surfaces 234, thereby providing a progressive increase in bracing as the load on the vibration damper 200 progressively increases. That is, as the load increases, additional bracing surfaces 234 that are disposed radially outward (e.g., extend a shorter radial distance away from the recessed surface 232) from the central axis 199 relative to other bracing surfaces 234 that are disposed relatively radially inward (e.g., extend a greater radial distance away from the recessed surface 232) may engage with the first unloaded surface 126, thereby increasing an amount of bracing and support applied to the viscoelastic ring 120. The circumscription of the first unloaded surface 126 by the bracing surfaces 234 may enable alignment of the viscoelastic ring 120 along the central axis 199 (e.g., of the housing 201), such that the first unloaded surface 126 maintains an approximately equidistant spacing from the recessed surface 232. Further, in some embodiments, bracing surfaces may be disposed on the third surface 207 of the first portion 202 of the housing 201 and may be configured to engage with the second unloaded surface 128 of the viscoelastic ring 120. Bracing surfaces disposed on the third surface 207 and configured to engage with the second unloaded surface 128 of the viscoelastic ring 120 may facilitate deformation of the viscoelastic ring 120 in a radially outward direction and/or limit deformation of the viscoelastic ring 120 in a radially inward direction.

Figure 9:
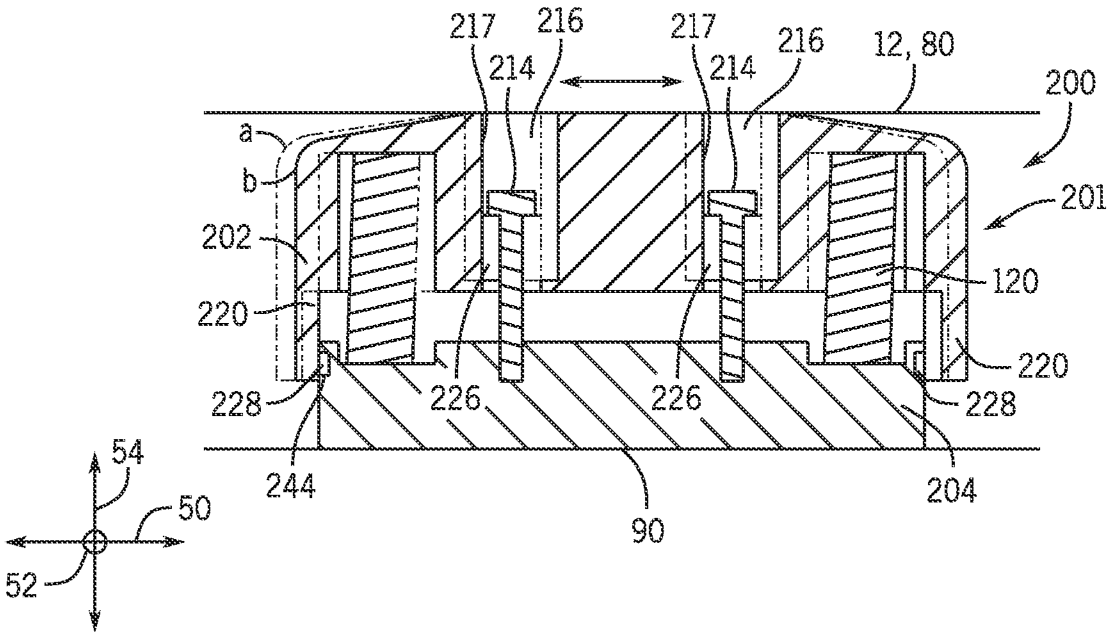
FIG. 9 is a cross-sectional side view of an embodiment of a vibration damper, illustrating application and distribution of a horizontal force, in accordance with an aspect of the present disclosure.
Figure 10:
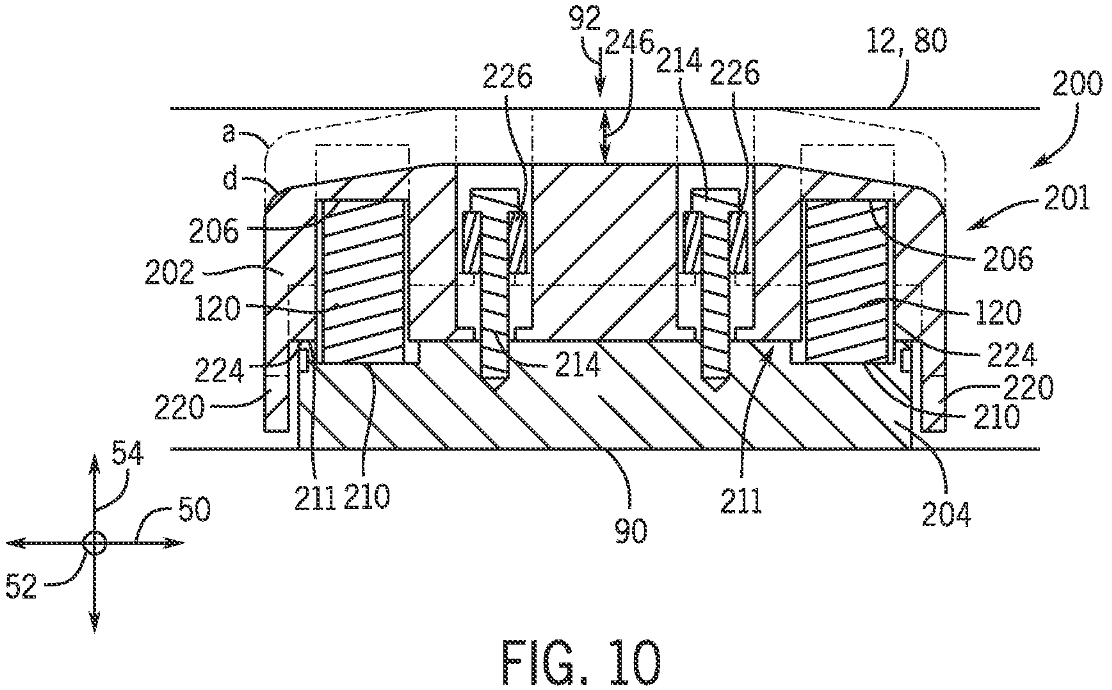
FIG. 10 is a cross-sectional side view of an embodiment of a vibration damper, illustrating application and distribution of a vertical force, in accordance with an aspect of the present disclosure.

FIGS. 9 and 10 are cross-sectional side views of embodiments of the vibration damper 200, illustrating application and distribution of forces applied to the vibration damper 200 by a load. In particular, the vibration damper 200 is shown as arranged on a foundation 90 (e.g., floor 24) and a component 80 (e.g., electronic equipment 12) disposed on top of the vibration damper 200, such that the vibration damper 200 supports a weight of the component 80. Turning first to FIG. 9, in some embodiments, the vibration damper 200 may undergo application of forces in a generally horizontal or lateral direction, which may cause the viscoelastic ring 120 to deform under shear loading. As illustrated, the fasteners 214 loosely engage the first portion 202 of the housing 201 to the second portion 204 of the housing 201, in the manner described above, such that the first portion 202 may translate laterally or horizontally relative to the second portion 204 of the housing 201 (e.g., along axes 50 and/or 52). In the illustrated embodiment of FIG. 9, the first portion 202 of the housing 201 may translate in a lateral direction between a first horizontal position "a" and a second horizontal position "b" in response to relative lateral movement between the component 80 and the foundation 90, lateral forces induced by the component 80 and/or foundation 90, and/or vibrations transmitted by the component 80 and/or foundation 90.

As the first portion 202 of the housing 201 translates laterally from the first lateral position "a" to the second lateral position "b," the extension 220 of the first portion 202 of the housing 201 engages the second portion 204 of the housing 201 at a contact point 244. The contact between the second portion 204 of the housing 201 and the first portion 202 of the housing 201 limits lateral translation of the first portion 202 of the housing 201 beyond the first and second lateral positions "a" and "b." By limiting the lateral translation of the first portion 202 of the housing 201 relative to the second portion 204 of the housing 201, the stability and structural integrity of the viscoelastic ring 120 may be improved. That is, the first and second lateral positions "a" and "b" may correspond to positional thresholds beyond which the viscoelastic ring 120 may be vulnerable to buckling or undesired deformation. Thus, by limiting lateral deflection beyond the first and second lateral positions "a" and "b," the likelihood of the viscoelastic ring 120 buckling or inelastically deforming may be reduced, thereby increasing the stability and longevity of the viscoelastic ring 120. Further, the first resilient members 226 (e.g., bushings) and the second resilient member 228 (e.g., O-ring) may further react against the lateral translation of the first portion 202 of the housing 201 in the first and second lateral positions "a" and "b." That is, as the first portion 202 of the housing 201 translates lateral from the first lateral position "a" to the second lateral position "b," the first resilient members 226 may engage with an inner surface 217 of the holes 216 and apply a repelling or reactive force against the inner surface 217 of the holes 216. Similarly, as the first portion 202 of the housing 201 translates laterally from the first lateral position "a" to the second lateral position "b," the second resilient member 228 may engage with the extension 220 and apply a repelling or reactive force against the extension 220. The repelling forces applied by the first and second resilient members 226, 228 may return the first portion 202 of the housing 201 to a position approximately centered between the first and second lateral positions "a" and "b" (e.g., following a vibration or other laterally oriented force experienced by the vibration damper 200).

Referring now to FIG. 10, in some embodiments, the vibration damper 200 may be subjected to forces or loads in a vertical direction (e.g., along vertical axis 54), whereby the viscoelastic ring 120 may deform under compression loading. As illustrated, the first portion 202 of the housing 201 may translate generally vertically relative to the second portion 204 of the housing 201 between a first vertical position "c" and a second vertical position "d." As the first portion 202 of the housing 201 translates from the first vertical position "c" to the second vertical position "d" under a load 92 (e.g., a vertical load, a downward load), the viscoelastic ring 120 may be compressed between the second surface 206 (e.g., compressing surface) of the first portion 202 of the housing 201 and the second surface 210 (e.g., retaining surface) of the second portion 204 of the housing 201. The load 92 may represent a force applied in a generally vertical and/or downward direction (e.g., a vertically oriented vibration or shock). In some embodiments, the load 92 may additionally or alternatively represent the static force of gravity when the first portion 202 of the housing 201 supports a weight of the component 80. The first vertical position "c" corresponds to a position of the first portion 202 of the housing 201 before the load 92 is applied. As the first portion 202 of the housing 201 translates downward under the load 92, the limiting surface 224 may contact the third surface 211 of the second portion 204 of the housing 201, thereby blocking further compression of the viscoelastic ring 120 beyond compression associated with the second vertical position "d."

A distance or dimension between the first and second vertical positions "c" and "d" therefore may represents a distance 246 referred to hereafter as the "maximum compression distance" by which the viscoelastic ring 120 may be vertically compressed via application of the load 92. In some embodiments, the first portion 202 of the housing 201 may be configured such that the maximum compression distance 246 is about 20 percent or less than a distance or dimension between the second surface 206 (e.g., compressing surface) of the first portion 202 of the housing 201 and the second surface 210 of the second portion 204 of the housing 201 when the viscoelastic ring 120 is uncompressed at the first vertical position "c" (e.g., when the load 92 is not applied). The maximum compression distance 246 of 20 percent of the distance between the second surface 206 of the first portion 202 of the housing 201 and the second surface 210 of the second portion 204 of the housing 201 may approximately correspond to the maximum rated distance for static compression of some viscoelastic materials. Accordingly, limiting compression of the viscoelastic ring 120 by the maximum compression distance 246 may limit or reduce static fatigue degradation to the viscoelastic ring 120 that may otherwise be caused by applying a load greater than desired for a particular embodiment of the viscoelastic ring 120 (e.g., a load greater than a threshold load associated with a stiffness of the viscoelastic ring 120).

Figure 11:
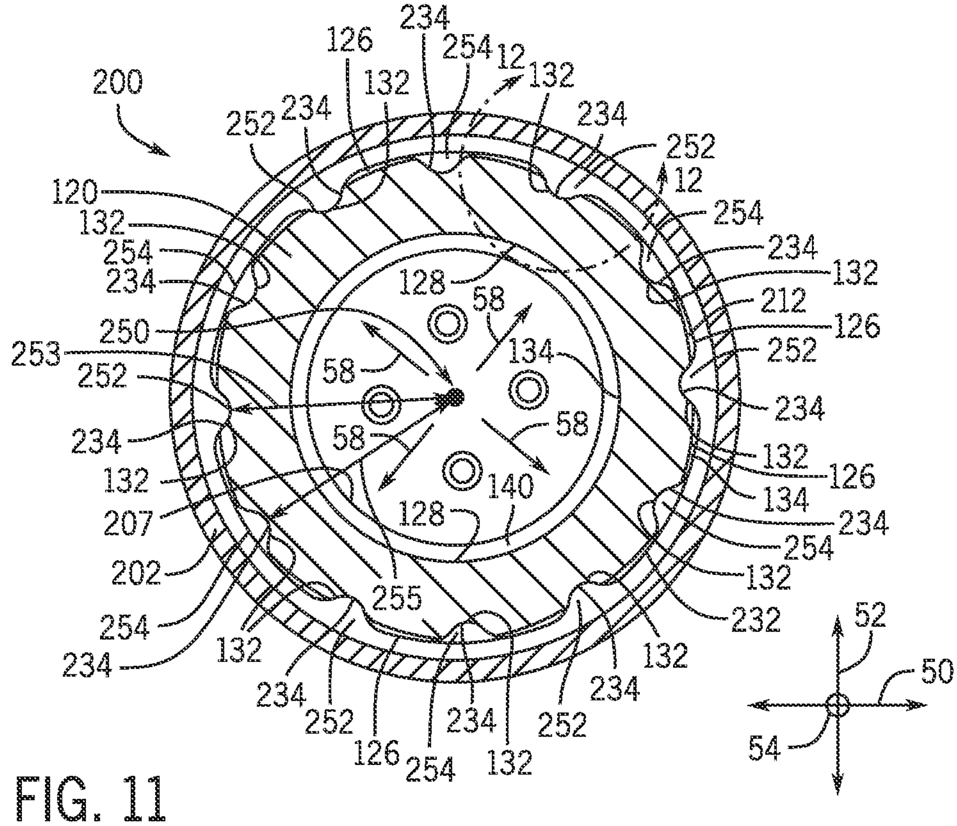
FIG. 11 is a cross-sectional top view of an embodiment of a vibration damper, in accordance with an aspect of the present disclosure.

FIG. 11 is a top cross-sectional view of an embodiment of the vibration damper 200, illustrating the vibration damper 200 under loading, such as from the weight of a piece of electronic equipment (e.g., component 80 of FIG. 10). As described above with reference to FIG. 8, the viscoelastic ring 120 may be circumferentially surrounded by the recessed surface 232 of the first portion 202 of the housing 201. The plurality of bracing surfaces 234 may protrude from the recessed surface 232 into the cavity 212 to contact the viscoelastic ring 120 as the viscoelastic ring 120 deforms under loading (e.g., by a vertical load). In accordance with the present techniques, the viscoelastic ring 120 may have a low shape factor and may include the void 140, and the viscoelastic ring 120 may therefore experience greater deformation (e.g., bulging) in a radially outward direction 58. In some embodiments, the first unloaded surface 126 may experience greater deformation (e.g., elastic deformation) outward in the direction 58 than the second unloaded surface 128 experiences in a radially inward direction (e.g., in a direction opposite to outward direction 58, toward a central axis of the viscoelastic ring 120) when compressed. As the viscoelastic ring 120 experiences bulging or deformation under compression, the bracing surfaces 234 may engage (e.g., brace, support) the first unloaded surface 126 of the viscoelastic ring 120 along the braced surface area 132. The unloaded surface area 134 remains free to bulge (e.g., expand, deform) in the direction 58 between adjacent portions of the braced surface area 132, as well as deform radially inward along the second unloaded surface 128 (e.g., inner unloaded surface). As illustrated, the unloaded surface area 134 of the viscoelastic ring 120 may deform or bulge outward around and/or along the bracing surfaces 234 in response to compression of the viscoelastic ring 120, as described in greater detail below.

Further, as noted above, in certain embodiments, different bracing surfaces 234 may extend radially inward from the recessed surface 232 by different distances (e.g., radial distances) toward a central axis 250 (e.g., in a direction opposite the direction 58) of the vibration damper 200). For example, a first set 252 (e.g., first number) of the bracing surfaces 234 may extend from the recessed surface 232 such that the first set 252 of the bracing surfaces 234 are spaced a first distance 253 from the central axis 250 of the vibration damper 200. A second set 254 (e.g., second number) of the bracing surfaces 234 may extend from the recessed surface 232 such that the second set 254 of the bracing surfaces 234 are spaced a second distance 255 from the central axis 250 of the vibration damper 200. The second distance 255 may be greater than the first distance 253 such that under lighter loads, the first unloaded surface 126 of the viscoelastic ring 120 may engage with the first set 252 of the bracing surfaces 234 without engaging the second set 254 of the bracing surfaces 234. As the load increases and the viscoelastic ring 120 continues to compress and deform radially outward, the viscoelastic ring 120 may engage with the second set 254 of the bracing surfaces 234, thereby increasing an amount of bracing applied to the viscoelastic ring 120. In this way, a progressive increase in bracing of the viscoelastic ring 120 may be achieved as the load applied to the vibration damper 200 increases.

Figure 12:
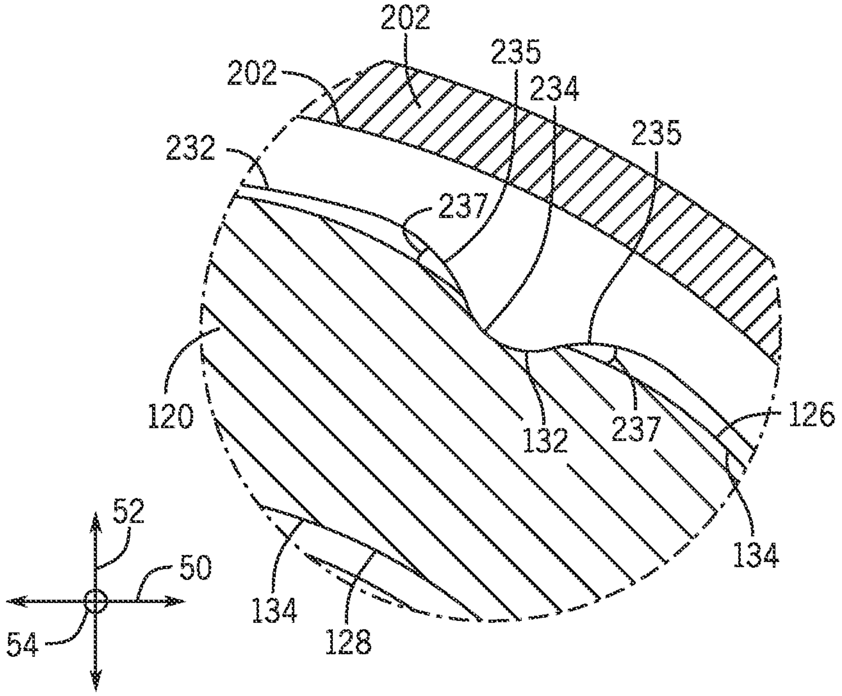
FIG. 12 is an expanded cross-sectional top view, taken within line 12-12 of FIG. 11, of an embodiment of the vibration damper of FIG. 11, in accordance with an aspect of the present disclosure.

FIG. 12 is an expanded, top cross-sectional view, taken within line 12-12 of FIG. 11, of an embodiment of the vibration damper 200. In some embodiments, the bracing surfaces 234 may include one or more tapered surfaces 235 (e.g., sloped surfaces, angled edges, sloped, angled, tapered sides). The tapered surfaces 235 may slope away from the bracing surfaces 234, such that an acute angle 237 is formed between the tapered surfaces 235 and the braced surface area 132 (e.g., the viscoelastic ring 120) on opposite sides of the bracing surface 234. As the viscoelastic ring 120 bulges (e.g., expands) radially outward towards the recessed surface 232, the braced surface area 132 of the viscoelastic ring 120 in contact with the bracing surfaces 234 progressively increases. That is, the tapered surfaces 235 may gradually contact an increased amount of the viscoelastic ring 120 as the viscoelastic ring 120 bulges further under further compression. Thus, as the braced surface area 132 increases, the unloaded surface area 134 that remains free (e.g., unrestrained) to bulge correspondingly decreases. This decrease in the unloaded surface area 134 may enable and/or provoke a higher effective stiffness for the viscoelastic ring 120. Further, the progressive increase in stiffness corresponding to an increase in compression (e.g., increase in compressive force, vertical loading) of the viscoelastic ring 120 may progressively reduce the rate of decrease in the natural frequency of the vibration damper 200 (e.g., as the load supported by the vibration damper 200 increases in mass). As a result, variations in the vibration isolation capability of the vibration damper 200 when supporting electronic equipment of different masses may be advantageously reduced. In some embodiments, the increase in the stiffness of the viscoelastic ring 120 due to the increase in the amount of the braced surface area 132 may be such that, as the mass of the load is increased, the natural frequency of the vibration damper 200 may remain approximately constant over a particular electronic equipment 12 weight range. Thus, the vibration isolation ability of the vibration damper 200 may be made substantially constant across a range weights of electronic equipment 12.

In some embodiments, the tapered surfaces 235 may slope away from a center (e.g., point, apex) of the bracing surfaces 234, such that the bracing surfaces 234 form a ridge shape. Further, a magnitude of the acute angle 237 may be adjusted (e.g., via modification of a slope or geometry of the tapered surfaces 235) to modify the natural frequency of the vibration damper 200. For example, the slope or geometry of the tapered surfaces 235 may be adjusted to provide an increase in the acute angle 237 formed between the tapered surfaces 235 and the braced surface area 132 to reduce the rate of increase of the braced surface area 132 as the viscoelastic ring 120 compresses and deforms or bulges radially outward, thereby increasing the variability of the natural frequency of the vibration damper 200. Conversely, the slope or geometry of the tapered surfaces 235 may be adjusted to provide a decrease in the acute angle 237 to increase the rate of increase of the braced surface area 132 as the viscoelastic ring 120 compresses and deforms or bulges radially outward, thereby decreasing the variability of the natural frequency of vibration damper 200.

Figure 13:
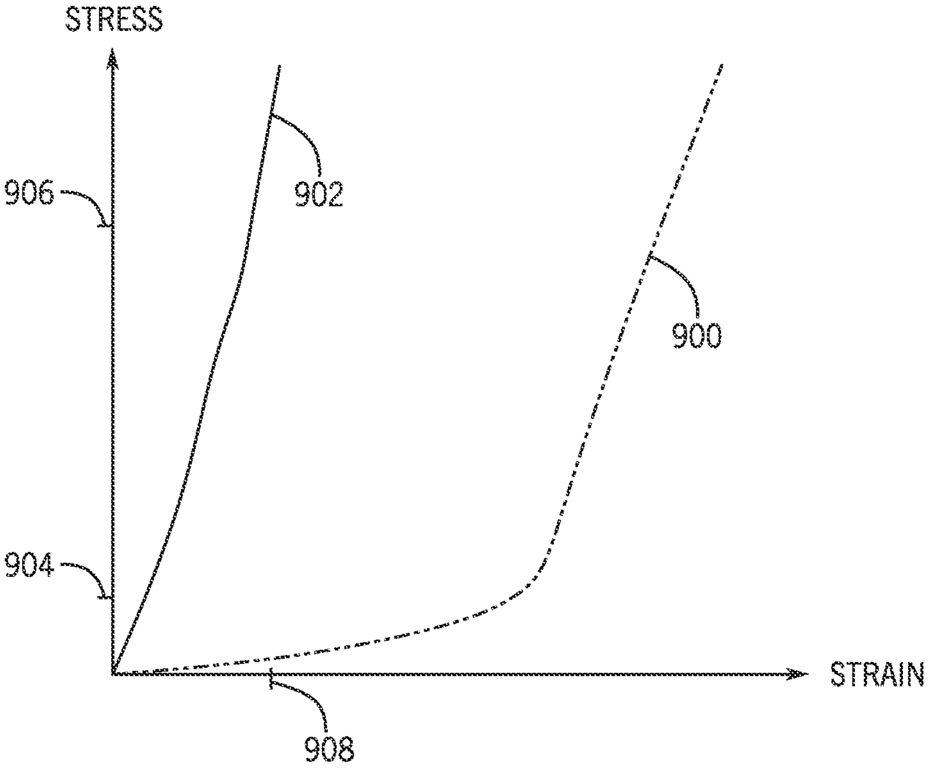
FIG. 13 is an embodiment of a graph illustrating stress-strain curves of a vibration damper with and without bracing, in accordance with an aspect of the present disclosure.

FIG. 13 is an embodiment of a graph illustrating stress-strain curves of the vibration damper 200 of FIGS. 12 and 13 having an embodiment of the viscoelastic ring 120. The stress-strain curves of FIG. 13 illustrate the effects of a vertical load incrementally applied to the viscoelastic ring 120. For example, a dashed curve 900 (e.g., unbraced curve) corresponds to deformation of the viscoelastic ring 120 compressed (e.g., in a generally vertical direction) between two surfaces (e.g., flat surfaces) without the housing 201. In other words, dashed curve 900 represents deformation of the viscoelastic ring 120 without bracing of the first unloaded surface 126. A solid curve 902 (e.g., braced curve) corresponds to the deformation of the viscoelastic ring 120 disposed within the cavity 212 of the vibration damper 200 in which the first unloaded surface 126 is braced (e.g., supported) by the bracing surfaces 234 during application of a compressive load.

As illustrated by the dashed curve 900, absent any bracing or support of the first unloaded surface 126, the viscoelastic ring 120 bows (e.g., deforms, bulges) outward upon initial application of a load, resulting in a relatively high deformation (e.g., vertical deformation). The solid curve 902 illustrates that bracing of the first unloaded surface 126 by the bracing surfaces 234 limits the viscoelastic ring 120 from outward bowing (e.g., deformation, bulging), thereby promoting bulging and/or deformation of the second unloaded surface 128 radially inward. In this way, the bracing surfaces 234 enable avoidance of buckling in the viscoelastic ring 120 (e.g., buckling of the first unloaded surface 126 radially outward).

Beyond a first load level 904, the dashed curve 900 shows an increased slope signifying an increased stiffness as the viscoelastic ring 120 increasingly resists further radially outward bowing, bulging, or deformation. Between the first load level 904 and a second load level 906, the stiffnesses represented by the respective slopes of the dashed curve 900 and the solid curve 902 are similar The spaced bracing of the viscoelastic ring 120 by the bracing surfaces 234 yields a stiffness for the viscoelastic ring 120 similar to the unbraced configuration by enabling a substantial portion of the unloaded surface area 134 to remain free to bulge or deform. Beyond approximately the second load level 906, the stiffness represented by the solid curve 902 begins to progressively increase as the braced surface area 132 progressively increases with the increased contact of the viscoelastic ring 120 with the tapered surfaces 235 described above. A vertical displacement indicator 908 approximates a point of the maximum compression distance discussed above. Beyond approximately the displacement indicator 908, certain viscoelastic materials may be increasingly susceptible to static fatigue degradation.

Figure 14:
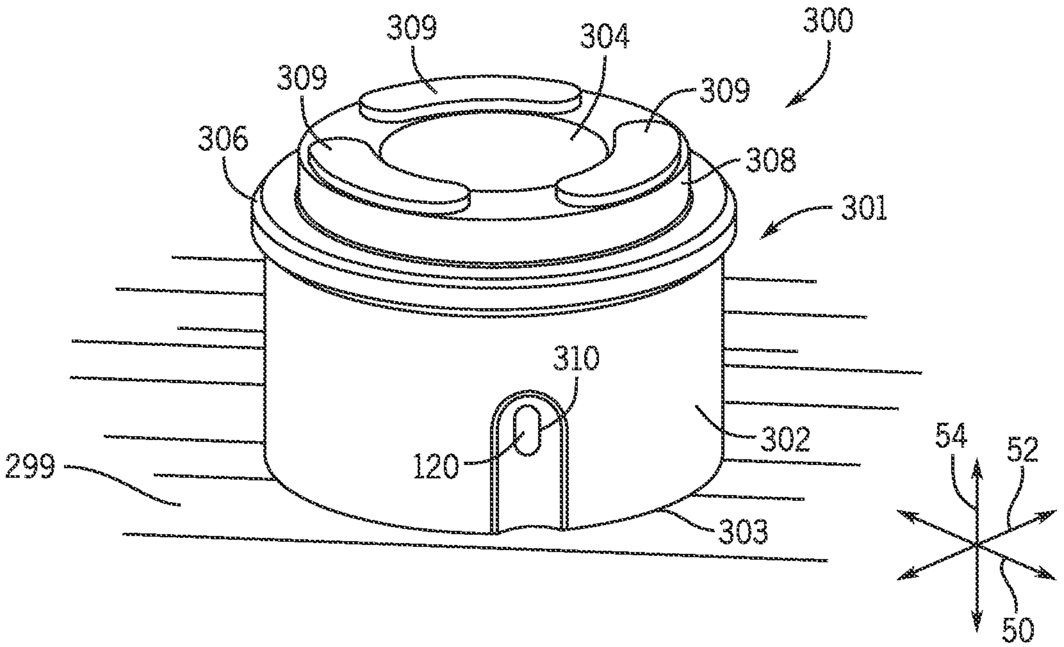
FIG. 14 is a perspective view of an embodiment of a vibration damper, in accordance with an aspect of the present disclosure.

FIG. 14 is a perspective view of an embodiment of a vibration damper 300, in accordance with the present disclosure. In certain embodiments, the vibration damper 300 having the configuration illustrated in FIG. 14 may be smaller in diameter than the vibration damper 100 described above with reference to FIGS. 2-4 and/or the vibration damper 200 described above with reference to FIGS. 5-8. Vibration dampers having a smaller diameter may be more suitable or desired in applications having space constraints. As illustrated by FIG. 14, the vibration damper 300 may include a housing 301 having a first portion 302 (e.g., base, seat) positioned below (e.g., vertically below relative to vertical axis 54) a second portion 304 (e.g., retainer, cover). The second portion 304 may be loosely engaged, as similarly described above, to the first portion 302 by a threaded lid 306 (e.g., fastener). That is, the coupling between the first portion 302 and the second portion 304 may enable some limited relative movement between the first portion 302 and the second portion 304 (e.g., in response to vibrations experienced by the vibration damper 300). In some embodiments, the threaded lid 306 engages to the first portion 302 via receiving threads of the first portion 306. However, in some embodiments, other methods of attachment such as bonding with an epoxy or welding may be utilized. Further, the threaded lid 306 may be formed in an annular shape such that the second portion 304 protrudes through a center of the threaded lid 306 (e.g., along vertical axis 54).

A platform 308 (e.g., landing, support member, loading surface) may threadably engage with a portion of the second portion 304 protruding through the center of the threaded lid 306. The platform 308, the threaded lid 306, the first portion 302, and the second portion 304 of the housing 301 may be made of any suitably rigid material including but not limited to steel, steel alloys including stainless steel, aluminum alloys, polymers such as polyoxymethylene (POM) or other materials with suitably high rigidity.

In some embodiments, a plurality of openings 310 (e.g., windows, apertures) may be formed and oriented about an external perimeter (e.g., circumference) of the first portion 302 of the housing 301 to provide visibility of a viscoelastic ring (e.g., viscoelastic ring 120) disposed within the first portion 302. For example, the viscoelastic ring 120 may be disposed within the housing 301. It should be noted that different embodiments of the viscoelastic ring 120 having different stiffnesses, geometries, and/or dimensions may be utilized. In some embodiments, each embodiment of the viscoelastic ring 120 may be manufactured in different colors corresponding to the different stiffnesses, thereby aiding in identification of the viscoelastic ring 120 and corresponding properties of the viscoelastic ring 120 (e.g., in an assembled configuration of the vibration damper 300). For example, the windows 310 may aid identification of a particular embodiment or version of the viscoelastic ring 120 that is currently installed without involving removal of the threaded lid 306 and the second portion 304 in order to achieve visibility of the viscoelastic ring 120 disposed within the first portion 302 of the housing 301.

In various embodiments, a plurality of pads 309 may be affixed to a top of the platform 308 to support a structure or piece of electronic equipment 12. As will be appreciated, the pads 309 may provide increased surface friction such that unintentional movement (e.g., sliding) of the electronic equipment 12 relative to the vibration damper 300 is avoided. The pads 309 may be made of any material with suitably high surface friction including, but not limited to, various rubbers such as butyl rubber, neoprene, etc.; fibrous materials such as polyester felt, pressed natural wool, etc. The pads 309 may be secured, attached, or otherwise coupled to the platform 308 using an epoxy or a pressure sensitive adhesive (PSA). In some embodiments, the pads 309 may be die cut from a pressed polyester felt.

A first surface 303 (e.g., lower surface) on an underside of the first portion 302 of the housing 301 is configured to rest on a foundation 299 (e.g., flat surface), such as a shelf or the floor 24. In accordance with the present disclosure, a plurality of vibration dampers 300 may be interposed between the electronic equipment 12 and the foundation 299 to enable isolation of vibrations between the electronic equipment 12 and the foundation 299, as discussed in greater detail below with respect to FIG. 15.

Figure 15:
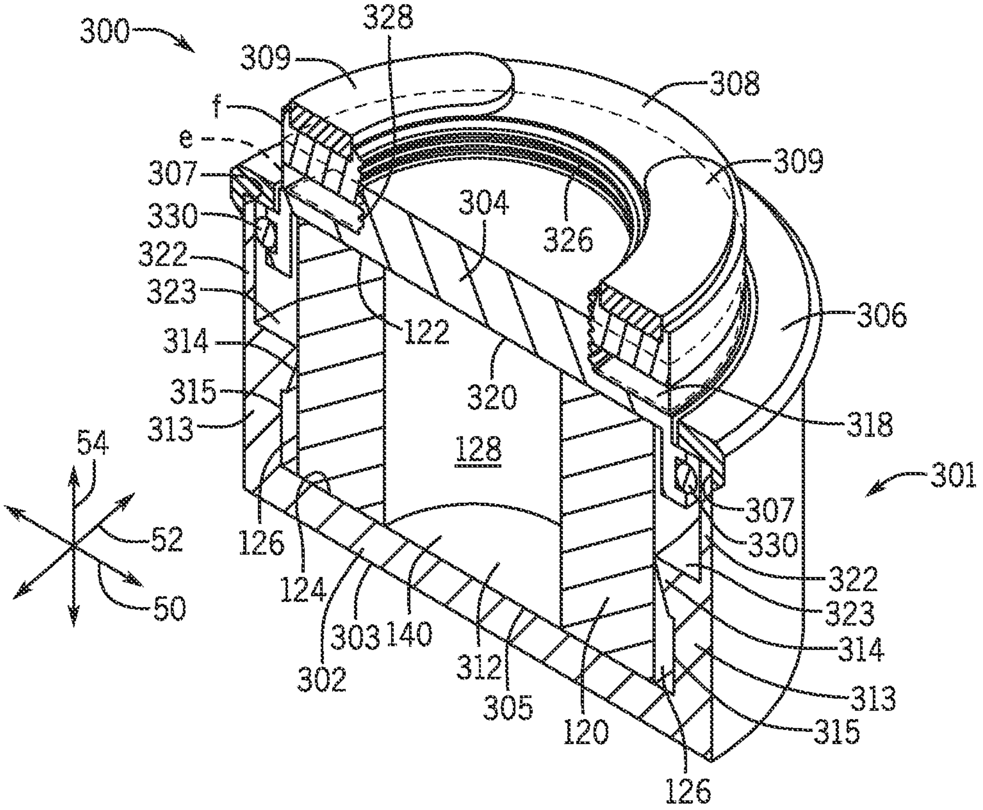
FIG. 15 is a cross-sectional perspective view of an embodiment of the vibration damper of FIG. 14, in accordance with an aspect of the present disclosure.

FIG. 15 is a cross-sectional perspective view of an embodiment of the vibration damper 300. As illustrated, the viscoelastic ring 120 may be disposed in a cavity 312 at least partially defined by the first portion 302 of the housing 301. For example, the first portion 302 of the housing 301 may include the first surface 303 (e.g., lower surface, base) configured to engage with the foundation 299 and a second surface 305 (e.g., compressing surface, upper surface) configured to engage with the second loaded surface 124 of the viscoelastic ring 120. The first and second surfaces 303,305 may extend generally parallel to one another. Further, the first portion 302 of the housing 301 may include a wall 313 extending from a perimeter, outer diameter, or circumference of the first and second surfaces 303, 305 in a direction (e.g., vertical direction) along the vertical axis 54. The wall 313 may include one or more bracing surfaces 314 protruding radially inward (e.g., relative to a central axis of the vibration damper 300) from the wall 313 of the first portion 302 and into the cavity 312. As similarly described above, the bracing surfaces 314 may be configured to contact or approximately contact the first unloaded surface 126 of the viscoelastic ring 120.

The second portion 304 of the housing 301 may also include a first surface 318 (e.g., upper surface) and a second surface 320 (e.g., compressing surface, lower surface, retaining surface). The second surface 320 of the second portion 304 may be configured to engage with the first loaded surface 122 of the viscoelastic ring 120. Thus, the viscoelastic ring 120 may be vertically captured between the first portion 302 of the housing 301 and the second portion 304 of the housing 301. In some embodiments, the threaded lid 306 may be configured to limit or block the second portion 304 of the housing 301 from disengaging from the first portion 302 of the housing 301. For example, the threaded lid 306 may threadably engage with a threaded surface 307 of the first portion 302 of the housing 301 to couple the second portion 304 of the housing 301 to the first portion 302 of the housing 301 and/or to retain the first portion 302 and the second portion 304 in engagement with one another. Further, an extension 322 of the wall 313 of the first portion 302 may be configured to surround (e.g., circumferentially) and/or receive the second portion 304 to limit translation (e.g., lateral translation) of the second portion 304 (e.g., relative to the first portion 302) under lateral shear forces. In some embodiments, a limiting surface 323 (e.g., abutment surface) extending from the extension 322 may be configured to limit downward translation of the second portion 304 towards the first portion 302 of the housing 301 under compression forces (e.g., applied via electronic equipment 12 disposed on the vibration damper 300).

The platform 308 may include an interior threaded wall 326 configured to engage with a threaded post 328 protruding in a direction (e.g., vertical direction, upward) along the vertical axis 54, such as from a center of the second portion 304. That is, the threaded post 328 may protrude upward from the first surface 318 of the second portion 304 of the housing 301 to engage with the threaded wall 326 of the platform 308 in an assembled configuration. By providing the threaded wall 326 on the platform 308, a position (e.g., position with respect to the vertical axis 54) of the platform 308 may be adjusted relative to the housing 301. For example, as illustrated in FIG. 15, the platform 308 may transition from a low position "e" to a high position "f" as the threaded wall 326 of the platform 308 is unthreaded from the threaded post 328 of the second portion 304 to increase a total height of the vibration damper 300. In other words, the total height of the vibration damper 300 may be adjustable, which may facilitate leveling of electronic equipment 12 supported by multiple vibration dampers 300. Further, one or more vibration dampers 300 may increase or decrease in height to compensate for an uneven distribution of weight supported by the vibration dampers 300.

In various embodiments, a resilient member 330 (e.g., O-ring, gasket, seal) may extend about (e.g., circumferentially about) an external perimeter of the second portion 304 of the housing 301. As shown, the resilient member 330 may be radially interposed between the second portion 304 and the first portion 302 of the housing 301 in an assembled configuration. The resilient member 330 may be formed of any resilient material including, but not limited to various rubbers such butyl rubber, neoprene, etc., silicones, or other elastomers.

In the illustrated embodiment of FIG. 15, the one or more bracing surfaces 314 protrude radially inward from a recessed surface 315 to at least partially circumferentially surround the first unloaded surface 126. In some embodiments, the one or more bracing surfaces 314 may form a continuous ring extending about an inner diameter of the wall 313. Alternatively, multiple bracing surfaces 314 may extend radially inward from the inner diameter of the wall 313 and may generally be arranged to form an interrupted or discontinuous ring about the viscoelastic ring 120. Further, the bracing surfaces 314 may be formed at different locations (e.g., axial locations) along the inner diameter of the wall 313 relative to the vertical axis 54.

In some embodiments, the one or more bracing surfaces 314 have a tapered edge 317 (e.g., chamfered edge, sloped edge) slanting away at an acute angle from a location at which the bracing surface 314 contacts the first unloaded surface 126 of the viscoelastic ring 120. In some embodiments, the tapered edge 317 slants away from the first unloaded surface 126 at an angle of approximately 20 degrees. However, other embodiments of the tapered edge 317 may engage other portions of the first unloaded surface 126, may form other angles, may have other geometries, and so forth. The tapered edge 317 may be machined using an undercutting or back chamfering tool such as a dovetail cutter.

As the viscoelastic ring 120 experiences compression via a force applied in a generally vertical direction, a first portion of the first unloaded surface 126 of the viscoelastic ring 120 may engage with the bracing surfaces 314, while a second portion of the first unloaded surface 126 may remain uncontacted and free to bulge or deflect radially outward (e.g., toward the wall 313). Further, the viscoelastic ring 120 may include the void 140 extending through a center of the viscoelastic ring 120, thereby enabling the second unloaded surface 128 (e.g., inner unloaded surface) opposite the first unloaded surface 128 (e.g., outer unloaded surface) on the viscoelastic ring 120 to bulge or deform radially inward (e.g., toward a central axis of the vibration damper 300). That is, the void 140 may provide an increase in the total surface area of the viscoelastic ring 120 that may be uncontacted and free to bulge or deform radially (e.g., outward and/or inward), thereby increasing the vibration isolation and damping capabilities of the vibration damper 300 and enabling damping and isolation of a wide range of isolation frequencies.

Figure 16:
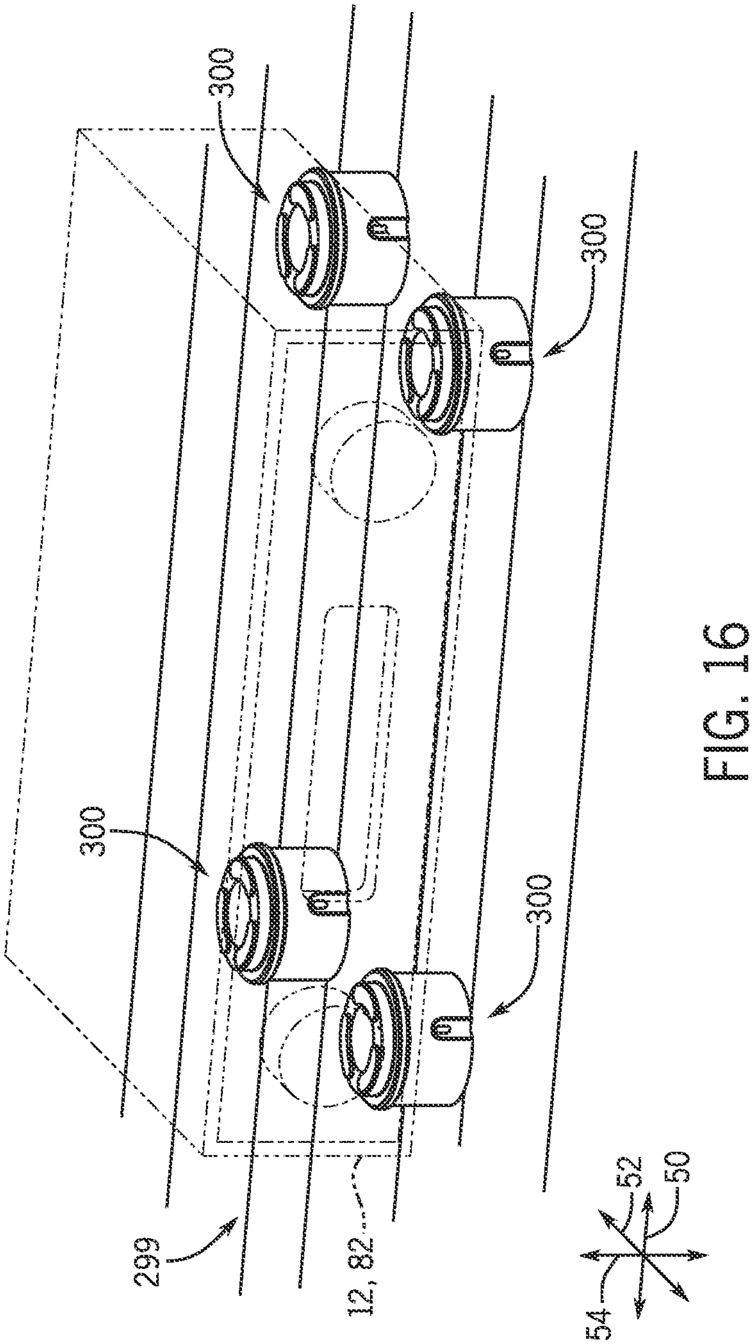
FIG. 16 is a perspective view of an embodiment of vibration dampers supporting audio equipment, in accordance with an aspect of the present disclosure.

FIG. 16 is a perspective view of an embodiment of a plurality of the vibration dampers 300 supporting a piece of electronic equipment 12 (e.g., component 82). In the illustrated embodiment, the vibration dampers 300 are positioned on the foundation 299 (e.g., floor 24, furniture 26) and support the underside of the electronic equipment 12. Four vibration dampers 300 are disposed on the foundation 299 and support the electronic equipment 12 in the illustrated embodiment. However, any suitable number (e.g., two, three, five, or more) of vibration dampers 300 may be utilized to support the electronic equipment 12.

The electronic equipment 12 shown is an audio electronic device, however the vibration dampers 300 may also be used to support other components, such as a structure (e.g., shelf, platform, cabinet). As shown, the electronic equipment 12 rests on top of the vibration dampers 300, such that the vibration dampers 300 support a weight of the electronic equipment 12. In some embodiments, the vibration dampers 300 may be secured or attached to the electronic equipment 12, such as via threaded engagement. As described above, the vibration dampers 300 may absorb, dissipate, and/or isolate vibrations transferred from the foundation 299 (e.g., originating from other nearby equipment) and/or vibrations generated by the electronic equipment 12.

Figure 17:
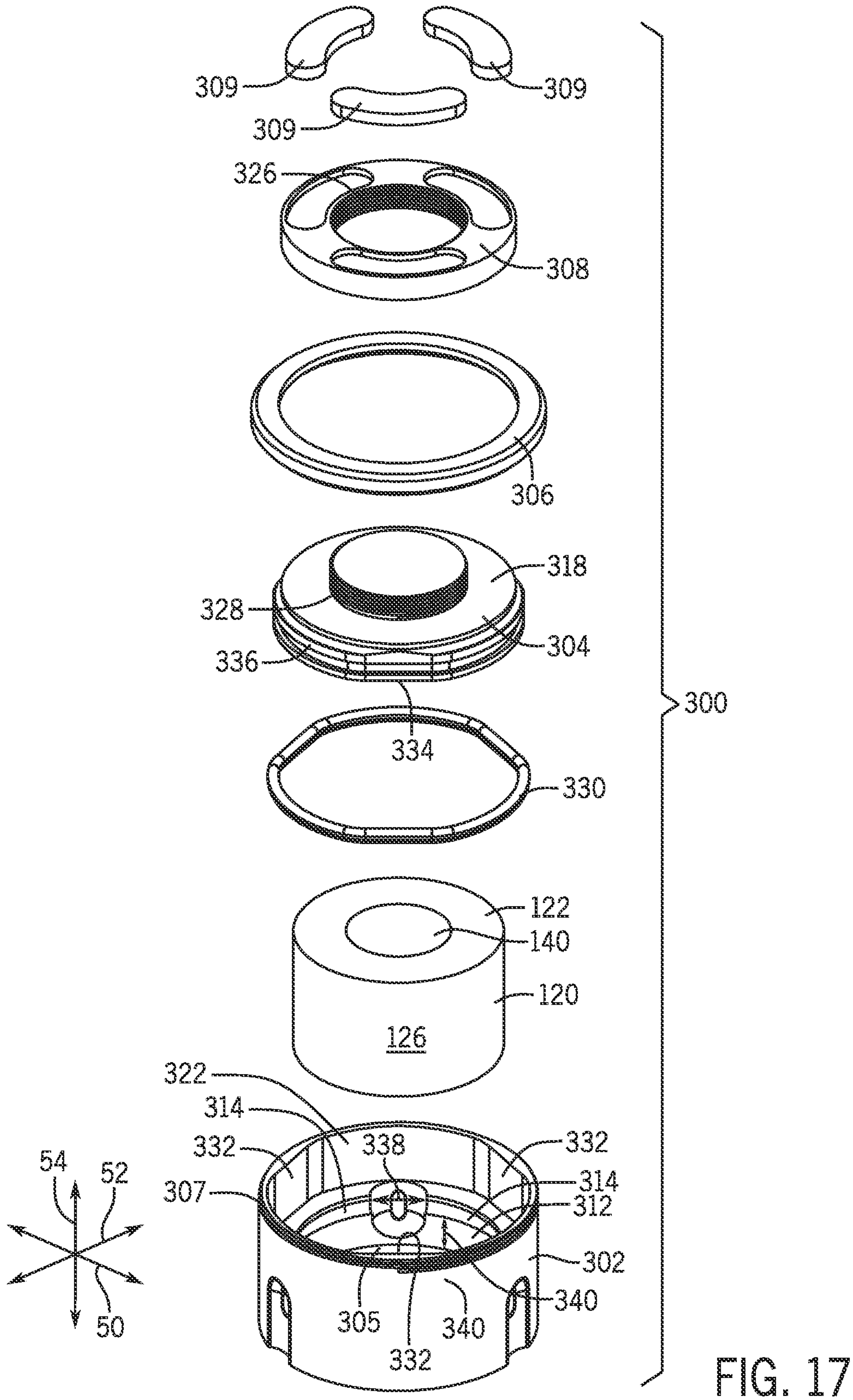
FIG. 17 is an exploded perspective view of an embodiment of the vibration damper of FIG. 14, in accordance with an aspect of the present disclosure.

FIG. 17 is an exploded perspective view of an embodiment of the vibration damper 300. In some embodiments, the extension 322 of the first portion 302 of the housing 301 may include a plurality of indentations 332 are disposed along an inner surface of the extension 322 (e.g., extending toward the viscoelastic ring 120 in the assembled configuration). The indentations 332 extend radially inward within a portion of the cavity 312. A plurality of notches 334 (e.g., recesses) formed on the second portion 304 are configured to align in number and orientation with the indentations 332, such that the notches 334 and indentations 332 are aligned with one another (e.g., radially aligned, extending parallel with one another). The notches 334 may contact the indentations 332 as the second portion 304 of the housing 301 rotates (e.g., about a central axis of the vibration damper 300) beyond a predetermined angle within the cavity 312. In doing so, an amount of rotation of the second portion 304 within the cavity 312 may be limited, thereby reducing a risk of wear and degradation to the viscoelastic ring 120. In some embodiments, the notches 334 may be machined using a keyseat or keyway cutter tool. Further, the resilient member 330 may be configured to be disposed in a groove 336 formed in the second portion 304 and, for example, circumferentially surrounding the second portion 304. In this way, a position of the resilient member 330 may be maintained within the groove 336 and the resilient member 330 may be interposed between (e.g., radially between) the second portion 304 and the first portion 302 of the housing 301 in an assembled configuration.

As illustrated, multiple bracing surfaces 314 are included in the first portion 302 and are spaced (e.g., circumferentially spaced) from each other to form a plurality of first gaps 338 therebetween. In some embodiments, the bracing surfaces 314 may also be spaced from the second surface 305 of the first portion 302 of the housing 301 (e.g., axially spaced, spaced along vertical axis 54) to form a second gap 340. The dimensions and arrangement of the bracing surfaces 314 are arranged to enable a portion (e.g., a substantial portion) of the first unloaded surface 126 to deform or bulge radially outward between adjacent bracing surfaces 314 (e.g., within the gaps 338) and to deform or bulge radially outward between one or more of the bracing surface 314 and the second surface 305 (e.g., within the second gap 340) in response to compression of the viscoelastic ring 120 (e.g., application of a load or vertical load to the vibration damper 300).

Figure 18:
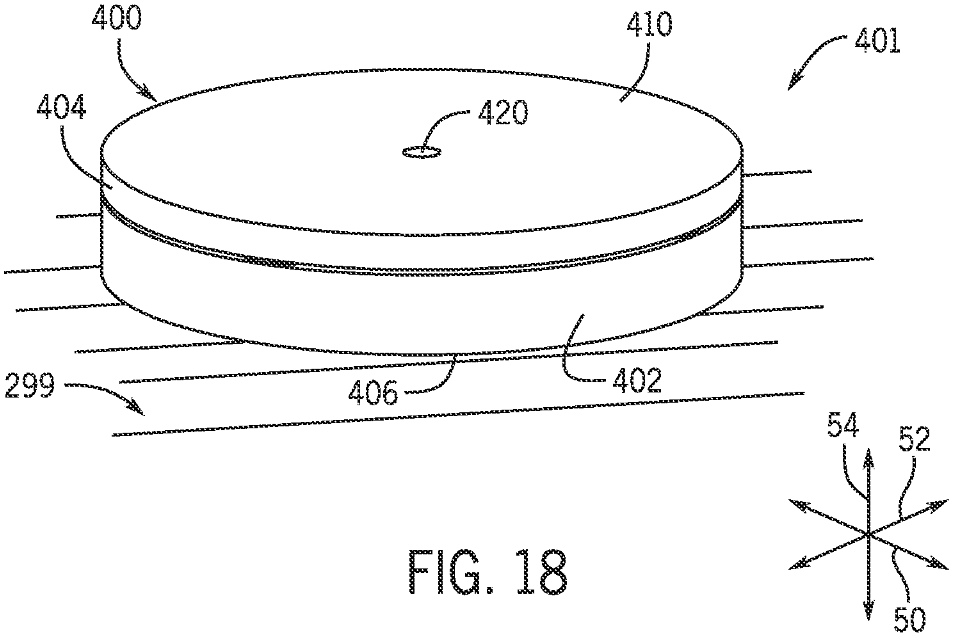
FIG. 18 is a perspective view of an embodiment of a vibration damper, in accordance with an aspect of the present disclosure.

FIG. 18 is a perspective view of an embodiment of a vibration damper 400, in accordance with aspects of the present disclosure. The vibration damper 400 may include a housing 401 having a first portion 402 (e.g., base, seat) and a second portion 404 (e.g., retainer, cover, cap) disposed above the first portion 402 relative to vertical axis 54. The first portion 402 may have a first surface 406 (e.g., lower surface, bottom surface) formed on the underside of the first portion 402 that is configured to rest on the foundation 299, such as a shelf, furniture 26, or the floor 24. The second portion 404 may also have a first surface 410 (e.g., upper surface, top surface) configured to support a piece of electronic equipment 12 such that the vibration damper 400 may isolate the electronic equipment 12 from vibrations (e.g., vibrations transmitted via the foundation 299 from surrounding electronic equipment 12). The first portion 402 and the second portion 404 of the housing 401 may be made of any suitably rigid material including, but not limited to steel, steel alloys including stainless steel, aluminum alloys, polymers such as polyoxymethylene (POM) or other materials with a desired (e.g., high) rigidity.

In some embodiments, a pocket 420 (e.g., dish, recess, counterbore) may be formed on the first surface 410 of the second portion 404, such as at a central location on the first surface 410 (e.g., aligned with a central axis of the second portion 404). In some instances, electronic equipment may include spikes, prongs, or other extensions configured to provide support. For example, loudspeakers may include spikes extending from a base of the loudspeakers, and the spikes may be deposed within respective pockets 420 of the vibration dampers 400. The pocket 420 may be conical in shape or may have other shapes (e.g., cylindrical) with varying dimensions to accommodate spikes or prongs of different electronic equipment 12. The pocket 420 may be configured to retain a corresponding spike therein, such that the electronic equipment 12 is blocked from movement (e.g., lateral movement) relative to the first surface 410 of the second portion 404, such as during absorption of vibrations by the vibration damper 400. In some embodiments, the vibration damper 400 may additional or alternatively support equipment directly positioned upon the first surface 410 of the second portion 404 of the housing 401.

Figure 19:
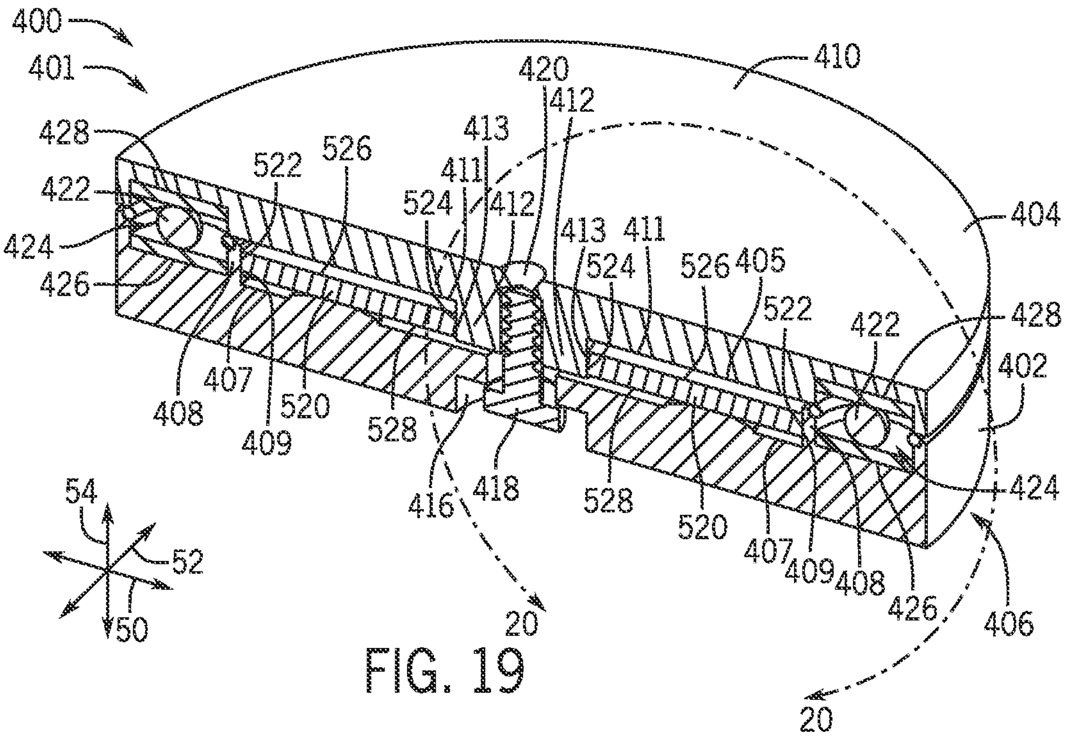
FIG. 19 is a cross-sectional perspective view of an embodiment of the vibration damper of FIG. 18, in accordance with an aspect of the present disclosure.

FIG. 19 is a cross-sectional perspective view of an embodiment of the vibration damper 400. As illustrated, a viscoelastic ring 520 made of a viscoelastic material may be disposed within the first portion 402 of the housing 401. The viscoelastic ring 520 may be annular in shape and may include a first loaded surface 522 (e.g., outer radial surface), a second loaded surface 524 (e.g., inner radial surface) opposite the first loaded surface 522, a first unloaded surface 526 (e.g., upper unloaded surface), and a second unloaded surface 528 (e.g. lower unloaded surface) opposite the first unloaded surface 526.

As noted above, the first portion 402 of the housing 401 may include the first surface 406 (e.g., bottom surface, resting surface) configured to rest on a flat surface, such as the foundation 299. Further, the first portion 402 of the housing 401 may include a second surface 407 opposite the first surface 406 of the first portion 402 of the housing 401. The second surface 407 of the first portion 402 may include a protrusion 408 extending from the second surface 407 in a direction along the vertical axis 54. The protrusion 408 may define a third surface 409 (e.g., compressing surface, radial surface) configured to engage with the first loaded surface 522 of the viscoelastic ring 520. That is, the third surface 409 of the first portion 402 of the housing 401 may extend generally along the vertical axis 54 and may be configured to contact the first loaded surface 522 of the viscoelastic ring 520 under shear loading.

Similarly, the second portion 404 of the housing 401 may include the first surface 410 configured to support electronic equipment 12. The second portion 404 of the housing 401 may also include a second surface 411 opposite the first surface 410 of the second portion 404 of the housing 401. The second surface 411 of the second portion 404 may include a protrusion 412 extending from the second surface 411 in a direction (e.g., downward direction) along the vertical axis 54, such as from a central portion (e.g., radially inward portion) of the second portion 402. The protrusion 412 may include a third surface 413 (e.g., retaining surface, radial surface)) configured to engage with the second loaded surface 524 of the viscoelastic ring 520. For example, the third surface 413 of the second portion 404 of the housing 401 may extend generally along the vertical axis 54 and may be configured to contact the second loaded surface 524 of the viscoelastic ring 520 under shear loading. In some embodiments, the viscoelastic ring 520 may be configured to contact the third surface 409 of the first portion 402 and the third surface 413 of the second portion 404 in a resting configuration of the vibration damper 400 (e.g., with no load applied to the vibration damper 400). However, in other embodiments, a space may extend between (e.g., radially between) the first loaded surface 522 and the third surface 409 of the first portion 402 and/or between (e.g., radially between) the second loaded surface 524 and the third surface 413 of the second portion 404 to enable limited lateral movement of the viscoelastic ring 520 before engaging with the first and second portions 402, 404. Collectively, the second and third surfaces 407, 409 of the first portion 402 of the housing 401 and the second and third surfaces 411, 413 of the second portion 404 of the housing 401 may define a cavity 405 within which the viscoelastic ring 520 may be disposed and/or retained In some embodiments, the third surface 409 of the first portion 402, the third surface 413 of the second portion 404, the first loaded surface 522 of the viscoelastic ring 520, and the second loaded surface 524 of the viscoelastic ring 520 may each have a cylindrical shape. However, in other embodiments, such surfaces may define other shapes or geometries, such as multiple faceted surfaces (e.g., hexagonal or octagonal shapes). Further, the vibration damper 400 of FIG. 19 has the first and second unloaded surfaces 526, 528 disposed on opposite sides (e.g., upper and lower sides) of the viscoelastic ring 520 and that extend between the first and second loaded surfaces 522 and 524. In some embodiments the first and second unloaded surfaces 526, 528 extend laterally (e.g., horizontally) such that the first and second unloaded surfaces 526, 528 bulge or deform in opposing directions (e.g., generally vertical directions, upward and downward) as the viscoelastic ring 520 is compressed (e.g., radially compressed) between the first and second loaded surfaces 522 and 524.

As illustrated in FIG. 19, a through hole 416 (e.g., recess, opening) may extend through the first portion 402 of the housing 401 (e.g., a center of the first portion 402). A fastener 418 may extend through the through hole 416 from an underside of the first portion 402 to loosely engage the second portion 404 of the housing 401 to the first portion 402 of the housing 401, as similarly described above. A size or dimension of the through hole 416 may be selected to enable limited amount of movement (e.g., lateral movement) of the fastener 418. Further, the loose engagement of the second portion 404 to the first portion 402 of the housing 401 by the fastener 418 may enable a limited amount of movement of the second portion 404 relative to the first portion 402 of the housing 401, such as in response to vibrations imparted to the vibration damper 400. In some embodiments, the third surface 413 of the second portion 404 may be an integral component of the second portion 404 of the housing 401 (e.g., extending directly from the second surface 411 of the second portion 404). However, in other embodiments, the third surface 413 (e.g., retaining surface) may be formed via the shaft of the fastener 418, such that the second loaded surface 524 may directly contact the fastener 418. Further, while FIG. 19 illustrates one second loaded surface 524 contacting one third surface 413 of the second portion 404 of the housing 401, in some embodiments, multiple separate second loading surfaces 524 may be configured to contact multiple separate third surfaces 413 of the second portion 404 of the housing 401.

FIG. 19 further illustrates a plurality of ball bearings 422 disposed within a plurality of bearing cavities 424. The bearing cavities 424 may be cooperatively defined by the first portion 402 and the second portion 404 and may be arrayed circumferentially within the housing 401 (e.g., adjacent an outer diameter of the housing 401). For example, the second surface 407 of the first portion 402 may include a plurality of recessed portions 426, and the second surface 411 of the second portion 404 may also include a plurality of recessed portions 428. Upon assembly of the second portion 404 and the first portion 402 via the fastener 418, the recessed portions 426 of the first portion 402 may align with the recessed portions 428 of the second portion 404 to define the bearing cavities 424 within the housing 401. The ball bearings 422 may enable the second portion 404 of the housing 401 to translate in lateral (e.g., horizontal) directions relative to the first portion 402 of the housing 401, such as in response to vibration imparted to the vibration damper 400. That is, the second portion 404 may be configured translate (e.g., roll) across the ball bearings 422. The ball bearings 422 may be made of any suitable materials, including but not limited to polymers such as polyoxymethylene (POM), various metals such as stainless steel, other steel alloys, or other metals or alloys, ceramics including oxides such as alumina, zirconia, etc., crystalline oxides such as corundum, ruby, sapphire, etc., carbides such as tungsten carbide, etc., other ceramic composites, or other suitable material.

Figure 20:
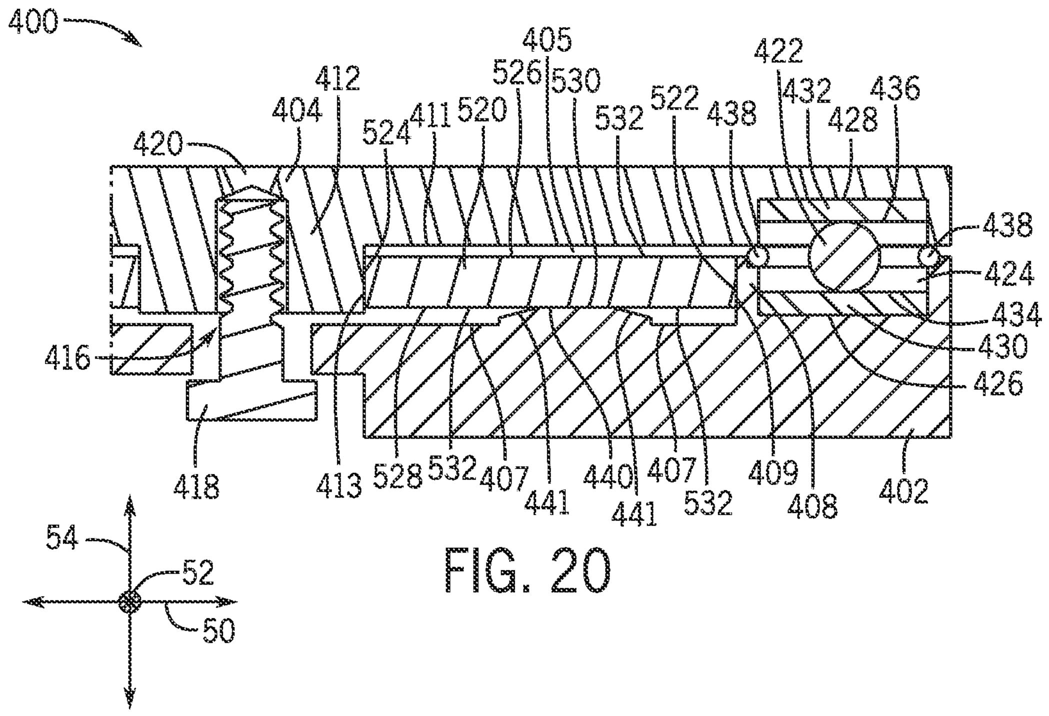
FIG. 20 is an expanded cross-sectional side view, taken within line 20-20 of FIG. 18, of an embodiment of the vibration damper of FIG. 18, in accordance with an aspect of the present disclosure.

FIG. 20 is an expanded cross-sectional side view of an embodiment of the vibration damper 400. As illustrated, the ball bearings 422 may be disposed within the bearing cavities 424 formed via alignment between the recessed portions 426 of the first portion 402 of the housing 401 and the recessed portions 428 of the second portion 404 of the housing 401. In some embodiments, the bearing cavities 424 have a generally cylindrical shape. In other embodiments, the bearing cavities 424 may have another suitable shape or geometry that enables desirable movement of the ball bearings 422 within the bearing cavities 424. The vibration damper 400 may include any suitable number of ball bearings 422 (e.g., one, two, three, four, five, six, or more), and each ball bearing 422 may be disposed individually in a corresponding bearing cavity 424. However, some embodiments may include multiple ball bearings 422 disposed within each of the bearing cavities 424 to distribute a load across additional contact points. The ball bearings 422 may have any suitable diameter, the same diameter, and/or different diameters.

In some embodiments, each ball bearing 422 may be disposed within one of the bearing cavities 424 between a first race 434 and a second race 436 of the corresponding bearing cavity 424. Indeed, each bearing cavity 424 may include the first race 434 and the second race 463. For example, each of the recessed portions 426 of the first portion 402 of the housing 401 may be lined with a first slug 430 (e.g., first disk), and each of the recessed portions 428 of the second portion 404 of the housing 401 may be lined with a second slug 432 (e.g., second disk). The first race 434 may be disposed on or formed by the first slug 430, and the second race 436 may be disposed on or formed by the second slug 432. The first slug 430 is disposed at a base of the bearing cavity 424 and the second slug 432 is disposed at a top of the bearing cavity 424. Accordingly, in the assembled configuration, the ball bearing 422 may be captured between the first and second races 434, 436 and may be configured to retain the first and second slugs 430, 432 in place at opposing ends (e.g., vertically opposing ends) of each of the bearing cavities 424. In other embodiments, the first and second slugs 430, 432 may be bonded to the first and second portions 402, 404 of the housing 401, respectively, such as via an adhesive (e.g., epoxy). The first and second slugs 430, 432 may be formed from any suitably hard material, such as hardened steel. In some embodiments, the first and second slugs 430, 432 are configured to be removable from the vibration damper 400, which may facilitate replacement as desired. Further, while FIG. 20 illustrates the first and second races 434, 436 disposed on (e.g., against) first and second slugs 430, 432, respectively, in some embodiments, the first race 434 may be located directly on the recessed portion 426 of the first portion 402 of the housing 401 and the second race 436 may be located directly on the recessed portion 428 of the second portion 404 of the housing 401. Further still, while FIG. 20 illustrates the first and second races 434, 436 extending generally parallel to one another (e.g., in a flat, horizontally orientation), other embodiments may include first and second races 434, 436 having other shapes or geometries, such as a curved or dish shape. A flat (e.g., planar) configuration of the first and second races 434, 436 may enable the second portion 404 of the housing 401 to translate (e.g., roll) freely on the ball bearings 422 in multiple lateral directions (e.g., in response to vibrations imparted to the vibration damper 400). The elastic properties of the viscoelastic ring 520 provide a restoring force that may cause the second portion 404 of the housing 401 to return to a resting or starting position (e.g., a central position) relative to the first portion 402 of the housing 401. Further, as noted above, the viscous properties of the viscoelastic ring 520 provide a high level of damping of vibrations experienced by the vibration damper 400.

FIG. 20 also illustrates a plurality of resilient members 438 (e.g., O-rings) disposed between (e.g., axially between, relative to vertical axis 54) the first portion 402 of the housing 401 and the second portion 404 of the housing 401. In some embodiments, the resilient members 438 are configured to extend (e.g., circumferentially extend) about each of the bearing cavities 424, such as along a radially inward perimeter and a radially outward perimeter of the bearing cavities 424. In some embodiments, one resilient member 438 may extend circumferentially about the inner radial or outer radial perimeter of the first portion 402 of the housing 401, such that each of the bearing cavities 424 are surrounded by the single resilient member 438. The resilient member(s) 438 may be configured to limit contaminants (e.g., dirt, dust, particulates) from entering the bearing cavities 424, thereby limiting an amount of interference with the rolling action of the ball bearings 422. The resilient member(s) 438 may be formed from any suitable resilient material, including but not limited to various rubbers such butyl rubber, neoprene, etc., silicones, or other elastomers.

As noted above, the second surface 407 of the first portion 402 may include the protrusion 408 having a third surface 409 (e.g., compressing surface) extending (e.g., vertically extending) from the second surface 407 and configured to engage with the first loading surface 522 of the viscoelastic ring 520. Thus, the second surface 407 of the first portion 402 of the housing 401 may be a recessed surface that extends (e.g., laterally extends) from the third surface 409 of the first portion 402 of the housing 401 to at least partially define the cavity 405 within which the viscoelastic ring 520 is disposed. Similarly, the second surface 411 of the second portion 404 of the housing 401 may also extend (e.g., laterally extend) from the third surface 413 of the second portion 404 of the housing 401. Collectively, the second surface 407 (e.g., recessed surface) and the third surface 409 (e.g., compressing surface) of the first portion 402 of the housing 401 and the second surface 411 and the third surface 413 of the second portion 404 of the housing 401 may cooperatively define the cavity 405 within which the viscoelastic ring 520 is disposed.

As illustrated, a plurality of bracing surfaces 440 may protrude from the second surface 407 of the first portion 402 into the cavity 405. For example, the bracing surfaces 440 may extend at least partially into the cavity 405 along the vertical axis 54 (e.g., in an upward direction). The bracing surfaces 440 are configured to contact or approximately contact the second unloaded surface 528 along a braced surface area 530 of the viscoelastic ring 520. For example, the bracing surfaces 440 may be configured to support the viscoelastic ring 520 (e.g., in a vertical direction, along vertical axis 54) under force of gravity, thereby lifting the second unloaded surface 528 above the second surface 407 of the first portion 402 of the housing 401. In doing so, surface friction between the second unloaded surface 528 and the second surface 407 of the first portion 402 of the housing 401 may be reduced. Some viscoelastic materials include a tacky surface quality, which may cause the materials stick or at least partially adhere to surfaces that come into contact with the materials, thereby increasing surface friction therebetween. Friction between the second unloaded surface 528 and the second surface 407 of the first portion 402 of the housing 401 may unintentionally resist deformation of the viscoelastic ring 520 during compression or application of a load (e.g., via electronic equipment 12 supported by the vibration damper 400). By lifting the second unloaded surface 528 above the second surface 407 of the first portion 402 of the housing 401 via the bracing surfaces 440, surface tension of the viscoelastic ring 520 may be reduced, thereby limiting unintended side effects (e.g., reduced ability to deform under compression) caused by surface friction.

In some embodiments, the bracing surfaces 440 are configured to maintain the viscoelastic ring 520 within the cavity 405, such as an approximately vertically central (e.g., relative to vertical axis 54). As the vibration damper 400 experiences shear loading (e.g., horizontal or lateral compression), an unloaded surface area 532 along the first and second unloaded surfaces 526, 528 may remain substantially free from contact with the housing 401. Thus, the unloaded surface area 532 may be free to bulge or deform in directions along the vertical axis 54. As illustrated, the bracing surfaces 440 may be configured to contact the viscoelastic ring 520 at a position approximately midway between the first and second loaded surfaces 522 and 524 (e.g., a radial midpoint of the viscoelastic ring 520). In this way, sagging or drooping of the viscoelastic ring 520 (e.g., downward under the influence of gravity) may be limited. Further, in some embodiments, the bracing surfaces 440 may be configured to have tapered surfaces 441 (e.g., chamfered edges, outer surfaces, lateral surfaces) that slope away (e.g., downward relative to vertical axis 54) from the braced surface area 530 of the viscoelastic ring 520. The tapered surfaces 441 may be configured to progressively increase the total area of the braced surface area 530 as the viscoelastic ring 520 bulges or deforms under compression between the first and second loaded surfaces 522 and 524.

In some embodiments, the viscoelastic ring 520 of the vibration damper 400 may be implemented to absorb or isolate lateral forces or vibrations (e.g., instead of vertically applied forces, such as a weight of electronic equipment 12). In such embodiments, the viscoelastic ring 520 may be formed into a shape and may have a low stiffness and/or a low shape factor that enables isolation and damping of lateral vibrations as the viscoelastic ring 520 is compressed between the first and second loaded surfaces 522, 524, as described in greater detail below. Further, the vibration damper 400 is configured such that the second portion 404 may be detached from the first portion 402 of the housing 401, thereby enabling the viscoelastic ring 520 to be removed from the cavity 405 for replacement (e.g., with another viscoelastic ring 520 having a different stiffness and/or geometry, or a new viscoelastic ring 520, and so forth).

Figure 21:
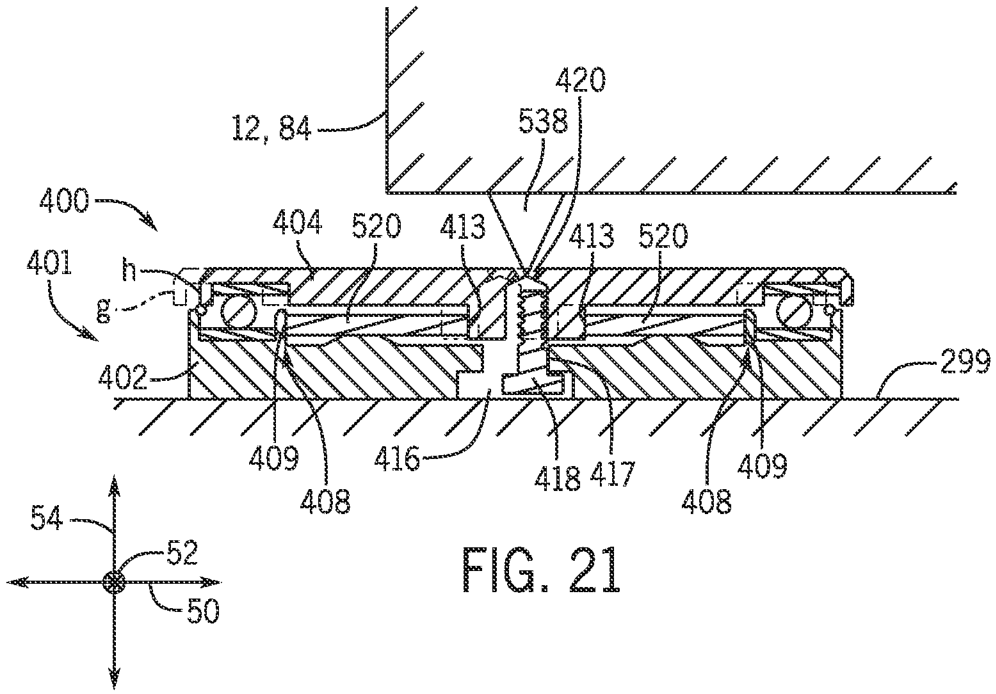
FIG. 21 is a cross-sectional side view of an embodiment of the vibration damper of FIG. 18, illustrating application and distribution of a horizontal force, in accordance with an aspect of the present disclosure.

FIG. 21 is a cross-sectional side view of an embodiment of the vibration damper 400 illustrating application and distribution of lateral forces imparted to the vibration damper 400. The vibration damper 400 is shown resting on the foundation 299 and supporting a piece of equipment 84 (e.g., electronic equipment 12) that includes spikes 538 or prongs extending from a base or underside of the equipment 84. For example, the piece of equipment 84 may be a loudspeaker. A plurality of vibration dampers 400 may be utilized to support the equipment 84 by positioning each of the spikes 538 within the respective pocket 420 of each vibration damper 400.

As noted above, the loose engagement between the first portion 402 of the housing 401 and the second portion 404 of the housing 401 by the fastener 418 enables the second portion 404 of the housing 401 to translate in multiple lateral (e.g., horizontal) directions, such as between a first lateral position "g" and a second lateral position "h." At the second lateral position "h," the fastener 418 contacts the through hole 416 at a contact point 417, indicating that further lateral translation beyond the second lateral position "h" is blocked. The second portion 404 of the housing 401 may translate in multiple lateral directions, such as along the radial axis 50 and/or the radial axis 52 (e.g., along a horizontal plane). The viscoelastic ring 520 may be compressed between the third surface 409 (e.g., compressing surface) of the first portion 402 of the housing 401 and the third surface 413 of the second portion 404 of the housing 401 during lateral movement of the second portion 404 of the housing 401, thereby providing effective damping of laterally oriented vibrations or forces.

Figure 22:
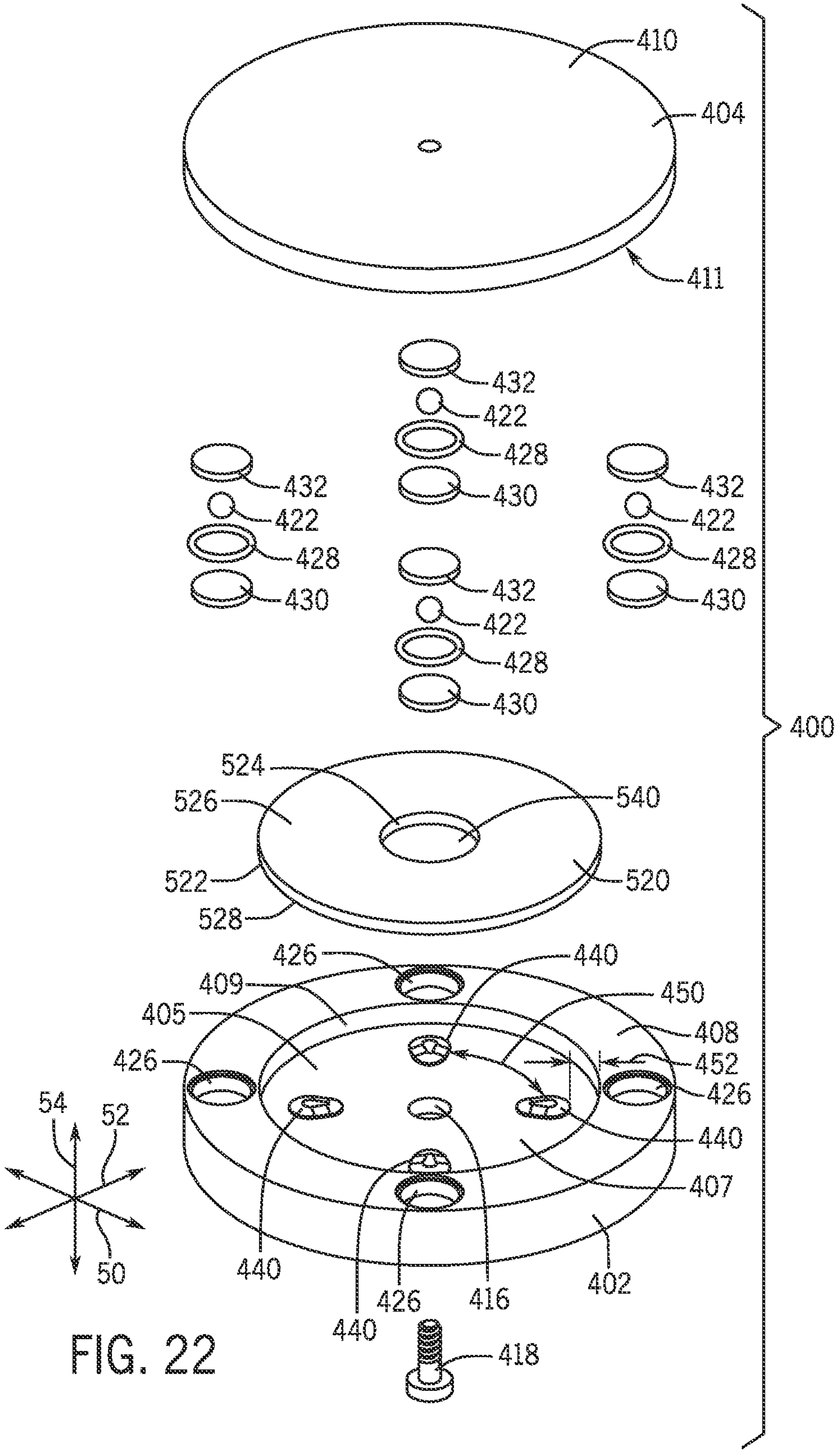
FIG. 22 is an exploded perspective view of an embodiment of the vibration damper of FIG. 18, in accordance with an aspect of the present disclosure.

FIG. 22 is an exploded perspective view of an embodiment of the vibration isolator 400. The bracing surfaces 440 are shown protruding generally upwards in a direction (e.g., vertical direction) along the vertical axis 54 from the second surface 407 of the first portion 402 of the housing 401 into the cavity 405. As illustrated, four bracing surfaces 440 are arranged circumferentially about the second surface 407 of the first portion 402 (e.g., proximate the third surface 409 of the first portion 402 of the housing 401, at equally spaced intervals). The size and quantity of the bracing surfaces 440 may be selected to enable desired support of the viscoelastic ring 520 under the influence of gravity, as described above, and may be configured to limit sagging or drooping of the first and second unloaded surfaces 526, 528 downward towards the second surface 407 of the first portion 402 of the housing 401.

The bracing surfaces 440 may be spaced apart (e.g., circumferentially spaced apart) from adjacent bracing surfaces 440 to form a first plurality of gaps 450 therebetween. In some embodiments, the bracing surfaces 440 may also be spaced (e.g., radially spaced) from the third surface 409 of the first portion 402 in radial inward directions relative to the third surface 409 of the first portion 402 to form a second plurality of second gaps 452 therebetween. Such spacing of the bracing surfaces 440 enables portions (e.g., substantial portions) of the first and second unloaded surfaces 526, 528 to bulge or deform (e.g., vertically deform along vertical axis 54) into the first gaps 450 and the second gaps 452 in response to compression of the viscoelastic ring 520 induced via lateral forces or vibrations. Further, in some embodiments, a void 540 (e.g., through hole) may extend through the viscoelastic ring 520 (e.g., along vertical axis 54). While FIG. 22 illustrates a single void 540 centrally located within the viscoelastic ring 520, other embodiments of the viscoelastic ring 520 may include different numbers of voids 540 formed in different locations or positions of the viscoelastic ring 520.

Figure 23:
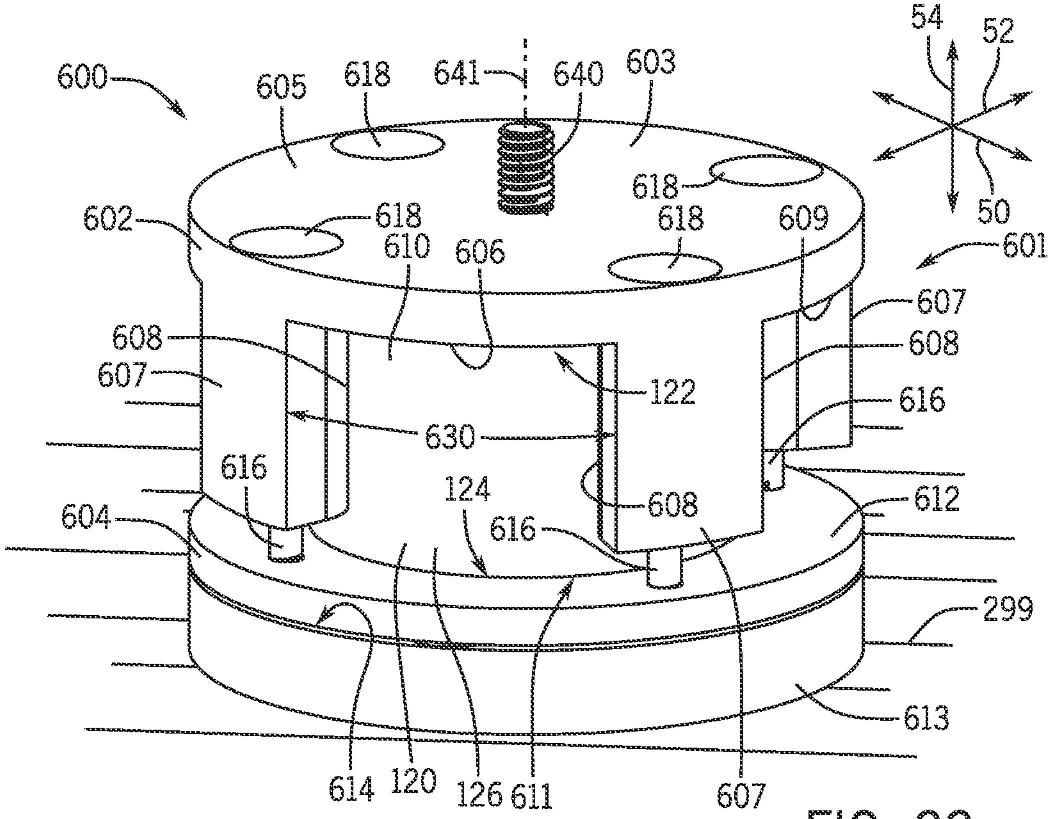
FIG. 23 is a perspective view of an embodiment of a vibration damper, in accordance with an aspect of the present disclosure.

FIG. 23 is a perspective view of an embodiment of a vibration damper 600, in accordance with aspects of the present disclosure. The vibration damper 600 is configured to move or adjust along multiple axes to achieve improved isolation of vibrations induced in both vertical and lateral orientations. The vibration damper 600 may include one or more components of the vibration dampers 100, 200, 300, or 400 discussed above to facilitate improved isolation of both laterally and vertically oriented vibrations. For example, in some embodiments, the vibration damper 600 may have a first portion that includes features similar to the first portion 102 of FIG. 2, a second portion that includes features from one or both of the second portion 104 of FIG. 2 and the second portion 404 of FIG. 18, and a third portion that includes features similar to the first portion 402 of FIG. 18, as described in greater detail below.

In the illustrated embodiment, the vibration damper 600 includes a housing 601 having a first portion 602 (e.g., upper portion, casing, cover, shell) and a second portion 604 (e.g., retainer, base, seat). The first portion 602 may include a main body 603 having a first surface 605 (e.g., loading surface, upper surface) and a second surface 606 (e.g., compressing surface). The first surface 605 may be configured to support a structure or a piece of electronic equipment 12 positioned on the vibration damper 600. The first portion 602 also includes a plurality of extensions 607 extending from the main body 603 (e.g., along vertical axis 54) and defining a plurality of elongated bracing surfaces 608. The extensions 607 may extend generally along or from a periphery 609 (e.g., circumference, outer diameter) of the main body 603 and may be circumferentially arrayed about the main body 603. The second surface 606 and the bracing surfaces 608 may be configured to at least partially define a cavity 610 of the housing 601.

The second portion 604 of the housing 601 may be oriented below the first portion 602 in an assembled configuration of the vibration damper 600, such that the second portion 604 extends across (e.g., along the radial axis 50 and/or the radial axis 52) an open end 611 of the cavity 610. The second portion 604 may also include a first surface 612 (e.g., upper surface, retaining surface) facing and opposing the second surface 606 of the first portion 602 and a second surface 614 (e.g., lower surface) on an underside of the second portion 604 which may be configured to engage with a third portion of the vibration damper 600, as described in greater detail below.

In some embodiments, a plurality of fasteners 616 may extend through a plurality of holes 618 (e.g., through holes, counterbored holes) formed in the first portion 602. The fasteners 616 may be configured to threadingly engage with the second portion 604 of the housing 601. A size and/or dimension of the holes 618 may be selected to enable some limited movement of the fasteners 616 disposed therein. Thus, the fasteners 616 may loosely engage (e.g., couple, secure) the first portion 602 and the second portion 604. As similarly described above, "loosely engage" in reference to the relationship between the first portion 602 and the second portion 604 may refer to a coupling arrangement of the first portion 602 to the second portion 604 via the fasteners 616 that enables some limited relative movement between the first portion 602 and the second portion 604. In other words, the first portion 602 and the second portion 604 may not be rigidly secured or fixed to one another. The loose engagement described herein enables some movement of the second portion 604 relative to the first portion 602 in one or more directions (e.g., in response to imparted vibrations or forces) before contact is established between at least two of the second portion 604, the first portion 602, or the fasteners 616 to block further relative movement of the second portion 604. The first portion 602 and the second portion 604 of the housing 601 may be made of any suitably rigid material, including but not limited to steel, steel alloys including stainless steel, aluminum alloys, polymers such as polyoxymethylene (POM) or other materials with a suitably high rigidity.

FIG. 23 also illustrates the viscoelastic ring 120 (e.g., viscoelastic ring of FIGS. 2 and 15) disposed within the cavity 610 between the first portion 602 and the second portion 604 of the housing 601. For example, the first loaded surface 122 is configured to engage with the second surface 606 (e.g., compressing surface) of the first portion 602 of the housing 601, and the second loaded surface 124 is configured to engage with the first surface 612 (e.g., retaining surface) of the second portion 604. In this way, the viscoelastic ring 120 may be compressed between the first portion 602 and the second portion 604 of the housing 601 to isolate and/or dampen vibrations imparted to the vibration damper 600.

The bracing surfaces 608 are configured to engage (e.g., contact, approximately contact) the first unloaded surface 126 of the viscoelastic ring 120. For example, the bracing surfaces 608 may positioned proximate (e.g., radially outward from) the first unloaded surface 126 to brace the first unloaded surface 126 as the first unloaded surface 126 deforms or bulges radially outward in response to compression of the viscoelastic ring 120 between the first and second loaded surfaces 122 and 124. In some embodiments, the bracing surfaces 608 are each spaced apart (e.g., circumferentially spaced apart) from one another to form a plurality of gaps 630 (e.g., circumferential gaps, radial gaps). The bracing surfaces 608 may be equally spaced around the periphery 609 of the first portion 602, such that gaps 630 (e.g., equally sized gaps) are formed between adjacent bracing surfaces 608. In some embodiments, the bracing surfaces 608 are spaced or offset from the second surface 606 of the first portion 602 (e.g., relative to vertical axis 54). The bracing surfaces 608 may be spaced apart from one another to enable a portion (e.g., a substantial portion) of the first unloaded surface 126 to deform or bulge radially outward into the gaps 630 in response to compression of the viscoelastic ring 120 between the first and second loaded surfaces 122 and 124.

As similarly discussed above with respect to the vibration damper 100 illustrated in FIGS. 2 and 3, in certain embodiments, the vibration damper 600 may include bracing surfaces 608 that are spaced at different distances (e.g., radial distances) from a central axis 641 of the vibration damper 600. For example, the vibration damper 600 may include a first set of extensions 607 having bracing surfaces 608 that are spaced a first distance from the central axis 641 of the vibration damper 600 and a second set of extensions 607 having bracing surfaces 608 that are spaced a second distance from the central axis 641 of the vibration damper 600, where the first distance is different than the second distance. For example, the second distance may be greater than the first distance such that as the viscoelastic ring 120 compresses (e.g., along the vertical axis 54), the first unloaded surface 126 of the viscoelastic ring 120 may first contact the bracing surfaces 608 of the first set of extensions 607 positioned the first distance away from the central axis 641. As the viscoelastic ring 120 continues to compress (e.g., in response to a greater load applied), the first unloaded surface 126 of the viscoelastic ring 120 may engage with the bracing surfaces 608 of the second set of extensions 607 that are positioned the second distance away from the central axis 641. In this way, the vibration damper 600 may progressively increase an amount of bracing applied to the viscoelastic ring 120 as the load applied to the viscoelastic ring 120 increases. In some embodiments, a stud 640 (e.g., threaded stud) may protrude (e.g., along vertical axis 54) from the first portion 602 of the housing 601. For example, the stud 640 may extend generally from a center of the main body 603. The stud 640 may be configured to threadably engage with a base of a piece of electronic equipment 12. In this way, the stud 640 may enable rigid securement or attachment of the vibration damper 600 to the electronic equipment 12. Rigid or fixed coupling of the vibration damper 600 to the electronic equipment 12 may improve stability by limiting inadvertent movement or removal of the electronic equipment 12 from of vibration damper 600.

As noted above, the vibration damper 600 may also include a third portion. For example, the second portion 604 may be configured to couple to (e.g., loosely engage with) an embodiment of the first portion 402 of the vibration damper 400 described above with reference to FIGS. 18-22, which is hereinafter referred to as a third portion 613 with regard to the embodiment of FIG. 23. The third portion 613 may have similar elements and element numbers as the first portion 402 of the vibration damper 400 described above. The third portion 613 may be coupled to the underside of the second portion 604 (e.g., via a loose engagement), such that the second portion 604 is disposed between the first portion 602 of the housing 601 and the third portion 613 (e.g., relative to the vertical axis 54). The first surface 406 of the third portion 613 is configured to rest or otherwise be disposed on the foundation 299 (e.g., flat surface, floor 24). As will be appreciated, the first portion 602, the second portion 604, and the viscoelastic ring 120 disposed therebetween may cooperatively isolate and damp vibrations independently of the second portion 604, the third portion 613, and viscoelastic ring 520 disposed therebetween. Accordingly, the vibration damper 600 of FIG. 23 may further enable improved isolation and damping of vibrations (e.g., vertically induced vibrations, laterally induced vibrations) imparted to the vibration damper 600.

Figure 24:
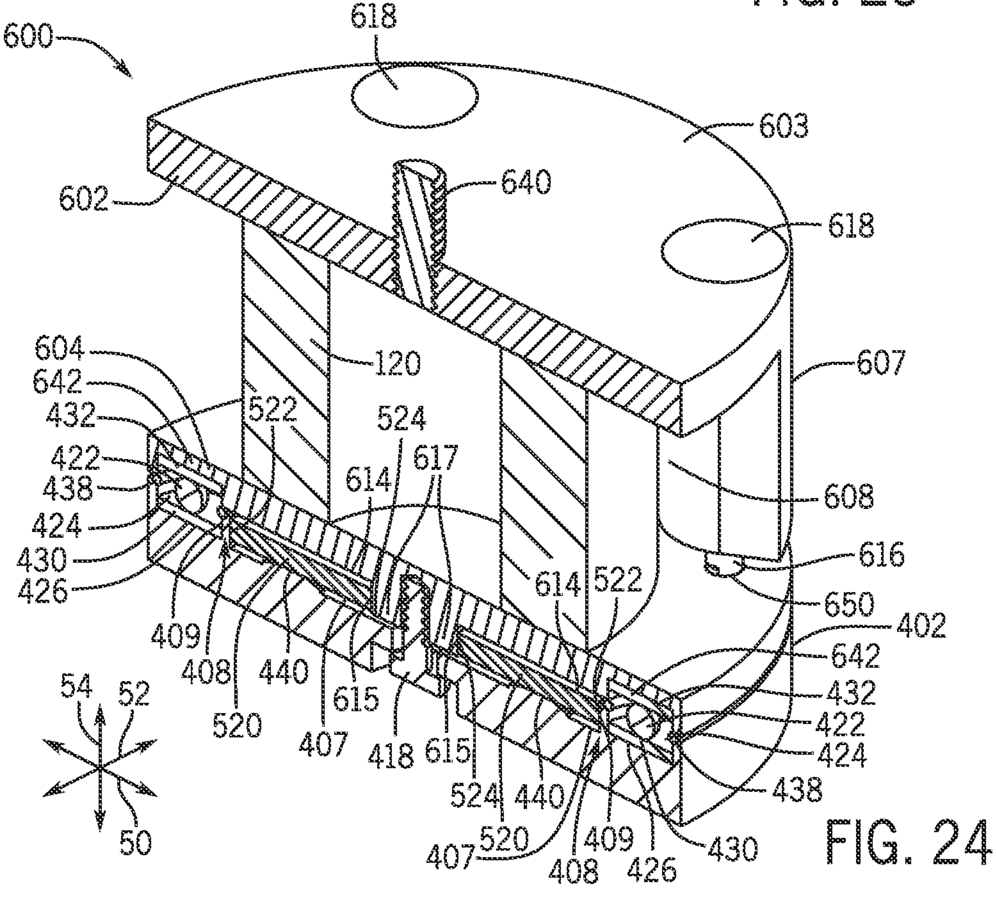
FIG. 24 is a cross-sectional perspective view of an embodiment of the vibration damper of FIG. 23, in accordance with an aspect of the present disclosure.

FIG. 24 is a cross-sectional perspective view of an embodiment of the vibration damper 600. The fastener 418 of FIG. 19 may be incorporated to enable loose engagement of the third portion 613 to the underside of the second portion 604 of the housing 601. The viscoelastic ring 520 may be disposed between the third surface 409 of the third portion 613 and a third surface 615 of the second portion 604. For example, the second surface 614 of the second portion 604 may have a profile similar to that of the second surface 411 of the second portion 404 of the vibration damper 400. For example, the second surface 614 of the second portion 604 may include a protrusion 617 extending from the second surface 614 in a direction (e.g., downward direction) along the vertical axis 54. The protrusion 617 may at least partially define the third surface 615 (e.g., retaining surface) and may be configured to engage with the second loaded surface 524 of the viscoelastic ring 520. In some embodiments, the third surface 615 of the second portion 604 may be generally vertically oriented and configured to contact the second loaded surface 524 of the viscoelastic ring 520 under shear loading. Further, the second surface 614 of the second portion 604 may also include a recessed portion 642 configured to align with the recessed portion 426 of the second surface 407 of the third portion 613 to define the bearing cavities 424 in which the ball bearings 422 may be disposed to enable lateral translation of the second portion 604 relative to the third portion 613.

The third portion 613, the fastener 418, the viscoelastic ring 520, the ball bearings 422, the bearing cavities 424, the resilient members 438, and the first and second slugs 430, 432 may be similar or substantially similar in structure and function as described above with reference to the vibration damper 400. Similarly, the second portion 604 of the housing 601 may be similar or substantially similar in function as the second portion 404 of the vibration damper 400 of FIG. 14. In the illustrated embodiment, the second portion 604 also includes a plurality of holes 650 (e.g., threaded holes) into which fasteners 616 may extend via threaded engagement to couple the first portion 602 to the second portion 604 (e.g., in loose engagement).

As mentioned above, independent relative movement between the third portion 613 and the second portion 604 and between the second portion 604 and the first portion 602 may improve damping and isolation of vibrations (e.g., vertically oriented vibrations and/or horizontally oriented vibrations) imparted to the vibration damper 600. Indeed, as discussed above, the viscoelastic ring 520, which may be compressed in directions (e.g., lateral directions) extending crosswise to compression directions (e.g., vertical directions) of the viscoelastic ring 120 may enable damping of both horizontal and vertical vibrations by the vibration damper 600. In some embodiments, the arrangement of components of the vibration damper 600 may enable or promote a lower natural frequency, such as for vibrations induced in lateral or horizontal directions. In some circumstances, lateral movement of the first portion 602 relative to the second portion 604 may be limited via contact with the fasteners 616, as discussed above, yet the second portion 604 may nevertheless to translate in lateral directions relative to the third portion 613, for example, via operation on the ball bearings 422.

Figure 25:
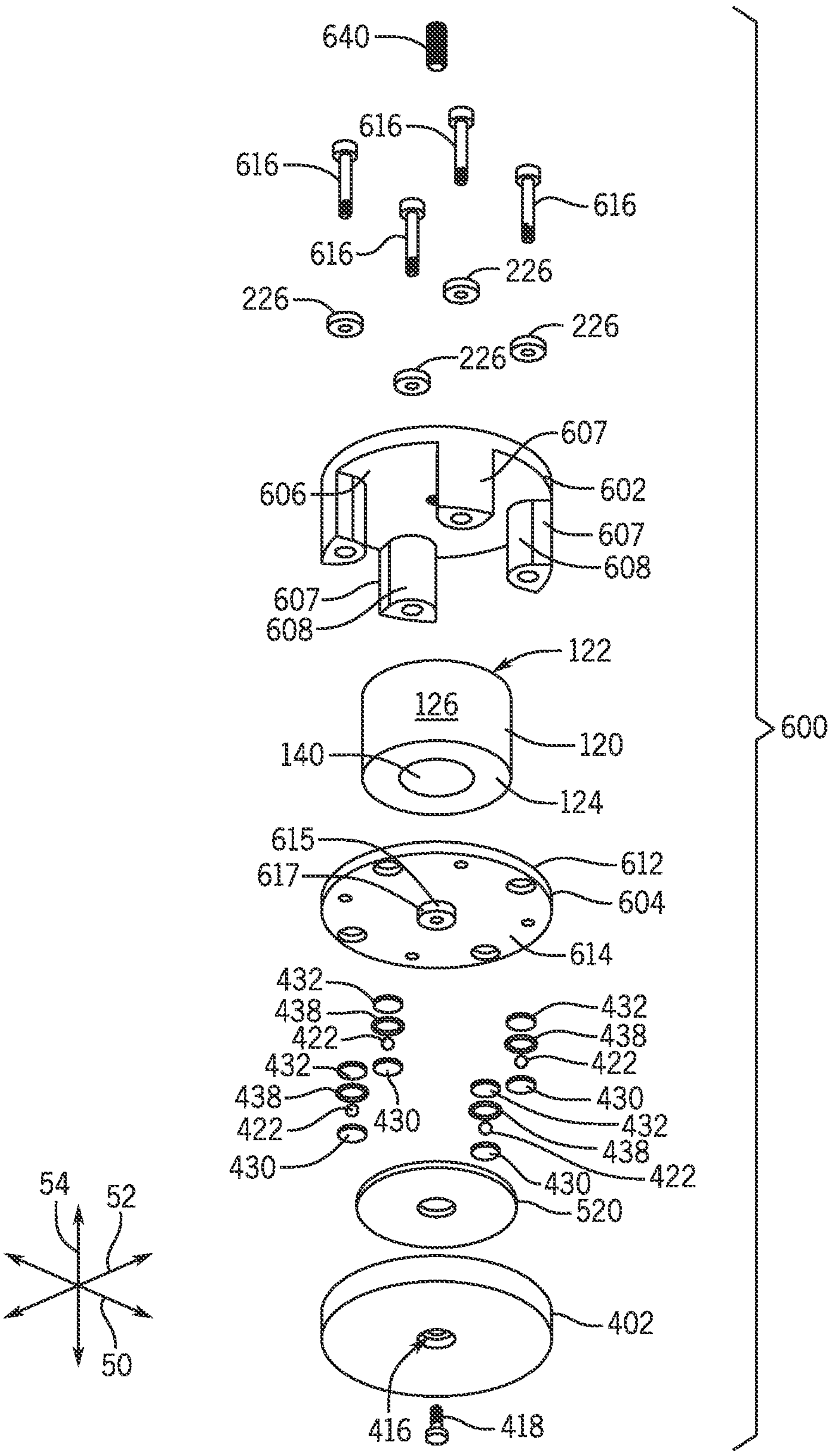
FIG. 25 is an exploded perspective view of an embodiment of the vibration damper of FIG. 23, in accordance with an aspect of the present disclosure.

FIG. 25 is an exploded perspective view of an embodiment of the vibration damper 600. As shown, the fasteners 616 may extend through the first portion 602 and into the first surface 612 of the second portion 604 to enable loose engagement of the first portion 602 and the second portion 604. The fastener 418 may extend through the third portion 613 and into the second surface 614 of the second portion 604 to enable loose engagement between the third portion 613 and the second portion 604. The second portion 604 is thus captured between (e.g., vertically between) the first portion 602 and the third portion 613 of the housing 601.

As illustrated in FIG. 25, in some embodiments, the resilient members 226 (e.g., bushings) described above with reference to FIG. 6, may extend about the fasteners 616, such that the resilient members 226 are radially disposed between the fasteners 616 and the first portion 602 of the housing 601. The resilient members 226 may block direct contact between the fasteners 616 and the first portion 602 of the housing 601. In some embodiments, the stud 640 is configured to be detachably threaded to the first portion 602 of the housing 601, thereby enabling replacement of the stud 640 with another stud 640 having a different size and/or configuration. Thus, the vibration damper 600 may be configured to threadably attach to different bases of electronic equipment 12 having threaded holes with different thread or hole sizes.

Figure 26:
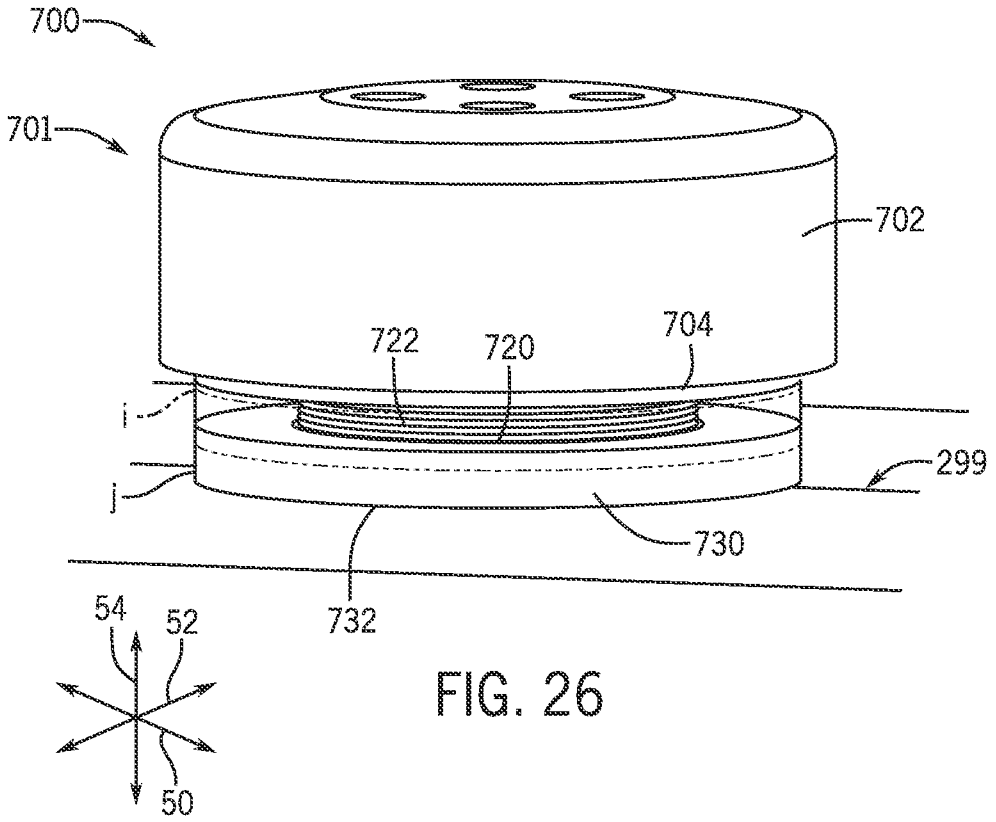
FIG. 26 is a perspective view of an embodiment of a vibration damper, in accordance with an aspect of the present disclosure.

FIG. 26 is a perspective view of an embodiment of a vibration damper 700, in accordance with aspects of the present disclosure. Similar to the vibration damper 600 discussed above, the vibration damper 700 may incorporate features of the vibration dampers 100, 200, 300, 400, or 600 discussed above to facilitate movement along multiple axes to enable improved isolation and damping of vibrations, including vibrations induced in vertical and lateral directions. For example, the vibration damper 700 may include a housing 701 having a first portion 702, which may be similar in structure and/or function to the first portion 202 of the vibration damper 200 discussed above. The first portion 702 is configured to loosely engage with a second portion 704 (e.g., retainer, base, seat) which may have features and functions similar to the second portion 204 of the vibration damper 200 discussed above. However, in the illustrated embodiment, the underside of the second portion 704 is configured to loosely engage with a third portion 720 (e.g., third housing portion) of the vibration damper 700. As shown, the second portion 704 is disposed between (e.g., vertically between, relative to vertical axis 54) the first portion 702 and the third portion 720 of the housing 701. An upper surface of the second portion 704 may be similar in profile and/or geometry to the second surface 210 of the second portion 204 of the vibration damper 200 discussed above, while a lower surface of the second portion 704 may have a profile configured to engage with the third portion 720 of the vibration damper 700. Further, the third portion 720 may be configured to engage with a platform 730 of the vibration damper 700. For example, the third portion 720 may include a threaded wall 722 formed on an outer diameter of the third portion 720, which may be configured to threadingly engage with the platform 730, as discussed in greater detail below. Further, the platform 730 may include a first surface 732 (e.g., a base surface) configured to rest on the foundation 299 (e.g., floor 24).

The threaded engagement between the platform 730 and the second portion 704 enables positional adjustment of the second portion 704 relative to the platform 730 (e.g., between a first position "i" and a second position "j"). In this way, a height of the vibration damper 700 may be increased or decreased, thereby facilitating leveling of electronic components 12 supported by the vibration damper 700 (e.g., supported by vibration dampers 700). The second portion 704, the third portion 720, and the platform 730 may be made of any suitably rigid material including, but not limited to steel, steel alloys including stainless steel, aluminum alloys, polymers such as polyoxymethylene (POM), or other materials with a suitable (e.g., high) rigidity.

Figure 27:
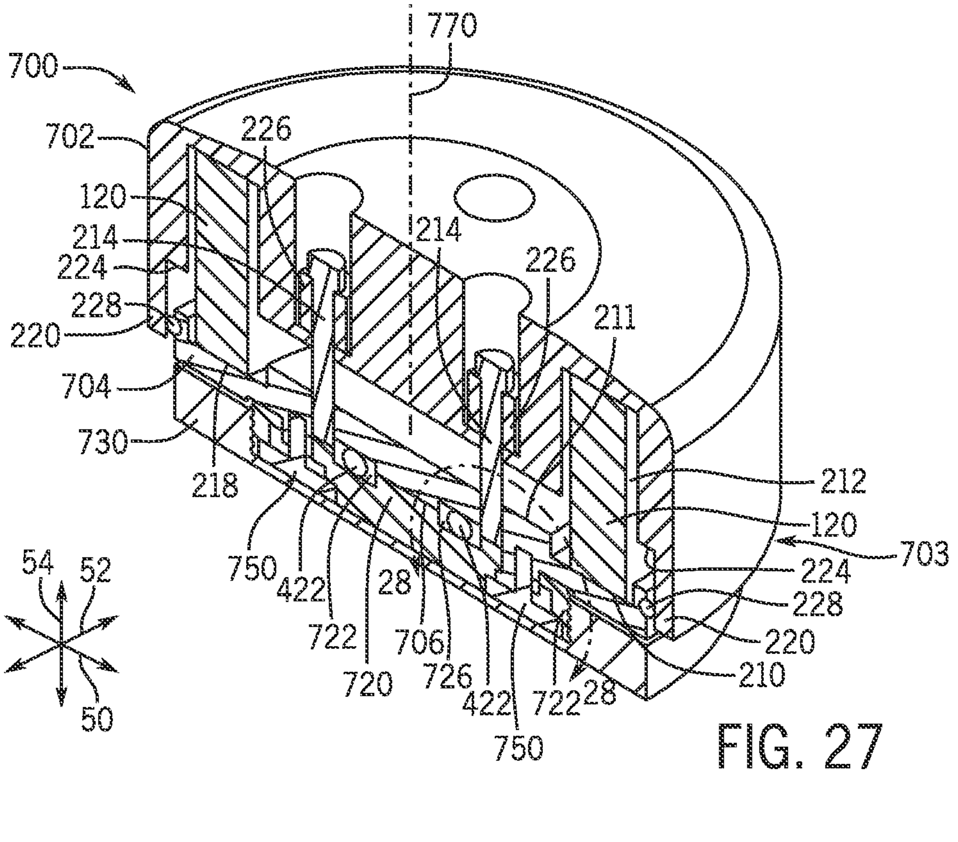
FIG. 27 is a cross-sectional perspective view of an embodiment of the vibration damper of FIG. 26, in accordance with an aspect of the present disclosure.

FIG. 27 is a cross-sectional perspective view of an embodiment of the vibration damper 700. The first portion 702, the viscoelastic ring 120, the fasteners 214, the extension 220, the limiting surface 224, the first resilient members 226, and the second resilient members 228 may include similar elements and element numbers as described above with respect to the vibration damper 200. Further, as noted above, the second portion 704 may include elements and element numbers similar to the second portion 204 of the vibration damper 200. For example, the first portion 702 may include the extension 220, extending along a perimeter 703 (e.g., circumference) of the first portion 702 to limit lateral (e.g., horizontal) movement of the second portion 704 and/or first portion 702 relative to one another when under lateral forces and the limiting surface 224 extending from the extension 220 to limit upward translation of the second portion 704 toward the first portion 702 and/or downward translation of the first portion 702 toward the second portion 704 when the vibration damper 700 is under compression forces. The first portion 702 may also include the recessed surface 232 and the bracing surfaces 234 configured to engage with the viscoelastic ring 120 upon application of a load (e.g., vertical load). The second portion 704 may include the second surface 210 configured to engage with the second loaded surface 124 of the viscoelastic ring 120 and the third surface 211 configured to receive the fasteners 214, and the recess 218.

In some embodiments, the fasteners 214 extend through the first portion 702 via the holes 216 and thread into the third surface 211 of the second portion 704 of the housing 701 to provide loose engagement between the first portion 702 and the second portion 704 of the housing 701. A plurality of second fasteners 750 may extend through the third portion 720 and thread into a first surface 706 of the second portion 704 to provide loose engagement of the third portion 720 to the second portion 704. Loose engagement of the first portion 702 and the third portion 720 to opposing sides of the second portion 704 may enable limited relative movement between the second portion 704 and both the first portion 702 and the third portion 720 (e.g., in response to vibrations imparted to the vibration damper 700). Accordingly, the first portion 702 and the third portion 720 may translate or adjust relative to the second portion 704 independently of one another and/or along different axes (e.g., vertical axis and lateral axis).

FIG. 27 also illustrates the ball bearings 422 disposed within a plurality of bearing cavities 726 defined between the second portion 704 and the third portion 720. The ball bearings 422 are disposed between (e.g., vertically between) the second portion 704 and the third portion 720, such that the second portion 704 may translate (e.g., roll) along the ball bearings 422 (e.g., for a limited distance) in lateral directions, for example, in response to vibrations imparted to the vibration damper 700. Each of the bearing cavities 726 may contain or house one ball bearing 422 or multiple ball bearings 422. Further, as noted above, different bracing surfaces 234 may extend radially inward from the recessed surface 232 by different distances toward a central axis 770 of the vibration damper 700. For example, a first set (e.g., first number) of the bracing surfaces 234 may extend from the recessed surface 232 such that the first set of the bracing surfaces 234 are spaced a first distance from the central axis 770 of the vibration damper 700. A second set (e.g., second number) of the bracing surfaces 234 may extend from the recessed surface 232 such that the second set of the bracing surfaces 234 are spaced a second distance from the central axis 770 of the vibration damper 700. The second distance may be greater than the first distance, such that under lighter loads, the first unloaded surface 126 of the viscoelastic ring 120 may engage with the first set of the bracing surfaces 234 without engaging the second set of the bracing surfaces 234. As the load increases and the viscoelastic ring 120 continues to compress and deform (e.g., bulge) radially outward, the viscoelastic ring 120 may engage with the second set of the bracing surfaces 234, thereby increasing an amount of bracing applied to the viscoelastic ring 120. In this way, a progressive increase in bracing of the viscoelastic ring 120 may be achieved as the load applied to the vibration damper 700 increases.

Figure 28:
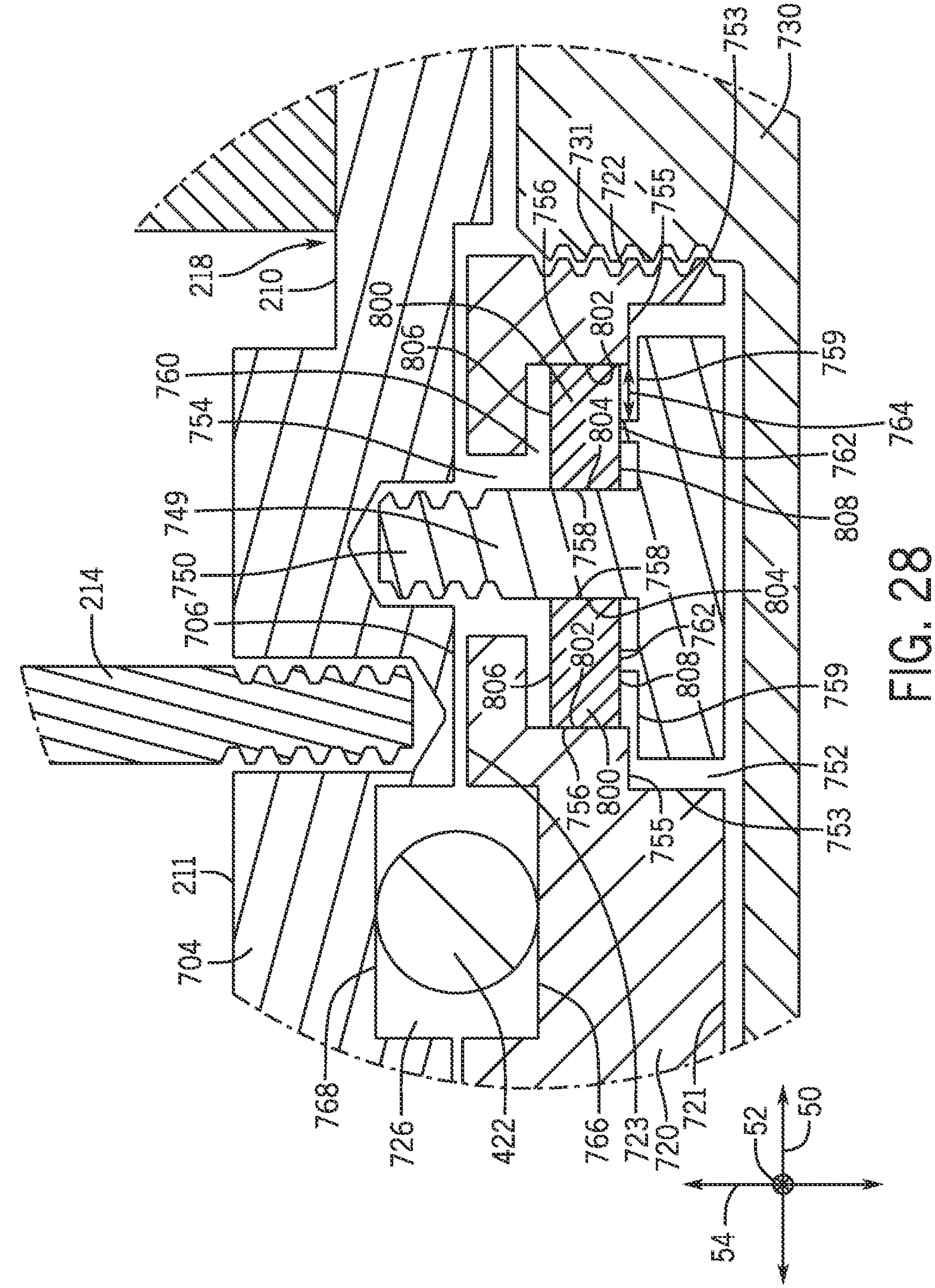
FIG. 28 is an expanded cross-sectional side view, taken within line 28-28 of FIG. 27, of an embodiment of the vibration damper of FIG. 26, in accordance with an aspect of the present disclosure.

FIG. 28 is an expanded cross-sectional side view of an embodiment of the vibration damper 700. As illustrated, the platform 730 may include a threaded surface 731 configured to engage with the threaded wall 722 of the third portion 720 to enable positional (e.g., height) adjustment of the vibration damper 700. For example, by rotating the third portion 720 relative to the platform 730, a height of the vibration damper 1000 (e.g., a dimension along vertical axis 54) may be increased or decreased, thereby facilitating leveling of electronic components 12 supported by the vibration damper 700. In some embodiments, each of the second fasteners 750 may be disposed within a pocket 752 (e.g., cavity, recess) formed on an underside of the third portion 720. That is, the third portion 720 may have a first surface 721 (e.g., lower surface, bottom surface) and a second surface 723 (e.g., top surface, upper surface), and one or more pockets 752 may be formed in the first surface 721 of the third portion 720. Each of the second fasteners 750 extends through a respective hole 754 of the third portion 720 aligned with one of the pockets 752 and into the first surface 706 of the second portion 704 (e.g., via threaded engagement with the second portion 704) in an assembled configuration of the vibration damper 700. A size or dimension of the holes 754 may be selected to enable an amount of lateral movement of each of the second fasteners 750 before contacting a surface (e.g., radial surface) defining the hole 754, thus providing loose engagement between the third portion 720 and the second portion 704.

The pockets 752 may each have a cylindrical shape and may be at least partially defined by a first pocket wall 753 (e.g., first compressing surface, vertical wall) configured to circumferentially surround the second fasteners 750 extending therein. In some embodiments, each pocket 752 may also include a pocket base 755 extending (e.g., lateral extending) from the pocket wall 753. The pocket base 755 may be formed to enable some translation (e.g., vertical translation, translation along vertical axis 54) of the second fasteners 750 but may also limit translation (e.g., vertical translation) of the second fasteners 750 via contact between the second fasteners 750 and the pocket base 755. The restriction of vertical movement may block separation of the third portion 720 from the second portion 704 under tension forces.

The third portion 720 also defines a respective second pocket wall 756 (e.g., second compressing surface, radial surface, vertical surface) associated with each pocket wall 753 and pocket base 755. In some embodiments, the second pocket wall 756 may have a cylindrical shape, but the second pocket wall 756 may have other shapes (e.g., with multiple surfaces), such as square, hexagonal, or octagonal. In some embodiments, the second pocket wall 756 is vertically oriented (e.g., along vertical axis 54) and offset (e.g., radially offset) from a shaft surface 758 of a shaft 749 of each of the second fasteners 750. Each second fastener 750 also includes a fastener base surface 759 extending crosswise to the shaft surface 758.

In some embodiments, dimensions of the pocket 752 and second fasteners 750 may enable formation of a second cavity 760 extending therebetween (e.g., radially therebetween). In such embodiments, second viscoelastic rings 800 (e.g., gasket, damping ring) may be disposed in the second cavities 760. In the illustrated embodiment, the second viscoelastic ring 800 is disposed about (e.g., circumferentially about) the second fastener 750 and is arranged such that a first loaded surface 802 (e.g., vertical surface, radial surface) contacts or approximately contacts the second pocket wall 756 and a second loaded surface 804 (e.g., vertical surface, radial surface) contacts or approximately contacts the shaft surface 758. The second viscoelastic ring 800 is therefore radially disposed between the third portion 720 and the second fastener 750.

The second viscoelastic ring 800 may also include a first unloaded surface 806 (e.g., upper unloaded surface, horizontal unloaded surface) and a second unloaded surface 808 (e.g., lower unloaded surface, horizontal unloaded surface) extending between the first and second loaded surfaces 802, 804. The unloaded surfaces 806, 808 may remain substantially free from contact from other surfaces in an assembled and resting configuration of the vibration damper 700. Accordingly, the unloaded surfaces 806, 808 may deform or bulge in opposing directions (e.g., vertical directions, directions along vertical axis 54) in response to compression of the second viscoelastic ring 800 between the first and second loaded surfaces 802, 804. In some embodiments, a fastener protrusion 762 (e.g., annular protrusion) extends from the fastener base surface 759 in a direction (e.g., vertical direction) along the vertical axis 54 into the cavity 760 to contact the second unloaded surface 808. The fastener protrusion 762 may be configured to support the second viscoelastic ring 800 (e.g., at a position offset from the fastener base surface 759) under the influence of gravity. In some embodiments, the fastener protrusion 762 is laterally spaced or offset from the second pocket wall 756 as indicated by line 764. Thus, the fastener protrusion 762 may extend into the cavity 760 without interference via the pocket base 755.

FIG. 28 also illustrates the ball bearings 422 operatively disposed between a first race 766 of the third portion 720 and a second race 768 of the second portion 704. In some embodiments, the first and second races 766, 768 may have a generally circular shape such that the bearing cavity 726 is cylindrically shaped. In other embodiments, the first and second races 766, 768 may have other shapes and/or geometries (e.g., curved, cupped). In some embodiments, the first and second races 766, 768 are substantially flat (e.g., planar) and/or extend in a lateral direction, such that the second portion 704 may translate freely (e.g., roll) relative to the third portion 720.

Figure 29:
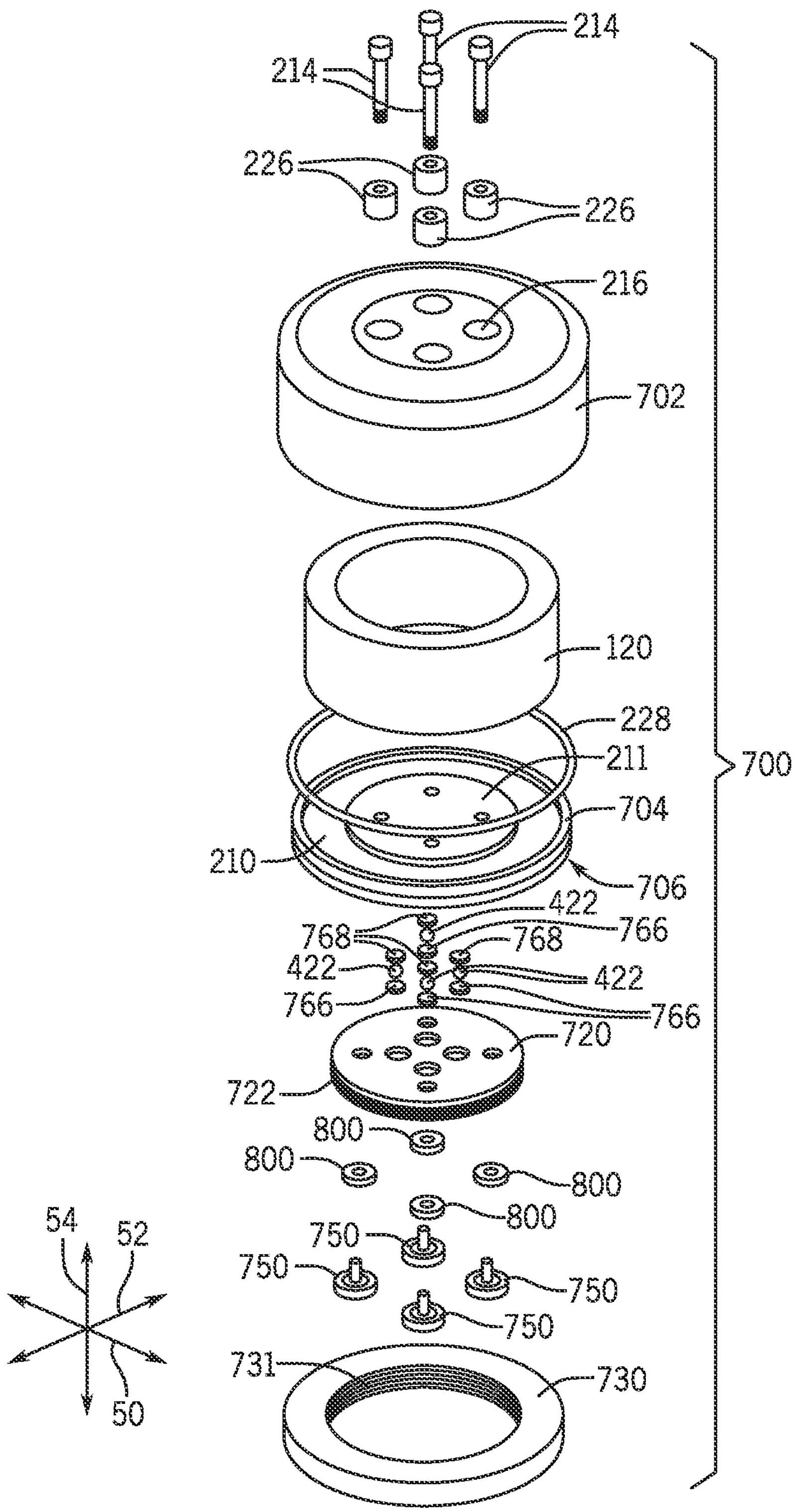
FIG. 29 is an exploded perspective view of an embodiment of the vibration damper of FIG. 26, in accordance with an aspect of the present disclosure.

FIG. 29 is an exploded perspective view of an embodiment of the vibration damper 700. As illustrated, the fasteners 214 may extend through the first portion 702 and into the second surface 211 of the second portion 704 to provide loose engagement between the first portion 702 and the second portion 704. The second fasteners 750 extend in a direction (e.g., vertical direction) along the vertical axis 54 through the third portion 720 and into the first surface 706 of the second portion 704 to provide loose engagement between the third portion 720 and the second portion 704. The vibration isolation (e.g., of vertically oriented vibrations) provided by the viscoelastic ring 120 combined with the vibration isolation (e.g., of laterally oriented vibrations) provided by the second viscoelastic ring(s) 800 enables the vibration damper 700 to provide isolation for both lateral and vertical vibrations.

Figure 30:
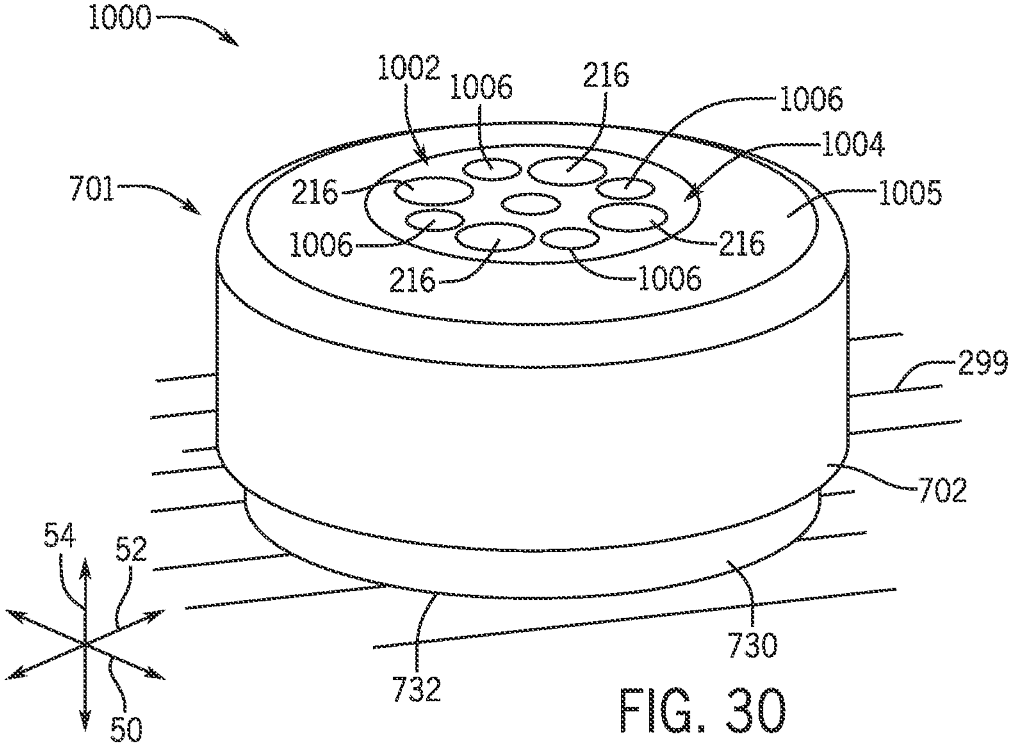
FIG. 30 is a perspective view of an embodiment of a vibration damper, in accordance with an aspect of the present disclosure.

FIG. 30 is a perspective view of an embodiment of a vibration damper 1000, in accordance with aspects of the present disclosure. Similar to the vibration dampers 600 and 700 discussed above, the vibration damper 1000 may incorporate features of the vibration dampers 100, 200, 300, 400, 600, or 700 discussed above to facilitate movement along multiple axes to enable improved isolation and damping of vibrations, including vibrations induced in vertical and lateral (e.g., radial) directions. For example, the vibration damper 1000 may include the housing 701 having the first portion 702 of the vibration damper 700 (which may be similar in structure and/or function to the first portion 202 of the vibration damper 200 discussed above). The vibration damper 1000 may also include the second portion 704 and the third portion 720 discussed above. As discussed above with respect to the vibration damper 700, the first portion 702 is configured to loosely engage with the second portion 704 (e.g., retainer, base, seat) which may have features and/or functions similar to the second portion 204 of the vibration damper 200, and the underside of the second portion 704 is configured to loosely engage with the third portion 720 of the vibration damper 1000. Thus, similar to the vibration damper 700, the second portion 704 is disposed between (e.g., vertically between, relative to the vertical axis 54) the first portion 702 and the third portion 720 of the vibration damper 1000. An upper surface of the second portion 704 may be similar in profile and/or geometry to the second surface 210 of the second portion 204 of the vibration damper 200 discussed above, while a lower surface of the second portion 704 may have a profile configured to engage with the third portion 720 of the vibration damper 1000. Further, the third portion 720 may be configured to engage with the platform 730 of the vibration damper 1000. For example, the third portion 720 may include the threaded wall 722 formed on an outer diameter of the third portion 720, which may be configured to threadingly engage with the platform 730.

As discussed above with respect to the vibration damper 700, the threaded engagement between the platform 730 and the third portion 720 of the vibration damper 1000 enables positional adjustment of the third portion 720 relative to the platform 730. In this way, a height of the vibration damper 1000 (e.g., a dimension along vertical axis 54) may be increased or decreased, thereby facilitating leveling of electronic components 12 supported by the vibration damper 1000. The second portion 704, the third portion 720, and the platform 730 of the vibration damper 1000 may be made of any suitably rigid material, including but not limited to steel, steel alloys including stainless steel, aluminum alloys, polymers such as polyoxymethylene (POM), or other materials with a suitable (e.g., high) rigidity.

Additionally, the housing 701 of the vibration damper 1000 may include a fourth portion 1002. The fourth portion 1002 may be configured to loosely engage with the first portion 702 to facilitate movement along multiple axes to enable improved isolation and damping of vibrations. In certain embodiments, the fourth portion 1002 may be configured to facilitate movement along lateral and radial axes of the vibration damper 1000. The fourth portion 1002 may be positioned within a recess 1004 formed in a first surface 1005 (e.g., similar to surface 205 of the vibration damper 200) of the first portion 702 of the vibration damper 1000. The recess 1004 may be positioned (e.g., centrally positioned) within the first surface 1005 such that the fourth portion 1002 is positioned within the recess 1004 at a central location of the vibration damper 1000 in an assembled configuration.

As shown in FIG. 30, the fourth portion 1002 may include multiple (e.g., two) types of holes or apertures configured to receive fasteners to couple components of the vibration damper 1000 to one another. For example, the fourth portion 1002 may include the holes 216 (e.g., similar to the holes 216 of the vibration damper 200, first holes) and may be configured to receive fasteners 214 that extend through the holes 216 to loosely couple the first portion 702 to the second portion 704 as discussed above. Further, the fourth portion 1002 of the vibration damper 1000 may include holes 1006 (e.g., second holes) extending through the fourth portion 1002. The holes 1006 may be configured to receive additional fasteners, thereby enabling a loose coupling between the first portion 702 and the fourth portion 1002. In certain embodiments, the additional fasteners may be configured to couple components of the fourth portion 1002 to one another, as discussed in greater detail below.

Figure 31:
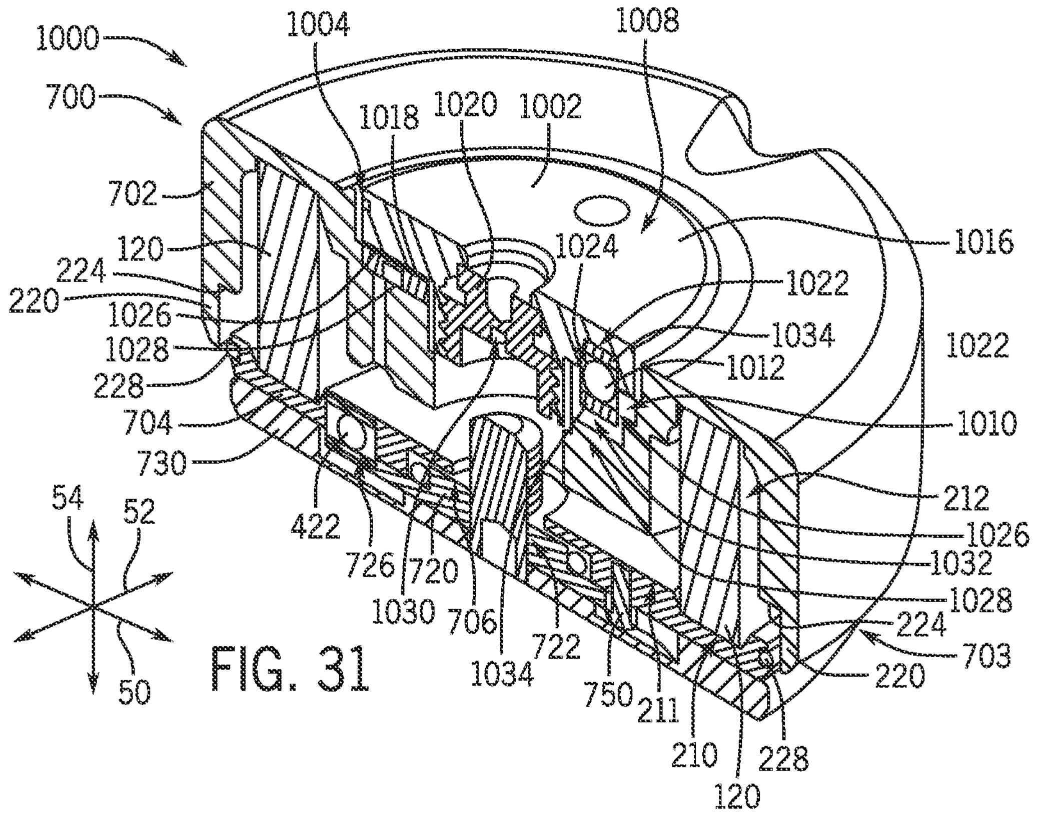
FIG. 31 is a cross-sectional perspective view of an embodiment of the vibration damper of FIG. 30, in accordance with an aspect of the present disclosure.

FIG. 31 is a cross-sectional perspective view of an embodiment of the vibration damper 1000. As shown, the vibration damper 1000 may include the first portion 702, the viscoelastic ring 120, the fasteners 214, the extension 220, the limiting surface 224, the first resilient member 226, and the second resilient members 228 similar to the elements described above with respect to the vibration dampers 200 and 700. Further, as noted above, the second portion 704 may include elements and element numbers similar to the second portion 704 of the vibration damper 700 and/or the second portion 204 of the vibration damper 200. For example, the first portion 702 may include the extension 220, extending along the perimeter 703 (e.g., circumference) of the first portion 702 to limit lateral (e.g., horizontal) movement of the second portion 704 and/or first portion 702 relative to one another when under lateral forces and the limiting surface 224 extending from the extension 220 to limit upward translation of the second portion 704 toward the first portion 702 and/or downward translation of the first portion 702 toward the second portion 704 when the vibration damper 700 is under compression forces. The first portion 702 may also include the recessed surface 232 and the bracing surfaces 234 configured to engage with the viscoelastic ring 120 upon application of a load (e.g., vertical load). The second portion 704 may include the second surface 210 configured to engage with the second loaded surface 124 of the viscoelastic ring 120 and the third surface 211 configured to receive the fasteners 214, and the recess 218.

As noted above, in certain embodiments, the fasteners 214 extend through the first portion 702 via the holes 216 and thread into the third surface 211 of the second portion 704 of the vibration damper 1000 to provide loose engagement between the first portion 702 and the second portion 704. The second fasteners 750 may extend through the third portion 720 and thread into the first surface 706 of the second portion 704 to provide loose engagement of the third portion 720 to the second portion 704. As similarly discussed above with respect to the vibration damper 700, loose engagement of the first portion 702 and the third portion 720 to opposing sides of the second portion 704 may enable limited relative movement between the second portion 704 and both the first portion 702 and the third portion 720 (e.g., in response to vibrations imparted to the vibration damper 1000).

FIG. 31 also illustrates the ball bearings 422 disposed within the plurality of bearing cavities 726 defined between the second portion 704 and the third portion 720. The ball bearings 422 are disposed between (e.g., vertically between) the second portion 704 and the third portion 720, such that the second portion 704 may translate (e.g., roll) along the ball bearings 422 (e.g., for a limited distance) in lateral directions, for example, in response to vibrations imparted to the vibration damper 1000.

Figure 32:
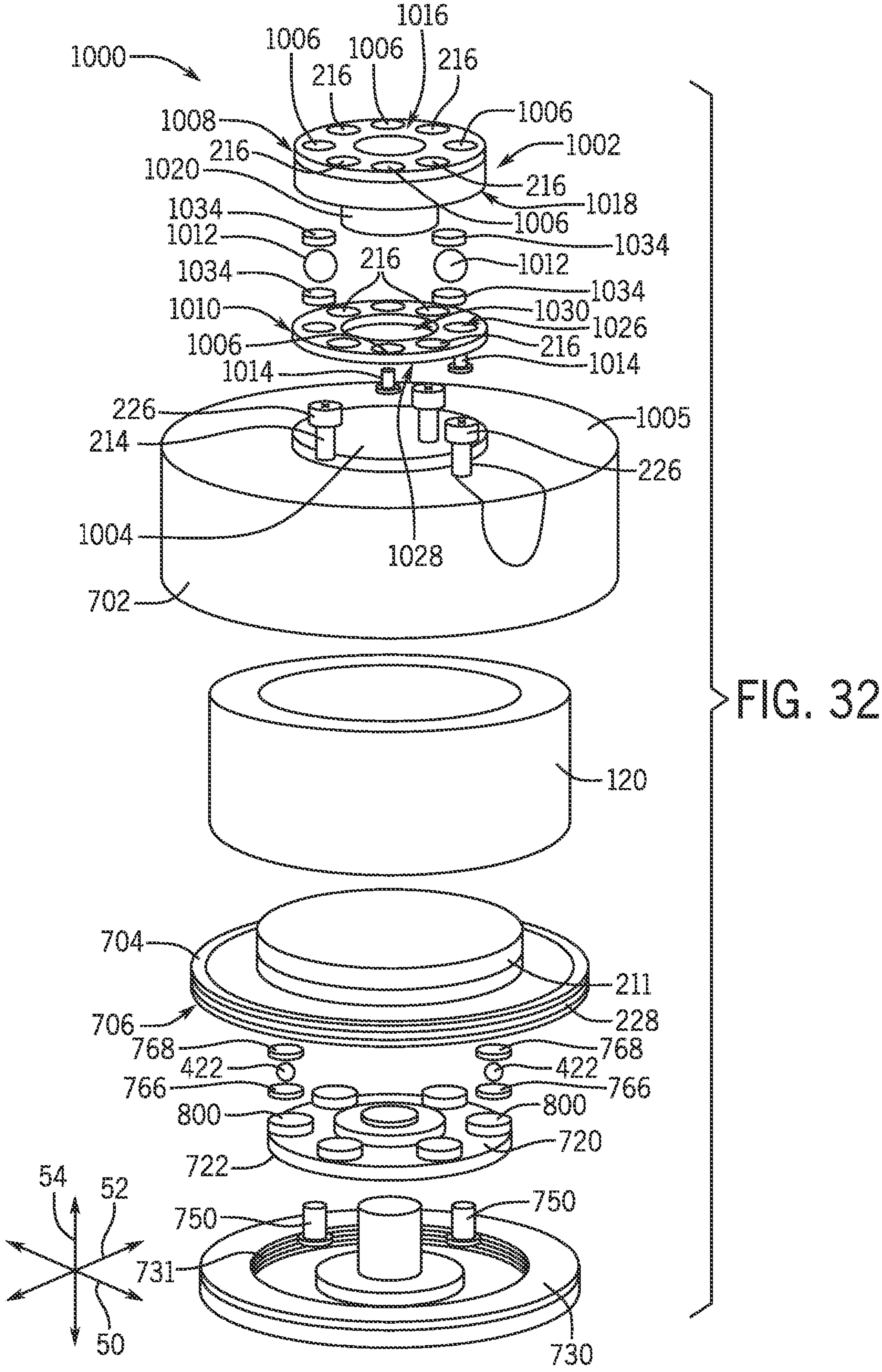
FIG. 32 is an exploded perspective view of an embodiment of the vibration damper of FIG. 30, in accordance with an aspect of the present disclosure.

Additionally, FIG. 31 illustrates a second set of ball bearings 1012 associated with the fourth portion 1002 of the vibration damper 1000. For example, the fourth portion 1002 of the vibration damper 1000 may include a first component 1008 (e.g., top component, retainer, plate and pin portion) and a second component 1010 (e.g., bottom component, disc, ring) loosely coupled to one another via fasteners 1014 (e.g., as illustrated in FIG. 32). The first component 1008 and the second component 1010 of the fourth portion 1002 may both be disposed within the recess 1004 formed on the first surface 1005 of the first portion 702 of the vibration damper 1000. The first component 1008 includes a first surface 1016 (e.g., upper surface), a second surface 1018 (e.g., lower surface) and a protrusion 1020 configured to be disposed within a void 1030 of the second component 1010 (e.g., as illustrated in FIG. 32). The second surface 1018 of the first component 1008 may include recesses 1022 configured to at least partially define a bearing cavity 1024 in which the ball bearings 1012 are disposed. The second component 1010 may also include a first surface 1026 (e.g., upper surface) and a second surface 1028 (e.g., lower surface). The first surface 1026 of the second component 1010 may also include recesses 1032 configured to at least partially define the bearing cavities 1024 in which the ball bearings 1012 are disposed. That is, in an assembled configuration, the recesses 1022 of the first component 1008 and the recesses 1032 of the second component 1010 are configured to align with one another to define the bearing cavities 1024 in which the ball bearings 1012 are disposed. Each of the bearing cavities 1024 may also include races 1034 disposed within the recesses 1022 and 1032 on each of the second surface 1018 of the first component 1008 and the first surface 1026 of the second component 1010. The races 1034 may be curved races, thereby enabling the vibration damper 1000 to respond to low amplitude vibrations and improve sound quality having higher relative frequencies.

FIG. 32 is an exploded perspective view of an embodiment of the vibration damper 1000. As illustrated, the fasteners 1014 may extend through the second component 1010 and into the first component 1008 of the fourth portion 1002 of the vibration damper 1000 to provide loose engagement between the first and second components 1008, 1010 of the fourth portion 1002 of the vibration damper 1000. The vibration isolation (e.g., of vertically oriented vibrations) provided by the viscoelastic ring 120 combined with the vibration isolation (e.g., of laterally oriented vibrations) provided by the second viscoelastic ring(s) 800 enables the vibration damper 1000 to provide isolation for both lateral (e.g., radial) and vertical directions. Furthermore, by including the fourth portion 1002, the ball bearings 422 combined with the ball bearings 1012 enable increased amounts of lateral movement, thereby enabling the vibration damper 1000 to provide isolation and damping of vibrations across a wide range of frequencies and applications.

Figure 33:
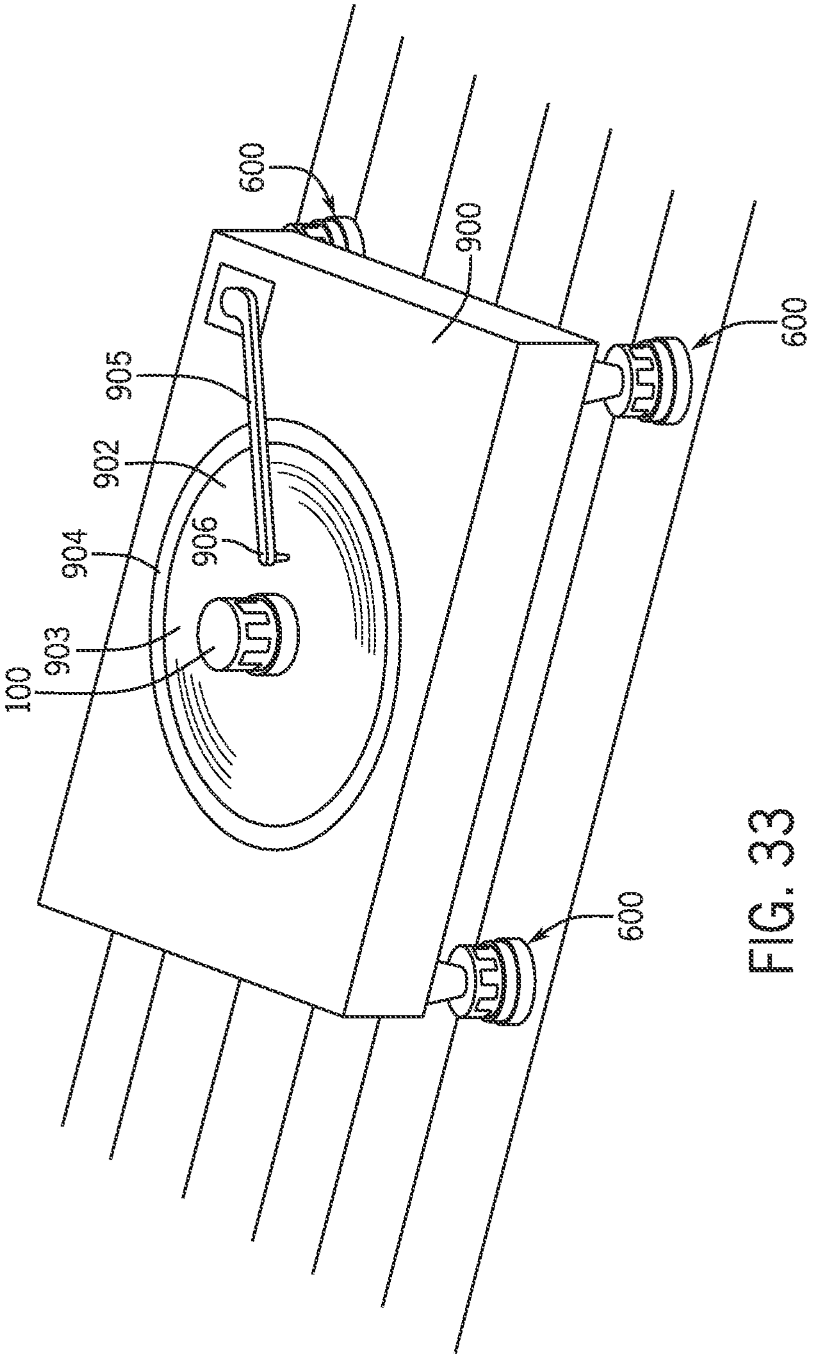
FIG. 33 is a perspective view of an embodiment of a system, illustrating audio equipment supported by vibration dampers, in accordance with an aspect of the present disclosure.

FIG. 33 is a perspective view of an embodiment of the vibration damper 100 disposed on a record player 900 (e.g., electronic equipment 12). As noted above, the vibration damper 100 may be utilized to support various pieces of electronic equipment 12 and may be configured to damp and/or isolate vibrations imparted to the vibration damper 100. Indeed, vibrations produced by surrounding electronic equipment and/or transmitted via components or structure adjacent the vibration damper 100 may be damped and/or isolated to reduce microphony and/or other undesirable effects that may degrade audio signals produced and/or output by the electronic equipment 12. Thus, the vibration damper 100 may enable an enhanced auditory experience for a listener.

In some embodiments, the vibration damper 100 may be utilized to damp and/or isolate vibrations to enable improved auditory experiences without supporting a weight of electronic equipment 12 or other component. In other words, the vibration damper 100 may effectively damp and/or isolate vibrations without positioning a component on top of the vibration damper 100. For example, the vibration damper 100 may be positioned on a surface 903 of a record 902 that is positioned on the record player 900. The record player 900 may also include a turn table 904, an arm 905, and a needle 906. During operation of the record player 900, the record 902 may be placed on the turn table 904, and the needle 906 may be placed on the surface 903 of the record 902. As the turn table 904 rotates the record 902, the needle 906 may provide an electrical signal that may be converted into audible sound. However, deformations in the record 902 (e.g., warps, bends) or on the surface 903 of the record 902 (e.g., scratches) may affect contact between the needle 906 and the surface 903 of the record 902. Further, vibrations produced during operation of the record player 900 may also affect the contact between the needle 906 and the surface 903 of the record 902, which may result in unwanted vibrations and/or electrical signals being converted into unwanted noise.

Accordingly, the vibration damper 100 may be configured to isolate the vibrations produced during operation of the record player 900 and further enhance contact between the needle 906 and the surface 903 of the record 902, thereby improving an auditory experience for a listener of the record player 900. That is, the vibration damper 100 may be positioned on the surface 903 of the record 902 and may be configured to retain the record 902 in a flat orientation to reduce effects of potential deformations present on the record 902. Further, the vibration damper 100 may be configured to isolate vibrations produced during operation of the record player 900 such that the vibrations are not transmitted or converted into an undesired electrical signal. For example, the vibration damper 100 may function as a tuned mass damper for the record player 900 and may be configured to provide additional weight to the record 902 to facilitate the contact between the needle 906 and the surface of the record 903. In some embodiments, a weight of the vibration damper 100 may be selected to enable isolation of vibrations produced during operation of the record player 900. However, in other embodiments, a weight may be added to the first surface 105 of the first portion 102 of the vibration damper 100 to provide a desired amount of weight to isolate and/or damp vibrations produced during operation of the record player 900.

It should be noted that any of the vibration dampers 100, 200, 300, 400, 600, 700, and 1000 and respective features thereof discussed above may be utilized in combination with one another. For example, a first vibration damper 100 may be positioned on the surface 903 of the record 902 and may be utilized as a tuned mass damper, while multiple additional vibration dampers 600 may be positioned between the underside of the record player 900 and a surface (e.g., furniture 26) supporting the record player 900. That is, the record player 900 may be placed on top of one or more vibration dampers 600 to isolate the record player 900 from vibrations produced from surrounding equipment, and the record player 900 may also utilize the vibration damper 100 disposed on the surface 903 of the record 902 to isolate vibrations produced during the operation of the record player 900, thereby providing an improved auditory experience for the listener of the record player 900.

The vibration dampers discussed herein enable improved isolation and damping of vibrations that may be generated or propagated in an environment having electronic equipment (e.g., audio equipment) by utilizing one or more viscoelastic rings disposed within a housing. The one or more viscoelastic rings may be associated with a low shape factor, whereby the viscoelastic rings have a higher unloaded surface area than a loaded surface area. A low shape factor may be associated with an increased ability to isolate vibrations, including a wide range of frequencies. The viscoelastic rings may be supported by one or more bracing surfaces within the housing that provide additional stability for the viscoelastic rings while enabling the viscoelastic rings to deform or bulge as desired when a compressive force is applied. By supporting the viscoelastic rings with one or more bracing surfaces, viscoelastic rings with lower shape factors than existing systems may be achieved, which may improve damping and isolation of unwanted vibrations and further promote a low natural frequency, as well as reduce wear and degradation of the viscoelastic rings. In this way, the disclosed embodiments may enhance an auditory experience for a listener of audio equipment.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vibration damper, comprising:
 a housing defining a cavity and configured to retain a viscoelastic ring within the cavity, wherein the housing comprises:
  a first portion having a first surface and a second surface, wherein the second surface is configured to engage with a first loaded surface of the viscoelastic ring;
  a second portion having an additional first surface and an additional second surface, wherein the additional second surface is configured to engage with a second loaded surface of the viscoelastic ring, wherein the first portion and the second portion of the housing are configured to be coupled to one another to facilitate movement of the first portion relative to the second portion in an assembled configuration of the vibration damper; and
  a plurality of bracing surfaces extending from a third surface of the first portion, wherein each bracing surface of the plurality of bracing surfaces is configured to engage with a first unloaded surface of the viscoelastic ring during deformation of the viscoelastic ring within the cavity.

2. The vibration damper of claim 1, comprising the viscoelastic ring, wherein the first unloaded surface of the viscoelastic ring is configured to deform radially outward within the cavity, relative to a central axis of the vibration damper, in response to a loading force applied to the first portion of the housing.

3. The vibration damper of claim 2, wherein the viscoelastic ring is one of a plurality of viscoelastic rings, and wherein the housing is configured to individually receive and retain each viscoelastic ring of the plurality of viscoelastic rings within the cavity.

4. The vibration damper of claim 1, wherein a first bracing surface of the plurality of bracing surfaces extends within the cavity at a first radial distance from a central axis of the vibration damper, a second bracing surface of the plurality of bracing surfaces extends within the cavity at a second radial distance from the central axis of the vibration damper, wherein the first radial distance and the second radial distance are different.

5. The vibration damper of claim 1, wherein the first portion of the housing is configured to circumferentially surround the viscoelastic ring within the cavity, and wherein the second portion of the housing is configured to maintain a position of the viscoelastic ring within the cavity of the housing.

6. The vibration damper of claim 1, wherein the first portion and the second portion of the housing are configured to be coupled to one another via a plurality of fasteners.

7. The vibration damper of claim 1, wherein the first portion comprises an extension extending from a perimeter of the first portion, wherein the extension is configured to limit lateral movement of the first portion relative to the second portion.

8. The vibration damper of claim 7, comprising a resilient member disposed within a groove of the second portion and between the second portion and the extension of the first portion, wherein the resilient member is configured to limit lateral movement of the first portion relative to the second portion.

9. The vibration damper of claim 1, wherein the first surface of the first portion is configured to support electronic equipment, and wherein the additional first surface of the second portion is configured to rest on a foundation.

10. The vibration damper of claim 1, wherein the housing comprises a rigid material, and the rigid material comprises one or more of a steel, a steel alloy, an aluminum alloy, a polymer, or a ceramic material.

11. The vibration damper of claim 1, wherein the housing comprises a third portion configured to couple to the second portion, wherein the additional first surface of the second portion and a surface of the third portion define one or more bearing cavities in the assembled configuration of the vibration damper, wherein each bearing cavity of the one or more bearing cavities is configured to contain one or more ball bearings, wherein the one or more ball bearings are configured to facilitate lateral movement of the second portion relative to the third portion.

12. The vibration damper of claim 11, wherein the housing comprises a fourth portion disposed within a recess of the first portion, wherein the fourth portion comprises a first component and a second component coupled to one another via one or more fasteners, wherein one or more additional ball bearings are disposed between the first component and the second component to facilitate lateral movement of the fourth portion relative to the first portion.

13. The vibration damper of claim 11, wherein the third portion is configured to engage with a platform of the vibration damper to enable positional adjustment of the third portion relative to the platform.

14. A housing for a vibration damper, comprising:

a first housing portion comprising a first surface and a second surface;

a second housing portion comprising an additional first surface and an additional second surface, wherein the second housing portion is configured to couple to the first housing portion to define a cavity in an assembled configuration of the housing; and a plurality of bracing surfaces extending radially inward, relative to a central axis of the housing, from a third surface of the first housing portion, wherein each bracing surface of the plurality of bracing surfaces is configured to engage with a viscoelastic ring disposed within the cavity, a first bracing surface of the plurality of bracing surfaces extends from the third surface toward the central axis by a first distance, and a second bracing surface of the plurality of bracing surfaces extends from the third surface toward the central axis by a second distance different from the first distance.

15. The housing of claim 14, comprising a plurality of fasteners configured to loosely couple the first housing portion and the second housing portion to one another, wherein each fastener of the plurality of fasteners is configured to be disposed within a respective hole extending through the first housing portion, each fastener of the plurality of fasteners comprises a respective resilient member disposed about the corresponding fastener, and each resilient member is configured to be disposed within the respective hole of the first housing portion and to engage with the first housing portion to limit lateral movement of the first housing portion relative to the second housing portion.

16. The housing of claim 14, comprising a third housing portion configured to couple to the second housing portion, wherein the additional second surface comprises a profile configured to engage with an additional profile of the third housing portion to define a bearing cavity, wherein a ball bearing is disposed within the bearing cavity to facilitate lateral movement of the second housing portion relative to the third housing portion.

17. The housing of claim 16, wherein the first housing portion and the second housing portion are loosely coupled to one another via a first plurality of fasteners, and the second housing portion and the third housing portion are loosely coupled to one another via a second plurality of fasteners.

18. The housing of claim 17, wherein the third housing portion comprises a threaded wall configured to threadingly engage with a platform to enable positional adjustment of the third housing portion relative to the platform.

19. A vibration damper comprising a housing defining a cavity configured to retain a viscoelastic ring, wherein the housing comprises:

a first housing portion configured to engage with a first loaded surface of the viscoelastic ring, wherein the first housing portion comprises a plurality of bracing surfaces configured to engage with an unloaded surface of the viscoelastic ring;

a second housing portion configured to engage with a second loaded surface of the viscoelastic ring;

a third housing portion configured to couple to the second housing portion;

a plurality of ball bearings disposed between the third housing portion and the second housing portion to facilitate lateral movement of the second housing portion relative to the third housing portion;

a fourth housing portion configured to be disposed within a recess of the first housing portion, wherein the fourth housing portion comprises a first component and a second component; and one or more additional ball bearings disposed between the first component and the second component to facilitate lateral movement of the fourth housing portion relative to the first housing portion.

20. The vibration damper of claim 19, comprising a plurality of viscoelastic rings including the viscoelastic ring, wherein the housing is configured to individually receive and retain each viscoelastic ring of the plurality of viscoelastic rings within the cavity.

21. A vibration damper, comprising:

a viscoelastic ring; and a housing defining a cavity and configured to retain the viscoelastic ring within the cavity, wherein the housing comprises:

a first portion having a first surface and a second surface, wherein the second surface is configured to engage with a first loaded surface of the viscoelastic ring;

a second portion having an additional first surface and an additional second surface, wherein the additional second surface is configured to engage with a second loaded surface of the viscoelastic ring; and a plurality of bracing surfaces extending from a third surface of the first portion, wherein each bracing surface of the plurality of bracing surfaces is configured to engage with a first unloaded surface of the viscoelastic ring during deformation of the viscoelastic ring within the cavity, wherein the first unloaded surface of the viscoelastic ring is configured to deform radially outward within the cavity, relative to a central axis of the vibration damper, in response to a loading force applied to the first portion of the housing, the viscoelastic ring is one of a plurality of viscoelastic rings, and the housing is configured to individually receive and retain each viscoelastic ring of the plurality of viscoelastic rings within the cavity.

22. A vibration damper, comprising:

a housing defining a cavity and configured to retain a viscoelastic ring within the cavity, wherein the housing comprises:

a first portion having a first surface and a second surface, wherein the second surface is configured to engage with a first loaded surface of the viscoelastic ring;

a second portion having an additional first surface and an additional second surface, wherein the additional second surface is configured to engage with a second loaded surface of the viscoelastic ring;

a plurality of bracing surfaces extending from a third surface of the first portion, wherein each bracing surface of the plurality of bracing surfaces is configured to engage with a first unloaded surface of the viscoelastic ring during deformation of the viscoelastic ring within the cavity; and a third portion configured to couple to the second portion, wherein the additional first surface of the second portion and a surface of the third portion define one or more bearing cavities in an assembled configuration of the vibration damper, each bearing cavity of the one or more bearing cavities is configured to contain one or more ball bearings, and the one or more ball bearings are configured to facilitate lateral movement of the second portion relative to the third portion.

* * * * *